(12) United States Patent
Beenau et al.

(10) Patent No.: US 7,886,157 B2
(45) Date of Patent: *Feb. 8, 2011

(54) HAND GEOMETRY RECOGNITION BIOMETRICS ON A FOB

(75) Inventors: Blayn W Beenau, Peoria, AZ (US); David S Bonalle, New Rochelle, NY (US); Seth W Fields, Taylorsville, UT (US); William J Gray, Salt Lake City, UT (US); Carl Larkin, West Sussex (GB); Joshua L Montgomery, Orem, UT (US); Peter D Saunders, Salt Lake City, UT (US)

(73) Assignee: Xatra Fund MX, LLC, Wilmington, DE (US)

( * ) Notice: Subject to any disclaimer, the term of this patent is extended or adjusted under 35 U.S.C. 154(b) by 427 days.

This patent is subject to a terminal disclaimer.

(21) Appl. No.: 12/023,442

(22) Filed: Jan. 31, 2008

(65) Prior Publication Data

US 2008/0140580 A1 Jun. 12, 2008

Related U.S. Application Data

(63) Continuation of application No. 10/708,831, filed on Mar. 26, 2004, now abandoned, which is a continuation-in-part of application No. 10/340,352, filed on Jan. 10, 2003, which is a continuation-in-part of application No. 10/192,488, filed on Jul. 9, 2002, now Pat. No. 7,239,226, said application No. 10/340,352 is a continuation-in-part of application No. 10/318,432, filed on Dec. 13, 2002, said application No. 10/340,352 is a continuation-in-part of application No. 10/318,480, filed on Dec. 13, 2002, now Pat. No. 7,249,112.

(60) Provisional application No. 60/396,577, filed on Jul. 16, 2002, provisional application No. 60/304,216, filed on Jul. 10, 2001.

(51) Int. Cl.
*H04L 9/00* (2006.01)
*H04L 9/32* (2006.01)
*G06F 7/04* (2006.01)

(52) U.S. Cl. .................. 713/186; 713/168; 713/169; 713/170; 713/171; 713/174; 726/27; 726/28; 726/29; 726/30; 726/26

(58) Field of Classification Search .................. 713/186
See application file for complete search history.

(56) References Cited

U.S. PATENT DOCUMENTS

D061,466 S  9/1922  Foltz (Continued)

FOREIGN PATENT DOCUMENTS

CA  2300241  9/2000

(Continued)

OTHER PUBLICATIONS

Supplemental Search Report dated May 26, 2006 for EP03763325.2.

(Continued)

*Primary Examiner*—Longbit Chai
(74) *Attorney, Agent, or Firm*—Snell & Wilmer L.L.P.

(57) ABSTRACT

The present invention discloses a system and methods for biometric security using hand geometry recognition biometrics in a transponder-reader system. The biometric security system also includes a hand geometry scan sensor that detects biometric samples and a device for verifying biometric samples. In one embodiment, the biometric security system includes a transponder configured with a hand geometry scan sensor. In another embodiment, the system includes a reader configured with a hand geometry scan sensor. In yet another embodiment, the present invention discloses methods for proffering and processing hand geometry scan samples to facilitate authorization of transactions.

29 Claims, 19 Drawing Sheets

U.S. PATENT DOCUMENTS

| | | | |
|---|---|---|---|
| 2,767,756 A | 10/1956 | Niles | |
| 3,376,661 A | 4/1968 | Hulett | |
| 3,446,260 A | 5/1969 | Osher | |
| 3,536,894 A | 10/1970 | Travioli | |
| 3,573,731 A | 4/1971 | Schwend | |
| 3,725,647 A | 4/1973 | Retzky | |
| 3,763,356 A | 10/1973 | Berler | |
| 3,829,662 A | 8/1974 | Furahashi | |
| 3,838,252 A | 9/1974 | Hynes et al. | |
| 3,873,813 A | 3/1975 | Lahr et al. | |
| 3,894,756 A | 7/1975 | Ward | |
| 3,914,762 A | 10/1975 | Klensch | |
| 3,929,177 A | 12/1975 | Reis | |
| 3,955,295 A | 5/1976 | Mayer | |
| 4,044,231 A | 8/1977 | Beck et al. | |
| 4,048,737 A | 9/1977 | McDermott | |
| 4,056,139 A | 11/1977 | Murt | |
| 4,058,839 A | 11/1977 | Darjany | |
| 4,066,873 A | 1/1978 | Schatz | |
| 4,119,361 A | 10/1978 | Greenaway | |
| 4,202,491 A | 5/1980 | Suzuki | |
| 4,206,965 A | 6/1980 | McGrew | |
| 4,222,516 A | 9/1980 | Badet et al. | |
| 4,277,863 A | 7/1981 | Faneuf | |
| 4,303,904 A | 12/1981 | Chasek | |
| 4,318,554 A | 3/1982 | Anderson et al. | |
| 4,356,646 A | 11/1982 | Johnson, Jr. | |
| 4,361,757 A | 11/1982 | Ehrat | |
| D270,303 S | 8/1983 | Zautner | |
| D270,546 S | 9/1983 | Malmberg | |
| 4,421,380 A | 12/1983 | McGrew | |
| 4,436,991 A | 3/1984 | Albert et al. | |
| 4,443,027 A | 4/1984 | McNeely et al. | |
| 4,450,535 A | 5/1984 | dePommery et al. | |
| 4,453,074 A | 6/1984 | Weinstein | |
| 4,475,308 A | 10/1984 | Heise et al. | |
| 4,504,084 A | 3/1985 | Jauch | |
| 4,507,652 A | 3/1985 | Vogt et al. | |
| D280,214 S | 8/1985 | Opel | |
| 4,538,059 A | 8/1985 | Rudland | |
| 4,547,002 A | 10/1985 | Colgate, Jr. | |
| 4,558,211 A | 12/1985 | Berstein | |
| 4,563,024 A | 1/1986 | Blyth | |
| 4,581,523 A | 4/1986 | Okuno | |
| 4,582,985 A | 4/1986 | Lofberg | |
| 4,583,766 A | 4/1986 | Wessel | |
| 4,589,686 A | 5/1986 | McGrew | |
| 4,593,936 A | 6/1986 | Opel | |
| 4,597,814 A | 7/1986 | Colgate, Jr. | |
| 4,639,765 A | 1/1987 | d'Hont | |
| 4,641,017 A | 2/1987 | Lopata | |
| 4,643,452 A | 2/1987 | Chang | |
| 4,656,463 A | 4/1987 | Anders et al. | |
| 4,663,518 A | 5/1987 | Borror et al. | |
| 4,672,021 A | 6/1987 | Blumel et al. | |
| 4,684,795 A | 8/1987 | Colgate, Jr. | |
| 4,692,394 A | 9/1987 | Drexler | |
| 4,694,148 A | 9/1987 | Diekemper et al. | |
| 4,697,073 A | 9/1987 | Hara | |
| 4,697,363 A | 10/1987 | Gamm | |
| 4,700,055 A | 10/1987 | Kashkashian, Jr. | |
| 4,711,690 A | 12/1987 | Haghiri-Tehrani | |
| 4,717,221 A | 1/1988 | McGrew | |
| 4,725,719 A | 2/1988 | Oncken et al. | |
| 4,736,094 A | 4/1988 | Yoshida | |
| 4,739,328 A | 4/1988 | Koelle et al. | |
| 4,744,497 A | 5/1988 | O'Neal | |
| 4,747,147 A | 5/1988 | Sparrow | |
| 4,768,811 A | 9/1988 | Oshikoshi et al. | |
| 4,779,898 A | 10/1988 | Berning et al. | |
| 4,794,142 A | 12/1988 | Alberts et al. | |
| 4,795,894 A | 1/1989 | Sugimoto et al. | |
| 4,801,790 A | 1/1989 | Solo | |
| 4,816,653 A | 3/1989 | Anderl et al. | |
| 4,829,690 A | 5/1989 | Andros | |
| 4,837,422 A | 6/1989 | Dethloff et al. | |
| 4,839,504 A | 6/1989 | Nakano | |
| 4,841,570 A | 6/1989 | Cooper | |
| 4,849,617 A | 7/1989 | Ueda | |
| 4,852,911 A | 8/1989 | Hoppe | |
| 4,853,525 A | 8/1989 | Vogt et al. | |
| 4,863,819 A | 9/1989 | Drexler et al. | |
| 4,868,849 A | 9/1989 | Tamaoki | |
| 4,884,507 A | 12/1989 | Levy | |
| 4,889,366 A | 12/1989 | Fabbiani | |
| 4,897,533 A | 1/1990 | Lyszczarz | |
| 4,897,947 A | 2/1990 | Kass-Pious | |
| 4,910,521 A | 3/1990 | Mellon | |
| 4,917,292 A | 4/1990 | Drexler | |
| 4,918,432 A | 4/1990 | Pauley et al. | |
| D307,979 S | 5/1990 | Purvis | |
| 4,937,963 A | 7/1990 | Barnes | |
| D310,386 S | 9/1990 | Michels et al. | |
| 4,961,142 A | 10/1990 | Elliott et al. | |
| 4,984,270 A | 1/1991 | LaBounty | |
| 4,993,068 A | 2/1991 | Piosenka et al. | |
| 4,998,753 A | 3/1991 | Wichael | |
| 5,004,899 A | 4/1991 | Ueda | |
| 5,010,243 A | 4/1991 | Fukushima et al. | |
| 5,015,830 A | 5/1991 | Masuzawa et al. | |
| 5,016,274 A | 5/1991 | Micali et al. | |
| 5,023,782 A | 6/1991 | Lutz et al. | |
| 5,023,908 A | 6/1991 | Weiss | |
| 5,025,372 A | 6/1991 | Burton et al. | |
| 5,052,328 A | 10/1991 | Eppenbach | |
| 5,053,774 A | 10/1991 | Schuermann et al. | |
| 5,068,894 A | 11/1991 | Hoppe | |
| 5,096,228 A | 3/1992 | Rinderknecht | |
| 5,099,226 A | 3/1992 | Andrews | |
| 5,101,200 A | 3/1992 | Swett | |
| 5,106,125 A | 4/1992 | Antes | |
| 5,111,033 A | 5/1992 | Fujita et al. | |
| 5,125,356 A | 6/1992 | Galante | |
| 5,142,383 A | 8/1992 | Mallik | |
| 5,171,039 A | 12/1992 | Dusek | |
| 5,175,416 A | 12/1992 | Mansvelt et al. | |
| 5,180,902 A | 1/1993 | Schick et al. | |
| 5,192,947 A | 3/1993 | Neustein | |
| 5,193,114 A | 3/1993 | Moseley | |
| 5,197,140 A | 3/1993 | Balmer | |
| 5,198,647 A | 3/1993 | Mizuta | |
| 5,202,826 A | 4/1993 | McCarthy | |
| 5,206,488 A | 4/1993 | Teicher | |
| 5,208,110 A | 5/1993 | Smith et al. | |
| 5,212,777 A | 5/1993 | Gove et al. | |
| 5,217,844 A | 6/1993 | Fukushima et al. | |
| 5,221,838 A | 6/1993 | Gutman et al. | |
| 5,222,282 A | 6/1993 | Sukonnik et al. | |
| 5,226,989 A | 7/1993 | Sukonnik | |
| 5,234,624 A | 8/1993 | Bauer et al. | |
| 5,239,654 A | 8/1993 | Ing-Simmons et al. | |
| 5,245,329 A | 9/1993 | Gokcebay | |
| 5,247,304 A | 9/1993 | d'Hont | |
| 5,251,937 A | 10/1993 | Ojster | |
| 5,256,473 A | 10/1993 | Kotani et al. | |
| 5,257,656 A | 11/1993 | McLeroy | |
| 5,259,649 A | 11/1993 | Shomron | |
| 5,272,326 A | 12/1993 | Fujita et al. | |
| 5,274,392 A | 12/1993 | d'Hont et al. | |
| 5,276,311 A | 1/1994 | Hennige | |
| 5,279,019 A | 1/1994 | Knickle | |
| 5,285,100 A | 2/1994 | Byatt | |
| 5,288,978 A | 2/1994 | Iijima | |
| 5,300,764 A | 4/1994 | Hoshino et al. | |

| | | | | | |
|---|---|---|---|---|---|
| 5,304,789 A | 4/1994 | Lob et al. | 5,548,291 A | 8/1996 | Meier et al. |
| 5,305,002 A | 4/1994 | Holodak et al. | 5,550,536 A | 8/1996 | Flaxl |
| 5,308,121 A | 5/1994 | Gunn | 5,550,548 A | 8/1996 | Schuermann |
| 5,311,679 A | 5/1994 | Birch, Sr. | 5,552,789 A | 9/1996 | Schuermann |
| 5,321,751 A | 6/1994 | Ray et al. | 5,555,877 A | 9/1996 | Lockwood et al. |
| 5,326,964 A | 7/1994 | Risser | 5,557,279 A | 9/1996 | d'Hont |
| 5,329,617 A | 7/1994 | Asal | 5,557,516 A | 9/1996 | Hogan |
| 5,331,138 A | 7/1994 | Saroya | 5,559,504 A | 9/1996 | Itsumi et al. |
| 5,339,447 A | 8/1994 | Balmer | 5,559,887 A | 9/1996 | Davis et al. |
| 5,349,357 A | 9/1994 | Schurmann | 5,561,430 A | 10/1996 | Knebelkamp |
| 5,350,906 A | 9/1994 | Brody et al. | 5,563,582 A | 10/1996 | d'Hont |
| 5,351,052 A | 9/1994 | d'Hont et al. | 5,569,187 A | 10/1996 | Kaiser |
| 5,351,142 A | 9/1994 | Cueli | 5,569,897 A | 10/1996 | Masuda |
| 5,355,411 A | 10/1994 | MacDonald | 5,572,226 A | 11/1996 | Tuttle |
| 5,359,522 A | 10/1994 | Ryan | 5,572,815 A | 11/1996 | Kovner |
| 5,365,551 A | 11/1994 | Snodgrass et al. | 5,575,094 A | 11/1996 | Leake et al. |
| 5,371,896 A | 12/1994 | Gove et al. | 5,577,109 A | 11/1996 | Stimson et al. |
| 5,373,303 A | 12/1994 | d'Hont | 5,577,120 A | 11/1996 | Penzias |
| 5,383,687 A | 1/1995 | Suess et al. | 5,577,121 A | 11/1996 | Davis et al. |
| 5,397,881 A | 3/1995 | Mannik | 5,577,609 A | 11/1996 | Hexter |
| 5,407,893 A | 4/1995 | Koshizuka et al. | 5,578,808 A | 11/1996 | Taylor |
| 5,408,243 A | 4/1995 | d'Hont | 5,581,630 A | 12/1996 | Bonneau, Jr. |
| 5,410,142 A | 4/1995 | Tsuboi et al. | 5,585,787 A | 12/1996 | Wallerstein |
| 5,410,649 A | 4/1995 | Gove | 5,590,038 A | 12/1996 | Pitroda |
| 5,412,192 A | 5/1995 | Hoss | 5,590,197 A | 12/1996 | Chen et al. |
| 5,428,363 A | 6/1995 | d'Hont | 5,592,150 A | 1/1997 | d'Hont |
| 5,438,184 A | 8/1995 | Roberts et al. | 5,592,405 A | 1/1997 | Gove et al. |
| 5,453,601 A | 9/1995 | Rosen | 5,592,767 A | 1/1997 | Treske |
| 5,453,747 A | 9/1995 | d'Hont et al. | 5,594,227 A | 1/1997 | Deo |
| 5,461,217 A | 10/1995 | Claus | 5,594,233 A | 1/1997 | Kenneth et al. |
| 5,461,219 A | 10/1995 | Cronvall | 5,594,448 A | 1/1997 | d'Hont |
| 5,471,592 A | 11/1995 | Gove et al. | 5,597,534 A | 1/1997 | Kaiser |
| 5,477,038 A | 12/1995 | Levine et al. | 5,600,175 A | 2/1997 | Orthmann |
| 5,477,040 A | 12/1995 | Lalonde | 5,602,538 A | 2/1997 | Orthmann et al. |
| 5,478,629 A | 12/1995 | Norman | 5,602,918 A | 2/1997 | Chen et al. |
| 5,479,494 A | 12/1995 | Clitherow | 5,602,919 A | 2/1997 | Hurta et al. |
| 5,479,530 A | 12/1995 | Nair et al. | 5,604,342 A | 2/1997 | Fujioka |
| 5,485,510 A | 1/1996 | Colbert | 5,604,801 A | 2/1997 | Dolan et al. |
| 5,488,376 A | 1/1996 | Hurta et al. | 5,606,520 A | 2/1997 | Gove et al. |
| 5,489,411 A | 2/1996 | Jha et al. | 5,606,594 A | 2/1997 | Register et al. |
| 5,489,908 A | 2/1996 | Orthmann et al. | 5,607,522 A | 3/1997 | McDonnell |
| 5,490,079 A | 2/1996 | Sharpe et al. | 5,608,203 A | 3/1997 | Finkelstein et al. |
| 5,491,483 A | 2/1996 | d'Hont | 5,608,406 A | 3/1997 | Eberth et al. |
| 5,491,484 A | 2/1996 | Schuermann | 5,608,778 A | 3/1997 | Partridge, III |
| 5,491,715 A | 2/1996 | Flaxl | 5,611,965 A | 3/1997 | Shouji et al. |
| 5,493,312 A | 2/1996 | Knebelkamp | 5,613,001 A | 3/1997 | Bakhoum |
| 5,497,121 A | 3/1996 | d'Hont | 5,613,131 A | 3/1997 | Moss et al. |
| 5,500,513 A | 3/1996 | Langhans et al. | 5,613,146 A | 3/1997 | Gove et al. |
| 5,500,651 A | 3/1996 | Schuermann | 5,614,703 A | 3/1997 | Martin et al. |
| 5,503,434 A | 4/1996 | Gunn | 5,619,207 A | 4/1997 | d'Hont |
| 5,504,808 A | 4/1996 | Hamrick, Jr. | 5,621,199 A | 4/1997 | Calari et al. |
| 5,506,395 A | 4/1996 | Eppley | 5,621,396 A | 4/1997 | Flaxl |
| 5,513,272 A | 4/1996 | Bogosian, Jr. | 5,621,411 A | 4/1997 | Hagl et al. |
| 5,513,525 A | 5/1996 | Schurmann | 5,621,412 A | 4/1997 | Sharpe et al. |
| 5,514,860 A | 5/1996 | Berson | 5,625,366 A | 4/1997 | d'Hont |
| 5,516,153 A | 5/1996 | Kaule | 5,625,370 A | 4/1997 | d'Hont |
| 5,518,810 A | 5/1996 | Nishihara et al. | 5,625,695 A | 4/1997 | M'Raihi et al. |
| 5,519,381 A | 5/1996 | Marsh et al. | 5,629,981 A | 5/1997 | Nerlikar |
| 5,520,230 A | 5/1996 | Sumner, III | 5,638,080 A | 6/1997 | Orthmann et al. |
| 5,521,966 A | 5/1996 | Friedes et al. | 5,640,002 A | 6/1997 | Ruppert et al. |
| 5,522,083 A | 5/1996 | Gove et al. | 5,641,050 A | 6/1997 | Smith et al. |
| 5,525,992 A | 6/1996 | Froschermeier | 5,646,607 A | 7/1997 | Schurmann et al. |
| 5,525,994 A | 6/1996 | Hurta et al. | 5,649,118 A | 7/1997 | Carlisle et al. |
| 5,528,222 A | 6/1996 | Moskowitz et al. | 5,657,388 A | 8/1997 | Weiss |
| 5,530,232 A | 6/1996 | Taylor | 5,660,319 A | 8/1997 | Falcone et al. |
| 5,533,656 A | 7/1996 | Bonaldi | 5,665,439 A | 9/1997 | Andersen et al. |
| 5,534,857 A | 7/1996 | Laing et al. | 5,668,876 A | 9/1997 | Falk et al. |
| 5,537,314 A | 7/1996 | Kanter | 5,673,106 A | 9/1997 | Thompson |
| 5,539,825 A | 7/1996 | Akiyama | D384,971 S | 10/1997 | Kawan |
| 5,541,582 A | 7/1996 | Wagner et al. | 5,675,342 A | 10/1997 | Sharpe |
| 5,541,604 A | 7/1996 | Meier | 5,677,953 A | 10/1997 | Dolphin |
| 5,543,798 A | 8/1996 | Schuermann | 5,686,920 A | 11/1997 | Hurta et al. |
| 5,544,246 A | 8/1996 | Mandelbaum et al. | 5,689,100 A | 11/1997 | Carrithers |

| | | | | | |
|---|---|---|---|---|---|
| 5,691,731 A | 11/1997 | vanErven | 5,826,242 A | 10/1998 | Montulli |
| 5,692,132 A | 11/1997 | Hogan | 5,826,243 A | 10/1998 | Musmanno et al. |
| 5,694,596 A | 12/1997 | Campbell | 5,828,044 A | 10/1998 | Jun et al. |
| 5,696,913 A | 12/1997 | Gove et al. | 5,834,756 A | 11/1998 | Gutman et al. |
| 5,697,649 A | 12/1997 | Dames et al. | 5,835,894 A | 11/1998 | Adcock et al. |
| 5,698,837 A | 12/1997 | Furuta | 5,838,257 A | 11/1998 | Lambropoulos |
| 5,699,528 A | 12/1997 | Hogan | 5,838,720 A | 11/1998 | Morelli |
| 5,700,037 A | 12/1997 | Keller | 5,838,812 A | 11/1998 | Pare et al. |
| 5,701,127 A | 12/1997 | Sharpe | 5,841,364 A | 11/1998 | Hagl et al. |
| 5,704,046 A | 12/1997 | Hogan | 5,842,088 A | 11/1998 | Thompson |
| 5,705,101 A | 1/1998 | Oi et al. | 5,844,218 A | 12/1998 | Kawan et al. |
| 5,705,798 A | 1/1998 | Tarbox | 5,844,230 A | 12/1998 | Lalonde |
| 5,705,852 A | 1/1998 | Orihara et al. | 5,845,267 A | 12/1998 | Ronen |
| 5,710,421 A | 1/1998 | Kokubu | 5,851,149 A | 12/1998 | Xidos et al. |
| 5,715,399 A | 2/1998 | Bezos | 5,852,812 A | 12/1998 | Reeder |
| 5,720,500 A | 2/1998 | Okazaki et al. | 5,854,891 A | 12/1998 | Postlewaite et al. |
| 5,721,781 A | 2/1998 | Deo et al. | 5,856,048 A | 1/1999 | Tahara et al. |
| 5,724,424 A | 3/1998 | Gifford | 5,857,079 A | 1/1999 | Claus et al. |
| 5,725,098 A | 3/1998 | Seifert et al. | 5,857,152 A | 1/1999 | Everett |
| 5,727,140 A | 3/1998 | Ohtomo et al. | 5,857,709 A | 1/1999 | Chock |
| 5,727,696 A | 3/1998 | Valiulis | 5,858,006 A | 1/1999 | Van der AA et al. |
| 5,729,053 A | 3/1998 | Orthmann | 5,859,419 A | 1/1999 | Wynn |
| 5,729,236 A | 3/1998 | Flaxl | 5,859,587 A | 1/1999 | Alicot et al. |
| 5,731,957 A | 3/1998 | Brennan | 5,859,779 A | 1/1999 | Giordano et al. |
| 5,732,579 A | 3/1998 | d'Hont et al. | 5,862,325 A | 1/1999 | Reed et al. |
| 5,734,838 A | 3/1998 | Robinson et al. | 5,864,306 A | 1/1999 | Dwyer et al. |
| 5,737,439 A | 4/1998 | Lapsley et al. | 5,864,323 A | 1/1999 | Berthon |
| 5,739,512 A | 4/1998 | Tognazzini | 5,864,830 A | 1/1999 | Armetta et al. |
| 5,742,756 A | 4/1998 | Dillaway et al. | 5,865,470 A | 2/1999 | Thompson |
| 5,742,845 A | 4/1998 | Wagner | 5,867,100 A | 2/1999 | d'Hont |
| 5,745,571 A | 4/1998 | Zuk | 5,869,822 A | 2/1999 | Meadows et al. |
| 5,748,137 A | 5/1998 | d'Hont | 5,870,031 A | 2/1999 | Kaiser et al. |
| 5,748,737 A | 5/1998 | Daggar | 5,870,915 A | 2/1999 | d'Hont |
| 5,757,917 A | 5/1998 | Rose et al. | 5,875,432 A | 2/1999 | Sehr |
| 5,758,195 A | 5/1998 | Balmer | D406,861 S | 3/1999 | Leedy, Jr. |
| 5,761,306 A | 6/1998 | Lewis | 5,878,138 A | 3/1999 | Yacobi |
| 5,761,493 A | 6/1998 | Blakeley et al. | 5,878,141 A | 3/1999 | Daly et al. |
| 5,764,789 A | 6/1998 | Pare, Jr. et al. | 5,878,215 A | 3/1999 | Kling et al. |
| 5,768,385 A | 6/1998 | Simon | 5,878,337 A | 3/1999 | Joao et al. |
| 5,768,609 A | 6/1998 | Gove et al. | 5,878,403 A | 3/1999 | DeFrancesco et al. |
| 5,769,457 A | 6/1998 | Warther | 5,880,675 A | 3/1999 | Trautner |
| 5,770,843 A | 6/1998 | Rose et al. | 5,881,272 A | 3/1999 | Balmer |
| 5,773,812 A | 6/1998 | Kreft | 5,883,377 A | 3/1999 | Chapin, Jr. |
| 5,774,882 A | 6/1998 | Keen et al. | 5,883,810 A | 3/1999 | Franklin et al. |
| 5,777,903 A | 7/1998 | Piosenka | 5,884,271 A | 3/1999 | Pitroda |
| 5,778,067 A | 7/1998 | Jones et al. | 5,884,280 A | 3/1999 | Yoshioka et al. |
| 5,778,069 A | 7/1998 | Thomlinson | 5,884,292 A | 3/1999 | Baker et al. |
| 5,778,173 A | 7/1998 | Apte | 5,884,310 A | 3/1999 | Brichta et al. |
| 5,785,680 A | 7/1998 | Niezink et al. | 5,886,333 A | 3/1999 | Miyake |
| 5,786,587 A | 7/1998 | Colgate, Jr. | 5,887,266 A | 3/1999 | Heinonen et al. |
| 5,789,733 A | 8/1998 | Jachimowicz et al. | 5,889,941 A | 3/1999 | Tushie et al. |
| 5,791,474 A | 8/1998 | Hansen | 5,890,137 A | 3/1999 | Koreeda |
| 5,792,337 A | 8/1998 | Padovani et al. | D408,054 S | 4/1999 | Leedy, Jr. |
| 5,793,324 A | 8/1998 | Aslanidis et al. | 5,892,211 A | 4/1999 | Davis et al. |
| 5,794,095 A | 8/1998 | Thompson | 5,897,622 A | 4/1999 | Blinn et al. |
| 5,796,831 A | 8/1998 | Paradinas et al. | 5,898,783 A | 4/1999 | Rohrbach |
| 5,797,060 A | 8/1998 | Thompson | 5,898,838 A | 4/1999 | Wagner |
| 5,797,085 A | 8/1998 | Buek et al. | 5,900,954 A | 5/1999 | Katz et al. |
| 5,797,133 A | 8/1998 | Jones et al. | 5,901,239 A | 5/1999 | Kamei |
| 5,798,709 A | 8/1998 | Flaxl | 5,903,830 A | 5/1999 | Joao et al. |
| 5,799,087 A | 8/1998 | Rosen | 5,903,875 A | 5/1999 | Kohara |
| 5,806,045 A | 9/1998 | Biorge et al. | 5,903,880 A | 5/1999 | Biffar |
| 5,808,758 A | 9/1998 | Solmsdorf | 5,905,798 A | 5/1999 | Nerlikar et al. |
| 5,809,142 A | 9/1998 | Hurta et al. | 5,905,908 A | 5/1999 | Wagner |
| 5,809,288 A | 9/1998 | Balmer | 5,907,620 A | 5/1999 | Klemba et al. |
| 5,809,633 A | 9/1998 | Mundigl et al. | 5,909,492 A | 6/1999 | Payne et al. |
| 5,815,252 A | 9/1998 | Price-Francis | 5,912,446 A | 6/1999 | Wong et al. |
| 5,815,657 A | 9/1998 | Williams et al. | 5,912,678 A | 6/1999 | Saxena et al. |
| 5,823,359 A | 10/1998 | Harris et al. | 5,913,203 A | 6/1999 | Wong et al. |
| 5,825,007 A | 10/1998 | Jesadanont | 5,914,472 A | 6/1999 | Foladare et al. |
| 5,825,302 A | 10/1998 | Stafford | 5,915,016 A | 6/1999 | Savalle et al. |
| 5,826,077 A | 10/1998 | Blakeley et al. | 5,915,023 A | 6/1999 | Bernstein |
| 5,826,241 A | 10/1998 | Stein et al. | 5,915,973 A | 6/1999 | Hoehn-Saric et al. |

| | | | | | |
|---|---|---|---|---|---|
| 5,917,168 A | 6/1999 | Nakamura et al. | 5,991,413 A | 11/1999 | Arditti et al. |
| 5,917,913 A | 6/1999 | Wang | 5,991,608 A | 11/1999 | Leyten |
| 5,917,925 A | 6/1999 | Moore | 5,991,748 A | 11/1999 | Taskett |
| 5,918,216 A | 6/1999 | Miksovsky et al. | 5,991,750 A | 11/1999 | Watson |
| 5,920,058 A | 7/1999 | Weber et al. | 5,995,014 A | 11/1999 | DiMaria |
| 5,920,628 A | 7/1999 | Indeck et al. | 5,996,076 A | 11/1999 | Rowney et al. |
| 5,920,629 A | 7/1999 | Rosen | 5,999,914 A | 12/1999 | Blinn et al. |
| 5,920,847 A | 7/1999 | Kolling et al. | 6,000,832 A | 12/1999 | Franklin et al. |
| 5,923,734 A | 7/1999 | Taskett | 6,002,438 A | 12/1999 | Hocevar et al. |
| 5,923,884 A | 7/1999 | Peyret et al. | 6,002,767 A | 12/1999 | Kramer |
| 5,924,080 A | 7/1999 | Johnson | 6,003,014 A | 12/1999 | Lee et al. |
| 5,924,624 A | 7/1999 | Martin | 6,005,942 A | 12/1999 | Chan et al. |
| 5,928,788 A | 7/1999 | Riedl | 6,006,216 A | 12/1999 | Griffin et al. |
| 5,929,801 A | 7/1999 | Aslanidis et al. | 6,006,988 A | 12/1999 | Behrmann et al. |
| 5,930,767 A | 7/1999 | Reber et al. | 6,009,412 A | 12/1999 | Storey |
| 5,930,777 A | 7/1999 | Barber | 6,011,487 A | 1/2000 | Plocher |
| 5,931,917 A | 8/1999 | Nguyen et al. | 6,012,039 A | 1/2000 | Hoffman et al. |
| 5,932,870 A | 8/1999 | Berson | 6,012,049 A | 1/2000 | Kawan |
| 5,933,328 A | 8/1999 | Wallace et al. | 6,012,143 A | 1/2000 | Tanaka |
| 5,933,624 A | 8/1999 | Balmer | 6,012,636 A | 1/2000 | Smith |
| 5,936,226 A | 8/1999 | Aucsmith | 6,014,634 A | 1/2000 | Scroggie et al. |
| 5,936,227 A | 8/1999 | Truggelmann et al. | 6,014,635 A | 1/2000 | Harris et al. |
| 5,938,010 A | 8/1999 | Osterbye | 6,014,636 A | 1/2000 | Reeder |
| 5,942,761 A | 8/1999 | Tuli | 6,014,645 A | 1/2000 | Cunningham |
| 5,943,624 A | 8/1999 | Fox et al. | 6,014,646 A | 1/2000 | Vallee et al. |
| 5,945,653 A | 8/1999 | Walker et al. | 6,014,648 A | 1/2000 | Brennan |
| 5,948,116 A | 9/1999 | Aslanidis et al. | 6,014,650 A | 1/2000 | Zampese |
| 5,949,044 A | 9/1999 | Walker et al. | 6,014,748 A | 1/2000 | Tushi et al. |
| 5,949,335 A | 9/1999 | Maynard | 6,016,476 A | 1/2000 | Maes et al. |
| 5,949,876 A | 9/1999 | Ginter et al. | 6,016,482 A | 1/2000 | Molinari et al. |
| 5,950,174 A | 9/1999 | Brendzel | 6,016,484 A | 1/2000 | Williams et al. |
| 5,950,179 A | 9/1999 | Buchanan et al. | 6,018,717 A | 1/2000 | Lee et al. |
| 5,953,512 A | 9/1999 | Cai et al. | 6,018,718 A | 1/2000 | Walker et al. |
| 5,953,710 A | 9/1999 | Fleming | RE036,580 E | 2/2000 | Bogosian, Jr. |
| 5,955,717 A | 9/1999 | Vanstone | 6,021,943 A | 2/2000 | Chastain |
| 5,955,951 A | 9/1999 | Wischerop et al. | 6,023,510 A | 2/2000 | Epstein |
| 5,955,969 A | 9/1999 | d'Hont | 6,024,286 A | 2/2000 | Bradley et al. |
| 5,956,024 A | 9/1999 | Strickland et al. | 6,024,385 A | 2/2000 | Goda |
| 5,956,693 A | 9/1999 | Geerlings | 6,025,283 A | 2/2000 | Roberts |
| 5,956,699 A | 9/1999 | Wong et al. | 6,027,028 A | 2/2000 | Pieterse et al. |
| 5,958,004 A | 9/1999 | Helland et al. | 6,029,147 A | 2/2000 | Horadan et al. |
| 5,960,411 A | 9/1999 | Hartman et al. | 6,029,149 A | 2/2000 | Dykstra et al. |
| 5,960,416 A | 9/1999 | Block | 6,029,150 A | 2/2000 | Kravitz |
| 5,963,915 A | 10/1999 | Kirsch | 6,029,175 A | 2/2000 | Chow |
| 5,963,924 A | 10/1999 | Williams et al. | 6,029,890 A | 2/2000 | Austin |
| 5,966,697 A | 10/1999 | Fergerson et al. | 6,029,892 A | 2/2000 | Miyake |
| 5,968,570 A | 10/1999 | Paulucci | 6,032,136 A | 2/2000 | Brake, Jr. et al. |
| 5,969,318 A | 10/1999 | Mackenthun | 6,032,866 A | 3/2000 | Knighton et al. |
| 5,970,148 A | 10/1999 | Meier | 6,036,100 A | 3/2000 | Asami |
| 5,970,470 A | 10/1999 | Walker et al. | 6,038,292 A | 3/2000 | Thomas |
| 5,970,471 A | 10/1999 | Hill | 6,038,551 A | 3/2000 | Barlow et al. |
| 5,970,472 A | 10/1999 | Allsop et al. | 6,038,584 A | 3/2000 | Balmer |
| 5,970,473 A | 10/1999 | Gerszberg et al. | 6,041,308 A | 3/2000 | Walker et al. |
| 5,970,475 A | 10/1999 | Barnes et al. | 6,041,410 A | 3/2000 | Hsu et al. |
| 5,971,276 A | 10/1999 | Sano et al. | 6,041,412 A | 3/2000 | Timson et al. |
| 5,973,475 A | 10/1999 | Combaluzier | 6,044,360 A | 3/2000 | Picciallo |
| 5,974,238 A | 10/1999 | Chase, Jr. | 6,044,388 A | 3/2000 | DeBellis et al. |
| RE36,365 E | 11/1999 | Levine et al. | 6,047,888 A | 4/2000 | Dethloff |
| 5,978,348 A | 11/1999 | Tamura | 6,050,494 A | 4/2000 | Song et al. |
| 5,978,840 A | 11/1999 | Nguyen et al. | 6,050,605 A | 4/2000 | Miklionis et al. |
| 5,979,757 A | 11/1999 | Tracy et al. | 6,052,675 A | 4/2000 | Checchio |
| 5,979,942 A | 11/1999 | Ivicic | 6,058,418 A | 5/2000 | Kobata |
| 5,982,293 A | 11/1999 | Everett et al. | 6,058,476 A | 5/2000 | Matsuzaki et al. |
| 5,983,200 A | 11/1999 | Slotznick | 6,060,815 A | 5/2000 | Nysen |
| 5,983,207 A | 11/1999 | Turk et al. | 6,061,344 A | 5/2000 | Wood, Jr. |
| 5,983,208 A | 11/1999 | Haller et al. | 6,061,789 A | 5/2000 | Hauser et al. |
| 5,984,180 A | 11/1999 | Albrecht | 6,064,320 A | 5/2000 | d'Hont et al. |
| 5,987,140 A | 11/1999 | Rowney et al. | 6,064,751 A | 5/2000 | Smithies et al. |
| 5,987,155 A | 11/1999 | Dunn et al. | 6,064,981 A | 5/2000 | Barni et al. |
| 5,987,498 A | 11/1999 | Athing et al. | 6,065,675 A | 5/2000 | Teicher |
| 5,988,497 A | 11/1999 | Wallace | 6,068,184 A | 5/2000 | Barnett |
| 5,988,510 A | 11/1999 | Tuttle | 6,068,193 A | 5/2000 | Kreft |
| 5,989,950 A | 11/1999 | Wu | 6,070,003 A | 5/2000 | Gove et al. |

| | | | | | |
|---|---|---|---|---|---|
| 6,070,150 A | 5/2000 | Remington et al. | 6,148,484 A | 11/2000 | Andreae, Jr. |
| 6,070,154 A | 5/2000 | Tavor et al. | 6,154,879 A | 11/2000 | Pare et al. |
| 6,072,870 A | 6/2000 | Nguyen et al. | 6,155,168 A | 12/2000 | Sakamoto |
| 6,073,112 A | 6/2000 | Geerlings | 6,157,824 A | 12/2000 | Bailey |
| 6,073,236 A | 6/2000 | Kusakabe et al. | 6,163,771 A | 12/2000 | Walker et al. |
| 6,073,840 A | 6/2000 | Marion | 6,167,236 A | 12/2000 | Kaiser et al. |
| 6,076,078 A | 6/2000 | Camp et al. | 6,168,083 B1 | 1/2001 | Berger et al. |
| 6,076,296 A | 6/2000 | Schaeffer | 6,171,138 B1 | 1/2001 | Lefebvre et al. |
| 6,078,888 A | 6/2000 | Johnson, Jr. | 6,173,269 B1 | 1/2001 | Solokl et al. |
| 6,078,906 A | 6/2000 | Huberman | 6,173,272 B1 | 1/2001 | Thomas et al. |
| 6,078,908 A | 6/2000 | Schmitz | 6,173,897 B1 | 1/2001 | Halpern |
| 6,081,790 A | 6/2000 | Rosen | 6,173,898 B1 | 1/2001 | Mande |
| RE36,788 E | 7/2000 | Mansvelt et al. | 6,173,899 B1 | 1/2001 | Rozin |
| 6,082,422 A | 7/2000 | Kaminski | 6,177,859 B1 | 1/2001 | Tuttle et al. |
| 6,084,967 A | 7/2000 | Kennedy et al. | 6,177,860 B1 | 1/2001 | Cromer et al. |
| 6,085,976 A | 7/2000 | Sehr | 6,179,205 B1 | 1/2001 | Sloan |
| 6,086,971 A | 7/2000 | Haas et al. | 6,179,206 B1 | 1/2001 | Matsumori |
| 6,088,683 A | 7/2000 | Jalili | 6,181,287 B1 | 1/2001 | Beigel |
| 6,088,686 A | 7/2000 | Walker et al. | 6,182,895 B1 | 2/2001 | Albrecht |
| 6,088,717 A | 7/2000 | Reed et al. | 6,184,788 B1 | 2/2001 | Middlemiss et al. |
| 6,088,755 A | 7/2000 | Kobayashi et al. | 6,185,307 B1 | 2/2001 | Johnson |
| 6,088,797 A | 7/2000 | Rosen | 6,188,994 B1 | 2/2001 | Egendorf |
| 6,089,611 A | 7/2000 | Blank | 6,189,779 B1 | 2/2001 | Verdicchio et al. |
| 6,091,835 A * | 7/2000 | Smithies et al. .............. 382/115 | 6,189,787 B1 | 2/2001 | Dorf |
| 6,092,057 A | 7/2000 | Zimmerman et al. | 6,192,255 B1 | 2/2001 | Lewis et al. |
| 6,092,198 A | 7/2000 | Lanzy et al. | 6,195,006 B1 | 2/2001 | Bowers et al. |
| 6,095,413 A | 8/2000 | Tetro et al. | 6,196,465 B1 | 3/2001 | Awano |
| 6,095,567 A | 8/2000 | Buell | 6,197,396 B1 | 3/2001 | Haas et al. |
| 6,098,053 A | 8/2000 | Slater | 6,198,728 B1 | 3/2001 | Hulyalkar et al. |
| 6,098,879 A | 8/2000 | Terranova | 6,198,762 B1 | 3/2001 | Krasnov |
| 6,099,043 A | 8/2000 | Story | 6,198,875 B1 | 3/2001 | Edenson et al. |
| 6,100,804 A | 8/2000 | Brady et al. | 6,199,079 B1 | 3/2001 | Gupta et al. |
| 6,101,174 A | 8/2000 | Langston | 6,199,762 B1 | 3/2001 | Hohle |
| 6,101,477 A | 8/2000 | Hohle et al. | 6,200,272 B1 | 3/2001 | Linden |
| 6,102,162 A | 8/2000 | Teicher | 6,202,927 B1 | 3/2001 | Bashan et al. |
| 6,102,672 A | 8/2000 | Woollenweber | 6,205,151 B1 | 3/2001 | Quay et al. |
| 6,104,281 A | 8/2000 | Heinrich et al. | 6,206,293 B1 | 3/2001 | Gutman et al. |
| 6,104,311 A | 8/2000 | Lastinger | 6,213,390 B1 | 4/2001 | Oneda |
| 6,104,922 A | 8/2000 | Baumann | 6,213,391 B1 | 4/2001 | Lewis |
| 6,105,008 A | 8/2000 | Davis et al. | 6,215,437 B1 | 4/2001 | Schurmann et al. |
| 6,105,013 A | 8/2000 | Curry et al. | 6,216,219 B1 | 4/2001 | Cai et al. |
| 6,105,865 A | 8/2000 | Hardesty | 6,219,439 B1 | 4/2001 | Burger |
| 6,107,920 A | 8/2000 | Eberhardt et al. | 6,219,639 B1 | 4/2001 | Bakis et al. |
| 6,108,641 A | 8/2000 | Kenna et al. | 6,220,510 B1 | 4/2001 | Everett et al. |
| 6,109,525 A | 8/2000 | Blomqvist et al. | 6,222,914 B1 | 4/2001 | McMullin |
| 6,112,152 A | 8/2000 | Tuttle | D442,627 S | 5/2001 | Webb et al. |
| 6,112,191 A | 8/2000 | Burke | D442,629 S | 5/2001 | Webb et al. |
| 6,112,984 A | 9/2000 | Snavely | 6,223,977 B1 | 5/2001 | Hill |
| 6,115,040 A | 9/2000 | Bladow et al. | 6,223,984 B1 | 5/2001 | Renner et al. |
| 6,115,360 A | 9/2000 | Quay et al. | 6,224,109 B1 | 5/2001 | Yang |
| 6,115,458 A | 9/2000 | Taskett | 6,226,382 B1 | 5/2001 | M'Raihi et al. |
| 6,116,423 A | 9/2000 | Troxtell, Jr. et al. | 6,227,424 B1 | 5/2001 | Roegner |
| 6,116,505 A | 9/2000 | Withrow | 6,227,447 B1 | 5/2001 | Campisano |
| 6,116,655 A | 9/2000 | Thouin et al. | 6,230,270 B1 | 5/2001 | Laczko, Sr. |
| 6,116,736 A | 9/2000 | Stark et al. | 6,232,917 B1 | 5/2001 | Baumer et al. |
| 6,118,189 A | 9/2000 | Flaxl | 6,233,348 B1 | 5/2001 | Fujii et al. |
| 6,120,461 A | 9/2000 | Smyth | 6,233,683 B1 | 5/2001 | Chan et al. |
| 6,121,544 A | 9/2000 | Petsinger | 6,237,848 B1 | 5/2001 | Everett |
| 6,122,625 A | 9/2000 | Rosen | 6,239,675 B1 | 5/2001 | Flaxl |
| 6,123,223 A | 9/2000 | Watkins | 6,240,187 B1 | 5/2001 | Lewis |
| 6,125,352 A | 9/2000 | Franklin et al. | 6,240,989 B1 | 6/2001 | Masoud |
| D432,939 S | 10/2000 | Hooglander | 6,247,030 B1 | 6/2001 | Suzuki |
| 6,128,604 A | 10/2000 | Sakamaki et al. | 6,248,199 B1 | 6/2001 | Smulson |
| 6,129,274 A | 10/2000 | Suzuki | 6,248,314 B1 | 6/2001 | Nakashimada et al. |
| 6,130,623 A | 10/2000 | MacLellan et al. | 6,250,554 B1 | 6/2001 | Leo et al. |
| 6,133,834 A | 10/2000 | Eberth et al. | 6,250,557 B1 | 6/2001 | Forslund et al. |
| 6,138,913 A | 10/2000 | Cyr et al. | 6,255,031 B1 | 7/2001 | Yao et al. |
| 6,138,917 A | 10/2000 | Chapin, Jr. | 6,257,486 B1 * | 7/2001 | Teicher et al. ............... 235/380 |
| 6,141,651 A | 10/2000 | Riley et al. | 6,259,769 B1 | 7/2001 | Page et al. |
| 6,141,752 A | 10/2000 | Dancs et al. | 6,260,026 B1 | 7/2001 | Tomida et al. |
| 6,144,916 A | 11/2000 | Wood et al. | 6,260,088 B1 | 7/2001 | Gove et al. |
| 6,144,948 A | 11/2000 | Walker et al. | 6,263,316 B1 | 7/2001 | Khan et al. |
| 6,148,093 A | 11/2000 | McConnell et al. | 6,263,446 B1 | 7/2001 | Kausik et al. |

| | | |
|---|---|---|
| 6,264,106 B1 | 7/2001 | Bridgelall |
| 6,265,977 B1 | 7/2001 | Vega et al. |
| 6,266,754 B1 | 7/2001 | Laczko, Sr. et al. |
| 6,267,292 B1 | 7/2001 | Walker et al. |
| 6,268,788 B1 | 7/2001 | Gray |
| 6,269,348 B1 | 7/2001 | Pare, Jr. et al. |
| 6,273,335 B1 | 8/2001 | Sloan |
| 6,277,232 B1 | 8/2001 | Wang et al. |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,290,137 B1 | 9/2001 | Kiekhaefer |
| 6,293,462 B1 | 9/2001 | Gangi |
| 6,295,522 B1 | 9/2001 | Boesch |
| 6,296,188 B1 | 10/2001 | Kiekhaefer |
| 6,297,727 B1 | 10/2001 | Nelson, Jr. |
| 6,304,223 B1 | 10/2001 | Hilton et al. |
| 6,307,956 B1 * | 10/2001 | Black .................. 382/124 |
| 6,309,098 B1 | 10/2001 | Wong |
| 6,315,193 B1 | 11/2001 | Hogan |
| 6,315,195 B1 | 11/2001 | Ramacchandran |
| 6,315,206 B1 | 11/2001 | Hansen et al. |
| 6,317,721 B1 | 11/2001 | Hurta et al. |
| 6,317,750 B1 | 11/2001 | Tortolani et al. |
| 6,317,755 B1 | 11/2001 | Rakers et al. |
| 6,318,636 B1 | 11/2001 | Reynolds et al. |
| 6,323,566 B1 | 11/2001 | Meier |
| 6,325,285 B1 | 12/2001 | Baratelli |
| 6,325,293 B1 | 12/2001 | Moreno |
| 6,326,934 B1 | 12/2001 | Kinzie |
| 6,327,573 B1 | 12/2001 | Walker et al. |
| 6,327,578 B1 | 12/2001 | Linehan |
| 6,329,920 B1 | 12/2001 | Morrison et al. |
| 6,330,544 B1 | 12/2001 | Walker et al. |
| 6,331,972 B1 | 12/2001 | Harris et al. |
| 6,332,134 B1 | 12/2001 | Foster |
| 6,332,193 B1 | 12/2001 | Glass et al. |
| D453,160 S | 1/2002 | Pentz et al. |
| D453,161 S | 1/2002 | Pentz |
| 6,336,095 B1 | 1/2002 | Rosen |
| 6,338,048 B1 | 1/2002 | Mori |
| 6,339,384 B1 | 1/2002 | Valdes-Rodriguez |
| 6,342,844 B1 | 1/2002 | Rozin |
| D453,337 S | 2/2002 | Pentz et al. |
| D453,338 S | 2/2002 | Pentz et al. |
| D453,516 S | 2/2002 | Pentz |
| D454,910 S | 3/2002 | Smith et al. |
| 6,353,420 B1 | 3/2002 | Chung |
| 6,353,811 B1 | 3/2002 | Weissman |
| 6,360,953 B1 | 3/2002 | Lin et al. |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,378,073 B1 | 4/2002 | Davis et al. |
| D457,556 S | 5/2002 | Hochschild |
| 6,386,444 B1 | 5/2002 | Sullivan |
| 6,388,533 B2 | 5/2002 | Swoboda |
| 6,390,375 B2 | 5/2002 | Kayanakis |
| 6,397,198 B1 | 5/2002 | Hoffman et al. |
| 6,400,272 B1 | 6/2002 | Holtzman et al. |
| 6,402,026 B1 | 6/2002 | Schwier |
| 6,402,028 B1 | 6/2002 | Graham, Jr., et al. |
| 6,404,341 B1 | 6/2002 | Reid |
| 6,406,935 B2 | 6/2002 | Kayanakis et al. |
| 6,411,611 B1 | 6/2002 | Van der Tuijn |
| D460,455 S | 7/2002 | Pentz |
| 6,415,978 B1 | 7/2002 | McAllister |
| 6,419,158 B2 | 7/2002 | Hooglander |
| 6,422,650 B1 | 7/2002 | Goetz et al. |
| 6,422,462 B1 | 7/2002 | Cohen |
| 6,422,464 B1 | 7/2002 | Terranova |
| 6,422,472 B1 | 7/2002 | Thevenot et al. |
| 6,424,029 B1 | 7/2002 | Giesler |
| 6,424,249 B1 | 7/2002 | Houvener |
| RE37,822 E | 8/2002 | Anthonyson |
| D461,477 S | 8/2002 | Pentz |
| 6,427,910 B1 | 8/2002 | Barnes et al. |
| 6,434,159 B1 | 8/2002 | Woodward et al. |
| 6,435,415 B1 | 8/2002 | Catte |
| 6,438,235 B2 | 8/2002 | Sims, III |
| 6,439,455 B1 | 8/2002 | Everett et al. |
| 6,442,532 B1 | 8/2002 | Kawan |
| D462,965 S | 9/2002 | Pentz |
| D462,966 S | 9/2002 | Pentz et al. |
| 6,445,794 B1 | 9/2002 | Shefi |
| 6,446,862 B1 | 9/2002 | Mann |
| 6,457,000 B1 | 9/2002 | Witkowski et al. |
| 6,457,996 B1 | 10/2002 | Shih |
| 6,460,696 B1 | 10/2002 | Meyer |
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,825 B1 | 11/2002 | Sharma et al. |
| 6,480,869 B1 | 11/2002 | Fujioka |
| 6,481,621 B1 | 11/2002 | Herrendoerfer et al. |
| 6,481,623 B1 | 11/2002 | Grant et al. |
| 6,481,632 B2 | 11/2002 | Wentker et al. |
| 6,483,427 B1 | 11/2002 | Werb |
| 6,483,477 B1 | 11/2002 | Plonka |
| 6,483,929 B1 | 11/2002 | Murakami et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,491,639 B1 | 12/2002 | Turcott |
| 6,494,367 B1 | 12/2002 | Zacharias |
| 6,494,380 B2 | 12/2002 | Jarosz |
| 6,496,594 B1 | 12/2002 | Prokoski |
| 6,501,832 B1 | 12/2002 | Saylor et al. |
| 6,505,772 B1 | 1/2003 | Mollett et al. |
| 6,507,662 B1 * | 1/2003 | Brooks .................. 382/115 |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,523,292 B2 | 2/2003 | Slavik |
| 6,529,880 B1 | 3/2003 | McKeen et al. |
| 6,535,726 B1 | 3/2003 | Johnson |
| 6,539,101 B1 | 3/2003 | Black |
| 6,546,373 B1 | 4/2003 | Cerra |
| 6,547,133 B1 | 4/2003 | DeVries, Jr. et al. |
| 6,549,912 B1 | 4/2003 | Chen |
| D474,234 S | 5/2003 | Nelms et al. |
| 6,560,581 B1 | 5/2003 | Fox et al. |
| 6,575,361 B1 | 6/2003 | Graves et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,588,673 B1 | 7/2003 | Chan et al. |
| 6,589,119 B1 | 7/2003 | Orus et al. |
| 6,591,249 B2 | 7/2003 | Zoka |
| 6,598,024 B1 | 7/2003 | Walker et al. |
| 6,601,622 B1 | 8/2003 | Young |
| 6,601,759 B2 | 8/2003 | Fife et al. |
| 6,601,762 B2 | 8/2003 | Piotrowski |
| 6,608,551 B1 | 8/2003 | Anderson et al. |
| 6,608,995 B1 | 8/2003 | Kawasaki et al. |
| 6,609,655 B1 | 8/2003 | Harrell |
| 6,609,656 B1 | 8/2003 | Elledge |

| | | |
|---|---|---|
| 6,609,658 B1 | 8/2003 | Sehr |
| 6,623,039 B2 | 9/2003 | Thompson et al. |
| 6,626,356 B2 | 9/2003 | Davenport et al. |
| 6,628,961 B1 | 9/2003 | Ho et al. |
| 6,629,591 B1 | 10/2003 | Griswold et al. |
| 6,631,849 B2 | 10/2003 | Blossom |
| 6,636,620 B1 | 10/2003 | Hoshino |
| 6,636,833 B1 | 10/2003 | Flitcroft et al. |
| 6,644,551 B2 | 11/2003 | Clayman et al. |
| 6,650,887 B2 | 11/2003 | McGregor et al. |
| 6,651,168 B1 | 11/2003 | Kao et al. |
| 6,651,813 B2 | 11/2003 | Vallans et al. |
| 6,651,892 B2 | 11/2003 | Hooglander |
| 6,657,614 B1 | 12/2003 | Ito et al. |
| 6,662,166 B2 | 12/2003 | Pare, Jr. et al. |
| 6,665,405 B1 | 12/2003 | Lenstra |
| 6,669,086 B2 | 12/2003 | Abdi et al. |
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,681,926 B2 | 1/2004 | De Volpi |
| 6,684,269 B2 | 1/2004 | Wagner |
| 6,685,089 B2 | 2/2004 | Terranova et al. |
| 6,686,847 B1 | 2/2004 | Mittler |
| 6,687,714 B1 | 2/2004 | Kogen et al. |
| 6,687,875 B1 | 2/2004 | Suzuki |
| 6,690,930 B1 | 2/2004 | Dupre |
| 6,693,513 B2 | 2/2004 | Tuttle |
| 6,697,947 B1 | 2/2004 | Matyas, Jr. et al. |
| 6,703,918 B1 | 3/2004 | Kita |
| 6,704,039 B2 | 3/2004 | Pena |
| 6,704,608 B1 | 3/2004 | Azuma |
| 6,705,530 B2 | 3/2004 | Kiekhaefer |
| 6,708,375 B1 | 3/2004 | Johnson |
| 6,711,262 B1 | 3/2004 | Vatanen |
| 6,725,202 B1 | 4/2004 | Hurta et al. |
| 6,732,919 B2 | 5/2004 | Macklin et al. |
| 6,732,936 B1 | 5/2004 | Kiekhaefer |
| 6,735,081 B1 | 5/2004 | Bishop et al. |
| 6,742,120 B1 | 5/2004 | Markakis et al. |
| 6,747,546 B1 | 6/2004 | Hikita et al. |
| 6,749,123 B2 | 6/2004 | Lasch et al. |
| 6,751,805 B1 | 6/2004 | Austion |
| 6,760,581 B2 | 7/2004 | Dutta |
| 6,763,500 B2 | 7/2004 | Black et al. |
| 6,764,014 B2 | 7/2004 | Lasch et al. |
| 6,765,470 B2 | 7/2004 | Shinzaki |
| 6,766,952 B2 | 7/2004 | Luu |
| 6,769,718 B1 | 8/2004 | Warther et al. |
| 6,771,981 B1 | 8/2004 | Zalewski et al. |
| 6,786,400 B1 | 9/2004 | Bucci |
| 6,789,012 B1 | 9/2004 | Childs et al. |
| 6,789,733 B2 | 9/2004 | Terranova et al. |
| 6,793,141 B1 | 9/2004 | Graham |
| 6,799,726 B2 | 10/2004 | Stockhammer |
| 6,816,058 B2 | 11/2004 | McGregor et al. |
| 6,819,219 B1 | 11/2004 | Bolle et al. |
| 6,823,910 B1 | 11/2004 | Elnekaveh |
| 6,830,193 B2 | 12/2004 | Tanaka |
| 6,834,270 B1 | 12/2004 | Pagani et al. |
| 6,834,795 B1 | 12/2004 | Rasmussen et al. |
| 6,842,106 B2 | 1/2005 | Hughes et al. |
| 6,843,415 B2 | 1/2005 | Vogler |
| 6,845,863 B1 | 1/2005 | Riley |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,873,974 B1 | 3/2005 | Schutzer |
| 6,877,097 B2 | 4/2005 | Hamid et al. |
| 6,883,715 B1 | 4/2005 | Fruhauf et al. |
| 6,895,310 B1 | 5/2005 | Kolls |
| 6,898,299 B1 | 5/2005 | Brooks |
| H2120 H | 7/2005 | Cudlitz |
| 6,914,517 B2 | 7/2005 | Kinsella |
| 6,915,277 B1 | 7/2005 | Manchester et al. |
| 6,920,560 B2 | 7/2005 | Wallace |
| 6,924,729 B1 | 8/2005 | Aschauer et al. |
| 6,925,439 B1 | 8/2005 | Pitroda |
| 6,925,565 B2 | 8/2005 | Black |
| 6,928,181 B2 | 8/2005 | Brooks |
| 6,931,538 B1 | 8/2005 | Sawaguchi |
| 6,934,861 B2 | 8/2005 | Haala |
| D509,243 S | 9/2005 | Hunter, Jr. et al. |
| 6,940,461 B2 | 9/2005 | Nantz et al. |
| 6,944,402 B1 | 9/2005 | Baker et al. |
| 6,944,768 B2 | 9/2005 | Siegel et al. |
| 6,959,874 B2 | 11/2005 | Bardwell |
| 6,961,448 B2 | 11/2005 | Nichols et al. |
| 6,970,583 B2 | 11/2005 | Black |
| 6,978,369 B2 | 12/2005 | Wheeler et al. |
| 6,978,933 B2 | 12/2005 | Yap et al. |
| 6,986,099 B2 | 1/2006 | Todd |
| 6,990,480 B1 | 1/2006 | Burt |
| 6,994,262 B1 | 2/2006 | Warther |
| 7,003,497 B2 | 2/2006 | Maes |
| 7,003,501 B2 | 2/2006 | Ostroff |
| 7,004,385 B1 | 2/2006 | Douglass |
| 7,006,993 B1 | 2/2006 | Cheong et al. |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,068,148 B2 | 6/2006 | Shanks et al. |
| 7,069,444 B2 | 6/2006 | Lowensohn et al. |
| 7,070,112 B2 | 7/2006 | Beenau et al. |
| 7,093,767 B2 | 8/2006 | Faenza et al. |
| 7,096,204 B1 | 8/2006 | Chen et al. |
| 7,096,494 B1 | 8/2006 | Chen |
| 7,100,821 B2 | 9/2006 | Rasti |
| 7,102,523 B2 | 9/2006 | Shanks et al. |
| 7,103,575 B1 | 9/2006 | Linehan |
| 7,108,190 B2 | 9/2006 | Burgan et al. |
| 7,119,659 B2 | 10/2006 | Bonalle et al. |
| 7,127,672 B1 | 10/2006 | Patterson et al. |
| 7,131,574 B1 | 11/2006 | Sciupac et al. |
| 7,132,946 B2 | 11/2006 | Waldner et al. |
| 7,136,835 B1 | 11/2006 | Flitcroft et al. |
| 7,150,407 B1 | 12/2006 | Berger et al. |
| 7,154,375 B2 | 12/2006 | Beenau et al. |
| 7,171,662 B1 | 1/2007 | Misra et al. |
| 7,172,112 B2 | 2/2007 | Bonalle et al. |
| 7,184,747 B2 | 2/2007 | Bogat |
| 7,213,748 B2 | 5/2007 | Tsuei et al. |
| 7,237,121 B2 | 6/2007 | Cammack et al. |
| 7,239,226 B2 | 7/2007 | Berardi et al. |
| 7,254,557 B1 | 8/2007 | Gillin et al. |
| 7,281,135 B2 | 10/2007 | Black |
| 7,287,271 B1 | 10/2007 | Riggins |
| 7,287,695 B2 | 10/2007 | Wankmueller |
| 7,299,364 B2 | 11/2007 | Noble et al. |
| 7,303,120 B2 | 12/2007 | Beenau et al. |
| 7,314,164 B2 | 1/2008 | Bonalle et al. |
| 7,314,165 B2 | 1/2008 | Bonalle et al. |
| 7,318,550 B2 | 1/2008 | Bonalle et al. |
| 7,325,724 B2 | 2/2008 | Bonalle et al. |
| 7,341,181 B2 | 3/2008 | Bonalle et al. |
| 7,363,504 B2 | 4/2008 | Bonalle et al. |
| 7,363,505 B2 | 4/2008 | Black |
| 7,419,093 B1 | 9/2008 | Blackson et al. |
| 2001/0003071 A1 | 6/2001 | Mansutti et al. |
| 2001/0013542 A1 | 8/2001 | Horowitz et al. |
| 2001/0013546 A1 | 8/2001 | Ross |
| 2001/0013551 A1 | 8/2001 | Ramachandran |

| | | | | | | |
|---|---|---|---|---|---|---|
| 2001/0017584 A1 | 8/2001 | Shinzaki | 2002/0113082 A1 | 8/2002 | Leatherman et al. |
| 2001/0018660 A1 | 8/2001 | Sehr | 2002/0116274 A1 | 8/2002 | Hind et al. |
| 2001/0022446 A1 | 9/2001 | Klure | 2002/0120584 A1 | 8/2002 | Hogan et al. |
| 2001/0024157 A1 | 9/2001 | Hansmann et al. | 2002/0125164 A1 | 9/2002 | Bassinson |
| 2001/0029493 A1 | 10/2001 | Pare et al. | 2002/0126010 A1 | 9/2002 | Trimble et al. |
| 2001/0030238 A1 | 10/2001 | Arisawa | 2002/0128977 A1 | 9/2002 | Nambiar et al. |
| 2001/0032192 A1 | 10/2001 | Putta et al. | 2002/0129248 A1 | 9/2002 | Wheeler et al. |
| 2001/0034565 A1 | 10/2001 | Leatherman | 2002/0130186 A1 | 9/2002 | Lasch et al. |
| 2001/0034623 A1 | 10/2001 | Chung | 2002/0130187 A1 | 9/2002 | Berg et al. |
| 2001/0034720 A1 | 10/2001 | Armes et al. | 2002/0131567 A1 | 9/2002 | Maginas |
| 2001/0036301 A1 | 11/2001 | Yamaguchi et al. | 2002/0133467 A1 | 9/2002 | Hobson et al. |
| 2001/0036835 A1 | 11/2001 | Leedom, Jr. | 2002/0133725 A1 | 9/2002 | Roy et al. |
| 2001/0039617 A1 | 11/2001 | Buhrlen et al. | 2002/0138351 A1 | 9/2002 | Houvener et al. |
| 2001/0040507 A1 | 11/2001 | Eckstein et al. | 2002/0138425 A1 | 9/2002 | Shimizu et al. |
| 2001/0045469 A1 | 11/2001 | Hooglander | 2002/0138438 A1 | 9/2002 | Bardwell |
| 2001/0049628 A1 | 12/2001 | Icho | 2002/0139839 A1* | 10/2002 | Catan ........................ 235/375 |
| 2001/0053239 A1 | 12/2001 | Takhar | 2002/0140542 A1 | 10/2002 | Prokoski et al. |
| 2001/0055411 A1 | 12/2001 | Black | 2002/0145043 A1 | 10/2002 | Challa et al. |
| 2002/0002468 A1 | 1/2002 | Spagna et al. | 2002/0147002 A1 | 10/2002 | Trop et al. |
| 2002/0005774 A1 | 1/2002 | Rudolph et al. | 2002/0147600 A1 | 10/2002 | Waters et al. |
| 2002/0011519 A1 | 1/2002 | Shults | 2002/0147913 A1 | 10/2002 | Lun Yip |
| 2002/0013765 A1 | 1/2002 | Shwartz | 2002/0148892 A1 | 10/2002 | Bardwell |
| 2002/0014529 A1 | 2/2002 | Tanaka | 2002/0149467 A1 | 10/2002 | Calvesio et al. |
| 2002/0014952 A1 | 2/2002 | Terranova | 2002/0152123 A1 | 10/2002 | Giordano et al. |
| 2002/0016687 A1 | 2/2002 | Felsenstein et al. | 2002/0153410 A1 | 10/2002 | Santini |
| 2002/0019807 A1 | 2/2002 | Halpern | 2002/0153424 A1 | 10/2002 | Li |
| 2002/0024590 A1 | 2/2002 | Pena | 2002/0154795 A1 | 10/2002 | Lee et al. |
| 2002/0026419 A1 | 2/2002 | Maritzen et al. | 2002/0158747 A1 | 10/2002 | McGregor et al. |
| 2002/0026575 A1 | 2/2002 | Wheeler et al. | 2002/0163421 A1 | 11/2002 | Wang et al. |
| 2002/0028704 A1 | 3/2002 | Bloomfield et al. | 2002/0165931 A1 | 11/2002 | Greer et al. |
| 2002/0030579 A1 | 3/2002 | Albert et al. | 2002/0166891 A1 | 11/2002 | Stoutenburg et al. |
| 2002/0030581 A1 | 3/2002 | Janiak et al. | 2002/0166897 A1 | 11/2002 | Hooglander |
| 2002/0035548 A1 | 3/2002 | Hogan et al. | 2002/0169673 A1 | 11/2002 | Prorock et al. |
| 2002/0036237 A1 | 3/2002 | Atherton et al. | 2002/0174067 A1 | 11/2002 | Hoffman et al. |
| 2002/0038818 A1 | 4/2002 | Zingher et al. | 2002/0175805 A9 | 11/2002 | Armstrong et al. |
| 2002/0040935 A1 | 4/2002 | Weyant | 2002/0176522 A1 | 11/2002 | Fan |
| 2002/0040936 A1 | 4/2002 | Wentker et al. | 2002/0178063 A1 | 11/2002 | Gravelle et al. |
| 2002/0041093 A1 | 4/2002 | Cox et al. | 2002/0178124 A1 | 11/2002 | Lewis |
| 2002/0042782 A1 | 4/2002 | Albazz et al. | 2002/0178369 A1 | 11/2002 | Black |
| 2002/0043566 A1 | 4/2002 | Goodman et al. | 2002/0179704 A1 | 12/2002 | Deaton |
| 2002/0046341 A1 | 4/2002 | Kazaks et al. | 2002/0185543 A1 | 12/2002 | Pentz et al. |
| 2002/0052839 A1 | 5/2002 | Takatori | 2002/0186133 A1 | 12/2002 | Loof |
| 2002/0062249 A1 | 5/2002 | Iannacci | 2002/0186838 A1 | 12/2002 | Brandys |
| 2002/0062284 A1 | 5/2002 | Kawan | 2002/0188501 A1 | 12/2002 | Lefkowith |
| 2002/0062291 A1 | 5/2002 | Zoka | 2002/0188854 A1 | 12/2002 | Heaven et al. |
| 2002/0066784 A1 | 6/2002 | Segal et al. | 2002/0188855 A1 | 12/2002 | Nakayama et al. |
| 2002/0072349 A1 | 6/2002 | Geiselman et al. | 2002/0190124 A1 | 12/2002 | Piotrowski |
| 2002/0073025 A1 | 6/2002 | Tanner et al. | 2002/0190125 A1 | 12/2002 | Stockhammer |
| 2002/0074398 A1 | 6/2002 | Lancos et al. | 2002/0191816 A1 | 12/2002 | Maritzen et al. |
| 2002/0077837 A1 | 6/2002 | Krueger et al. | 2002/0192856 A1 | 12/2002 | Halope et al. |
| 2002/0077895 A1 | 6/2002 | Howell | 2002/0193102 A1 | 12/2002 | Hyyppa et al. |
| 2002/0077992 A1 | 6/2002 | Tobin | 2002/0194137 A1 | 12/2002 | Park et al. |
| 2002/0079367 A1 | 6/2002 | Montani | 2002/0194303 A1 | 12/2002 | Suila et al. |
| 2002/0083320 A1 | 6/2002 | Vatanen | 2002/0194503 A1 | 12/2002 | Faith et al. |
| 2002/0087869 A1 | 7/2002 | Kim | 2002/0196963 A1 | 12/2002 | Bardwell |
| 2002/0092914 A1 | 7/2002 | Pentz et al. | 2003/0001006 A1 | 1/2003 | Lee |
| 2002/0095298 A1 | 7/2002 | Ewing | 2003/0001459 A1 | 1/2003 | Scott |
| 2002/0095343 A1 | 7/2002 | Barton et al. | 2003/0001755 A1 | 1/2003 | Tiernay et al. |
| 2002/0095389 A1 | 7/2002 | Gaines | 2003/0004866 A1 | 1/2003 | Huennekens et al. |
| 2002/0095587 A1 | 7/2002 | Doyle et al. | 2003/0004881 A1 | 1/2003 | Shinzaki et al. |
| 2002/0095588 A1 | 7/2002 | Shigematsu et al. | 2003/0005310 A1 | 1/2003 | Shinzaki |
| 2002/0097142 A1 | 7/2002 | Janiak et al. | 2003/0006901 A1 | 1/2003 | Kim et al. |
| 2002/0097144 A1 | 7/2002 | Collins et al. | 2003/0009382 A1 | 1/2003 | D'Arbeloff et al. |
| 2002/0099665 A1 | 7/2002 | Burger et al. | 2003/0014307 A1 | 1/2003 | Heng |
| 2002/0107007 A1 | 8/2002 | Gerson | 2003/0014357 A1 | 1/2003 | Chrisekos et al. |
| 2002/0107742 A1 | 8/2002 | Magill | 2003/0014891 A1 | 1/2003 | Nelms et al. |
| 2002/0107791 A1 | 8/2002 | Nobrega et al. | 2003/0018532 A1 | 1/2003 | Dudek et al. |
| 2002/0108062 A1 | 8/2002 | Nakajima et al. | 2003/0018567 A1 | 1/2003 | Flitcroft et al. |
| 2002/0109580 A1 | 8/2002 | Shreve et al. | 2003/0018893 A1 | 1/2003 | Hess et al. |
| 2002/0111210 A1 | 8/2002 | Luciano, Jr. et al. | 2003/0025600 A1 | 2/2003 | Blanchard |
| 2002/0111917 A1 | 8/2002 | Hoffman et al. | 2003/0028481 A1 | 2/2003 | Flitcroft et al. |
| 2002/0111919 A1 | 8/2002 | Weller et al. | 2003/0033697 A1 | 2/2003 | Hicks et al. |
| 2002/0112177 A1 | 8/2002 | Voltmer et al. | 2003/0037264 A1 | 2/2003 | Ezaki et al. |

| | | |
|---|---|---|
| 2003/0037851 A1 | 2/2003 | Hogganvik |
| 2003/0046228 A1 | 3/2003 | Berney |
| 2003/0046237 A1 | 3/2003 | Uberti |
| 2003/0046540 A1 | 3/2003 | Nakamura et al. |
| 2003/0047482 A1 | 3/2003 | Jones et al. |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0061172 A1 | 3/2003 | Robinson |
| 2003/0069828 A1 | 4/2003 | Blazey et al. |
| 2003/0069846 A1 | 4/2003 | Marcon |
| 2003/0074317 A1 | 4/2003 | Hofi |
| 2003/0086591 A1 | 5/2003 | Simon |
| 2003/0093187 A1 | 5/2003 | Walker |
| 2003/0097344 A1 | 5/2003 | Chaum et al. |
| 2003/0106935 A1 | 6/2003 | Burchette, Jr. |
| 2003/0112120 A1 | 6/2003 | K. |
| 2003/0112972 A1 | 6/2003 | Hattick et al. |
| 2003/0115126 A1 | 6/2003 | Pitroda |
| 2003/0120554 A1 | 6/2003 | Hogan et al. |
| 2003/0120626 A1 | 6/2003 | Piotrowski |
| 2003/0121969 A1 | 7/2003 | Wankmueller |
| 2003/0122120 A1 | 7/2003 | Brazis et al. |
| 2003/0123714 A1 | 7/2003 | O'Gorman et al. |
| 2003/0124294 A1 | 7/2003 | Hodson et al. |
| 2003/0125054 A1 | 7/2003 | Garcia |
| 2003/0130820 A1 | 7/2003 | Lane, III |
| 2003/0132132 A1 | 7/2003 | Small |
| 2003/0132284 A1 | 7/2003 | Reynolds et al. |
| 2003/0132297 A1 | 7/2003 | McCall et al. |
| 2003/0140228 A1 | 7/2003 | Binder |
| 2003/0149661 A1 | 8/2003 | Mitchell et al. |
| 2003/0149662 A1 | 8/2003 | Shore |
| 2003/0150911 A1 | 8/2003 | Joseph |
| 2003/0152252 A1 | 8/2003 | Kondo et al. |
| 2003/0153356 A1 | 8/2003 | Liu |
| 2003/0155416 A1 | 8/2003 | Macklin et al. |
| 2003/0159044 A1 | 8/2003 | Doyle et al. |
| 2003/0160074 A1 | 8/2003 | Pineda |
| 2003/0163699 A1 | 8/2003 | Pailles et al. |
| 2003/0167207 A1 | 9/2003 | Berardi et al. |
| 2003/0173408 A1 | 9/2003 | Mosher, Jr. et al. |
| 2003/0177102 A1 | 9/2003 | Robinson |
| 2003/0177347 A1 | 9/2003 | Schneier et al. |
| 2003/0178495 A1 | 9/2003 | Jones et al. |
| 2003/0183689 A1 | 10/2003 | Swift et al. |
| 2003/0183695 A1 | 10/2003 | Labrec et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0191949 A1 | 10/2003 | Odagawa |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0197593 A1 | 10/2003 | Siegel et al. |
| 2003/0200184 A1 | 10/2003 | Dominguez et al. |
| 2003/0208439 A1 | 11/2003 | Rast |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0223625 A1 | 12/2003 | Hillhouse et al. |
| 2003/0225623 A1 | 12/2003 | Wankmueller |
| 2003/0225713 A1 | 12/2003 | Atkinson et al. |
| 2003/0226041 A1 | 12/2003 | Palmer et al. |
| 2003/0227550 A1 | 12/2003 | Manico et al. |
| 2003/0229793 A1 | 12/2003 | McCall et al. |
| 2003/0230514 A1 | 12/2003 | Baker |
| 2003/0233334 A1 | 12/2003 | Smith |
| 2003/0236704 A1 | 12/2003 | Antonucci |
| 2004/0006497 A1 | 1/2004 | Nestor et al. |
| 2004/0006539 A1 | 1/2004 | Royer et al. |
| 2004/0010462 A1 | 1/2004 | Moon et al. |
| 2004/0011877 A1 | 1/2004 | Reppermund |
| 2004/0014457 A1 | 1/2004 | Stevens |
| 2004/0015451 A1 | 1/2004 | Sahota et al. |
| 2004/0016796 A1 | 1/2004 | Hanna et al. |
| 2004/0017934 A1 | 1/2004 | Kocher |
| 2004/0019494 A1 | 1/2004 | Ridgeway et al. |
| 2004/0019564 A1 | 1/2004 | Goldthwaite et al. |
| 2004/0020982 A1 | 2/2004 | Hoffman et al. |
| 2004/0021552 A1 | 2/2004 | Koo |
| 2004/0024694 A1 | 2/2004 | Lawrence et al. |
| 2004/0026518 A1 | 2/2004 | Kudo et al. |
| 2004/0029569 A1 | 2/2004 | Khan et al. |
| 2004/0030601 A1 | 2/2004 | Pond et al. |
| 2004/0031856 A1 | 2/2004 | Atsmon et al. |
| 2004/0039814 A1 | 2/2004 | Crabtree et al. |
| 2004/0039860 A1 | 2/2004 | Mills et al. |
| 2004/0041021 A1 | 3/2004 | Nugent, Jr. |
| 2004/0041690 A1 | 3/2004 | Yamagishi |
| 2004/0044627 A1 | 3/2004 | Russell et al. |
| 2004/0046034 A1 | 3/2004 | Ey Yamani et al. |
| 2004/0049687 A1 | 3/2004 | Orsini |
| 2004/0050930 A1 | 3/2004 | Rowe |
| 2004/0052406 A1 | 3/2004 | Brooks |
| 2004/0059923 A1 | 3/2004 | ShamRao |
| 2004/0061593 A1 | 4/2004 | Lane |
| 2004/0062423 A1 | 4/2004 | Doi |
| 2004/0073792 A1 | 4/2004 | Noble et al. |
| 2004/0083184 A1 | 4/2004 | Tsuei et al. |
| 2004/0083380 A1 | 4/2004 | Janke |
| 2004/0084524 A1 | 5/2004 | Ramachandran |
| 2004/0089724 A1 | 5/2004 | Lasch et al. |
| 2004/0098336 A1 | 5/2004 | Flink |
| 2004/0104266 A1 | 6/2004 | Bolle et al. |
| 2004/0104268 A1 | 6/2004 | Bailey et al. |
| 2004/0118930 A1 | 6/2004 | Berardi et al. |
| 2004/0124104 A1 | 7/2004 | DeVolpi |
| 2004/0124246 A1 | 7/2004 | Allen et al. |
| 2004/0127256 A1 | 7/2004 | Goldthwaite et al. |
| 2004/0129787 A1 | 7/2004 | Saito et al. |
| 2004/0131237 A1 | 7/2004 | Machida |
| 2004/0133787 A1 | 7/2004 | Doughty et al. |
| 2004/0136573 A1 | 7/2004 | Sato |
| 2004/0139021 A1 | 7/2004 | Reed et al. |
| 2004/0144841 A1 | 7/2004 | Tsukamoto et al. |
| 2004/0144846 A1 | 7/2004 | Lasch et al. |
| 2004/0149820 A1 | 8/2004 | Zuili |
| 2004/0155101 A1 | 8/2004 | Royer et al. |
| 2004/0158723 A1 | 8/2004 | Root |
| 2004/0160310 A1 | 8/2004 | Chen et al. |
| 2004/0161135 A1 | 8/2004 | Sano et al. |
| 2004/0165753 A1 | 8/2004 | Takhiri et al. |
| 2004/0169071 A1 | 9/2004 | Burgan et al. |
| 2004/0172541 A1 | 9/2004 | Ando et al. |
| 2004/0176071 A1 | 9/2004 | Gehrmann et al. |
| 2004/0177045 A1 | 9/2004 | Brown |
| 2004/0180657 A1 | 9/2004 | Yaqub et al. |
| 2004/0188519 A1 | 9/2004 | Cassone |
| 2004/0190757 A1 | 9/2004 | Murphy et al. |
| 2004/0193676 A1 | 9/2004 | Marks |
| 2004/0195314 A1 | 10/2004 | Lee |
| 2004/0199469 A1 | 10/2004 | Barillova et al. |
| 2004/0202354 A1 | 10/2004 | Togino |
| 2004/0208343 A1 | 10/2004 | Golden et al. |
| 2004/0215575 A1 | 10/2004 | Garrity |
| 2004/0222803 A1 | 11/2004 | Tartagni |
| 2004/0230488 A1 | 11/2004 | Beenau et al. |
| 2004/0232220 A1 | 11/2004 | Beenau et al. |
| 2004/0232224 A1 | 11/2004 | Beenau et al. |
| 2004/0233039 A1 | 11/2004 | Beenau et al. |
| 2004/0235450 A1 | 11/2004 | Rosenberg |
| 2004/0236680 A1 | 11/2004 | Luoffo et al. |

| | | | | | | |
|---|---|---|---|---|---|---|
| 2004/0236699 A1 | 11/2004 | Beenau et al. | 2005/0212657 A1 | 9/2005 | Simon |
| 2004/0236700 A1 | 11/2004 | Beenau et al. | 2005/0216424 A1 | 9/2005 | Gandre et al. |
| 2004/0236701 A1 | 11/2004 | Beenau et al. | 2005/0221853 A1 | 10/2005 | Silvester |
| 2004/0236819 A1 | 11/2004 | Anati et al. | 2005/0223230 A1 | 10/2005 | Zick |
| 2004/0239480 A1 | 12/2004 | Beenau et al. | 2005/0232471 A1 | 10/2005 | Baer |
| 2004/0240711 A1 | 12/2004 | Hamza et al. | 2005/0240778 A1 | 10/2005 | Saito |
| 2004/0255168 A1 | 12/2004 | Murashita et al. | 2005/0246292 A1 | 11/2005 | Sarcanin |
| 2004/0257196 A1 | 12/2004 | Kotzin | 2005/0251688 A1 | 11/2005 | Nanavati et al. |
| 2004/0258282 A1 | 12/2004 | Bjorn et al. | 2005/0261972 A1 | 11/2005 | Black |
| 2005/0001711 A1 | 1/2005 | Doughty et al. | 2005/0275505 A1 | 12/2005 | Himmelstein |
| 2005/0004921 A1 | 1/2005 | Beenau et al. | 2005/0278222 A1 | 12/2005 | Nortrup |
| 2005/0005172 A1 | 1/2005 | Haala | 2006/0000892 A1 | 1/2006 | Bonalle et al. |
| 2005/0011776 A1 | 1/2005 | Nagel | 2006/0000893 A1 | 1/2006 | Bonalle et al. |
| 2005/0017068 A1 | 1/2005 | Zalewski et al. | 2006/0000894 A1 | 1/2006 | Bonalle et al. |
| 2005/0018658 A1 | 1/2005 | Ikeda et al. | 2006/0000895 A1 | 1/2006 | Bonalle et al. |
| 2005/0020304 A1 | 1/2005 | Shinzaki | 2006/0000896 A1 | 1/2006 | Bonalle et al. |
| 2005/0021457 A1 | 1/2005 | Johnson et al. | 2006/0000897 A1 | 1/2006 | Bonalle et al. |
| 2005/0023157 A1 | 2/2005 | Logan | 2006/0000898 A1 | 1/2006 | Bonalle et al. |
| 2005/0033687 A1 | 2/2005 | Beenau et al. | 2006/0000899 A1 | 1/2006 | Bonalle et al. |
| 2005/0033688 A1 | 2/2005 | Peart et al. | 2006/0005022 A1 | 1/2006 | Wakamori et al. |
| 2005/0033689 A1 | 2/2005 | Bonalle et al. | 2006/0005042 A1 | 1/2006 | Black |
| 2005/0033992 A1 | 2/2005 | Inabe | 2006/0016868 A1 | 1/2006 | Bonalle et al. |
| 2005/0035192 A1 | 2/2005 | Bonalle et al. | 2006/0016869 A1 | 1/2006 | Bonalle et al. |
| 2005/0035847 A1 | 2/2005 | Bonalle et al. | 2006/0016871 A1 | 1/2006 | Bonalle et al. |
| 2005/0036665 A1 | 2/2005 | Higuchi | 2006/0016874 A1 | 1/2006 | Bonalle et al. |
| 2005/0038718 A1 | 2/2005 | Barnes et al. | 2006/0016875 A1 | 1/2006 | Bonalle et al. |
| 2005/0040221 A1 | 2/2005 | Schwarz, Jr. | 2006/0016877 A1 | 1/2006 | Bonalle et al. |
| 2005/0040272 A1 | 2/2005 | Argumedo et al. | 2006/0033609 A1 | 2/2006 | Bridgelall |
| 2005/0045718 A1 | 3/2005 | Bortolin et al. | 2006/0034492 A1 | 2/2006 | Siegel et al. |
| 2005/0050367 A1 | 3/2005 | Burger et al. | 2006/0066444 A1 | 3/2006 | Steeves |
| 2005/0054438 A1 | 3/2005 | Rothschild et al. | 2006/0069635 A1 | 3/2006 | Ram et al. |
| 2005/0058262 A1 | 3/2005 | Timmins et al. | 2006/0071756 A1 | 4/2006 | Steeves |
| 2005/0060233 A1 | 3/2005 | Bonalle et al. | 2006/0077034 A1 | 4/2006 | Hillier |
| 2005/0065842 A1 | 3/2005 | Summers | 2006/0080552 A1 | 4/2006 | Lauper |
| 2005/0065872 A1 | 3/2005 | Moebs et al. | 2006/0095369 A1 | 5/2006 | Hofi |
| 2005/0071231 A1 | 3/2005 | Beenau et al. | 2006/0104485 A1 | 5/2006 | Miller et al. |
| 2005/0087597 A1 | 4/2005 | Gotfried et al. | 2006/0123240 A1 | 6/2006 | Chaiken |
| 2005/0091325 A1 | 4/2005 | Kuwana et al. | 2006/0136336 A1 | 6/2006 | Drummond et al. |
| 2005/0097038 A1 | 5/2005 | Yu et al. | 2006/0156395 A1 | 7/2006 | Fontaine |
| 2005/0098621 A1 | 5/2005 | deSylva | 2006/0158434 A1 | 7/2006 | Zank et al. |
| 2005/0100199 A1 | 5/2005 | Boshra | 2006/0173291 A1 | 8/2006 | Glossop |
| 2005/0102524 A1 | 5/2005 | Haala | 2006/0173791 A1 | 8/2006 | Mann et al. |
| 2005/0103839 A1 | 5/2005 | Hewel | 2006/0177061 A1 | 8/2006 | Orsini et al. |
| 2005/0109836 A1 | 5/2005 | Ben-Aissa | 2006/0178937 A1 | 8/2006 | Rau et al. |
| 2005/0113137 A1 | 5/2005 | Rodriguez et al. | 2006/0190419 A1 | 8/2006 | Bunn et al. |
| 2005/0116024 A1 | 6/2005 | Beenau et al. | 2006/0202835 A1 | 9/2006 | Thibault |
| 2005/0119978 A1 | 6/2005 | Ates | 2006/0208066 A1 | 9/2006 | Finn et al. |
| 2005/0121512 A1 | 6/2005 | Wankmueller | 2006/0213986 A1 | 9/2006 | Register et al. |
| 2005/0122209 A1 | 6/2005 | Black | 2006/0229988 A1 | 10/2006 | Oshima et al. |
| 2005/0123137 A1 | 6/2005 | McCallum | 2006/0237528 A1 | 10/2006 | Bishop et al. |
| 2005/0125312 A1 | 6/2005 | Dearing et al. | 2006/0242423 A1 | 10/2006 | Kussmaul |
| 2005/0125317 A1 | 6/2005 | Winkelman, III et al. | 2006/0278723 A1 | 12/2006 | Dan et al. |
| 2005/0125343 A1 | 6/2005 | Mendelovich | 2007/0008131 A1 | 1/2007 | Doan et al. |
| 2005/0127164 A1 | 6/2005 | Wankmueller | 2007/0046468 A1 | 3/2007 | Davis |
| 2005/0137977 A1 | 6/2005 | Wankmueller | 2007/0057797 A1 | 3/2007 | Waldner et al. |
| 2005/0139669 A1 | 6/2005 | Arnouse | 2007/0075841 A1 | 4/2007 | Maltsev et al. |
| 2005/0144133 A1 | 6/2005 | Hoffman et al. | 2007/0112957 A1 | 5/2007 | Shastri et al. |
| 2005/0149358 A1 | 7/2005 | Sacco et al. | 2007/0119924 A1 | 5/2007 | Register et al. |
| 2005/0149926 A1 | 7/2005 | Saltz | 2007/0241861 A1 | 10/2007 | Venkatanna et al. |
| 2005/0160271 A9 | 7/2005 | Brundage et al. | 2007/0252001 A1 | 11/2007 | Kail et al. |
| 2005/0160790 A1 | 7/2005 | Tanaka et al. | 2007/0252010 A1 | 11/2007 | Gonzalez et al. |
| 2005/0165684 A1 | 7/2005 | Jensen et al. | 2007/0284432 A1 | 12/2007 | Abouyounes |
| 2005/0166062 A1 | 7/2005 | Sanchez-Cifuentes | 2007/0296544 A1 | 12/2007 | Beenau et al. |
| 2005/0169504 A1 | 8/2005 | Black | 2007/0296551 A1 | 12/2007 | Beenau et al. |
| 2005/0171787 A1 | 8/2005 | Zagami | 2007/0299782 A1 | 12/2007 | Beenau et al. |
| 2005/0171905 A1 | 8/2005 | Wankmueller | 2007/0299783 A1 | 12/2007 | Beenau et al. |
| 2005/0180618 A1 | 8/2005 | Black | 2008/0006691 A1 | 1/2008 | Bonalle et al. |
| 2005/0187883 A1 | 8/2005 | Bishop et al. | 2008/0008359 A1 | 1/2008 | Beenau et al. |
| 2005/0187916 A1 | 8/2005 | Levin et al. | 2008/0008363 A1 | 1/2008 | Bonalle et al. |
| 2005/0197923 A1 | 9/2005 | Kilner et al. | 2008/0010214 A1 | 1/2008 | Bonalle et al. |
| 2005/0203857 A1 | 9/2005 | Friedman | 2008/0011830 A1 | 1/2008 | Bonalle et al. |
| 2005/0207002 A1 | 9/2005 | Liu et al. | 2008/0011831 A1 | 1/2008 | Bonalle et al. |
| 2005/0211784 A1 | 9/2005 | Justin | 2008/0013796 A1 | 1/2008 | Bonalle et al. |

| | | | | | | |
|---|---|---|---|---|---|---|
| 2008/0013807 | A1 | 1/2008 | Bonalle et al. | JP | 63-071794 | 4/1988 |
| 2008/0015941 | A1 | 1/2008 | Beenau et al. | JP | 63-098689 | 4/1988 |
| 2008/0015992 | A1 | 1/2008 | Bonalle et al. | JP | 63-072721 | 5/1988 |
| 2008/0015993 | A1 | 1/2008 | Bonalle et al. | JP | 63-175987 | 7/1988 |
| 2008/0015994 | A1 | 1/2008 | Bonalle et al. | JP | 10302160 | 11/1988 |
| 2008/0016002 | A1 | 1/2008 | Beenau et al. | JP | 64-004934 | 1/1989 |
| 2008/0033722 | A1 | 2/2008 | Beenau et al. | JP | 64-087395 | 3/1989 |
| 2008/0067242 | A1 | 3/2008 | Bonalle et al. | JP | 64-087396 | 3/1989 |
| 2008/0072065 | A1 | 3/2008 | Bonalle et al. | JP | 64-087397 | 3/1989 |

FOREIGN PATENT DOCUMENTS

| | | |
|---|---|---|
| JP | 02-130737 | 5/1990 |
| JP | 02-252149 | 10/1990 |
| JP | 03-290780 | 12/1991 |
| CH | 689070 | 8/1997 |
| CH | 689680 | 8/1999 |
| JP | 42-005596 | 7/1992 |
| DE | 2847756 | 5/1980 |
| JP | 04-303692 | 10/1992 |
| DE | 3636921 | 5/1981 |
| JP | 05-069689 | 3/1993 |
| DE | 3941070 | 6/1991 |
| JP | 05-254283 | 10/1993 |
| DE | 4339460 | 11/1993 |
| JP | 06-183187 | 7/1994 |
| DE | 29702538 | 4/1997 |
| JP | 06-191137 | 7/1994 |
| DE | 19741726 | 9/1997 |
| JP | 06-234287 | 8/1994 |
| DE | 10203926 | 1/2002 |
| JP | 07-173358 | 7/1995 |
| EP | 0181770 | 5/1986 |
| JP | 07-205569 | 8/1995 |
| EP | 0343829 | 11/1989 |
| JP | 08-244385 | 9/1996 |
| EP | 0354817 | 2/1990 |
| JP | 08-324163 | 12/1996 |
| EP | 0358525 | 3/1990 |
| JP | 09-050505 | 2/1997 |
| EP | 0368570 | 5/1990 |
| JP | 09-052240 | 2/1997 |
| EP | 0388090 | 9/1990 |
| JP | 09-274640 | 10/1997 |
| EP | 0424726 | 10/1990 |
| JP | 10-129161 | 5/1998 |
| EP | 0403134 | 12/1990 |
| JP | 10-289296 | 10/1998 |
| EP | 0411602 | 2/1991 |
| JP | 10-334206 | 12/1998 |
| EP | 0473998 | 3/1992 |
| JP | 10-340231 | 12/1998 |
| EP | 0481388 | 4/1992 |
| JP | 11-175640 | 7/1999 |
| EP | 0531605 | 3/1993 |
| JP | 11-227367 | 8/1999 |
| EP | 0552047 | 7/1993 |
| JP | 11-353425 | 12/1999 |
| EP | 0560318 | 9/1993 |
| JP | 2000-011109 | 1/2000 |
| EP | 0568185 | 11/1993 |
| JP | 2000-015288 | 1/2000 |
| EP | 0657297 | 6/1995 |
| JP | 2000-040181 | 2/2000 |
| EP | 0721850 | 7/1996 |
| JP | 2000-048153 | 2/2000 |
| EP | 0735505 | 10/1996 |
| JP | 2000-067312 | 3/2000 |
| EP | 0780839 | 6/1997 |
| JP | 2000-163538 | 6/2000 |
| EP | 0789316 | 8/1997 |
| JP | 2000-177229 | 6/2000 |
| EP | 0854461 | 7/1998 |
| JP | 2000-194799 | 7/2000 |
| EP | 0866420 | 9/1998 |
| JP | 2000-207641 | 7/2000 |
| EP | 0894620 | 2/1999 |
| JP | 2000-222176 | 8/2000 |
| EP | 0916519 | 5/1999 |
| JP | 2000-252854 | 9/2000 |
| EP | 0917120 | 5/1999 |
| JP | 2001-005931 | 1/2001 |
| EP | 0927945 | 7/1999 |
| JP | 2001-504406 | 4/2001 |
| EP | 0933717 | 8/1999 |
| JP | 2001-134536 | 5/2001 |
| EP | 0949595 | 10/1999 |
| JP | 2001-160105 | 6/2001 |
| EP | 0956818 | 11/1999 |
| JP | 2001-283122 | 10/2001 |
| EP | 0959440 | 11/1999 |
| JP | 2001-315475 | 11/2001 |
| EP | 0984404 | 3/2000 |
| JP | 2002-032687 | 1/2002 |
| EP | 1016947 | 7/2000 |
| JP | 2002-109584 | 4/2002 |
| EP | 1017030 | 7/2000 |
| JP | 2002-133335 | 5/2002 |
| EP | 1039403 | 9/2000 |
| JP | 2002-133336 | 5/2002 |
| EP | 1104909 | 6/2001 |
| JP | 2002-157530 | 5/2002 |
| EP | 1113387 | 7/2001 |
| JP | 2002-163585 | 6/2002 |
| EP | 1115095 | 7/2001 |
| JP | 2002-183443 | 6/2002 |
| EP | 1199684 | 4/2002 |
| JP | 2002-274087 | 9/2002 |
| EP | 1251450 | 10/2002 |
| JP | 2003-288646 | 10/2003 |
| EP | 1345146 | 9/2003 |
| JP | 2004-164347 | 6/2004 |
| EP | 1610273 | 12/2005 |
| JP | 2004-348478 | 12/2004 |
| GB | 1371254 | 10/1974 |
| WO | WO 81/00776 | 3/1981 |
| GB | 2088110 | 6/1982 |
| WO | WO 89/03760 | 5/1989 |
| GB | 2108906 | 5/1983 |
| WO | WO 90/08661 | 8/1990 |
| GB | 2240948 | 8/1991 |
| WO | WO 91/08910 | 6/1991 |
| GB | 2281714 | 3/1995 |
| WO | WO 92/16913 | 10/1992 |
| GB | 2347537 | 9/2000 |
| WO | WO 95/32919 | 12/1995 |
| GB | 2350021 | 11/2000 |
| WO | WO 95/35546 | 12/1995 |
| GB | 2361790 | 10/2001 |
| WO | WO 96/06409 | 2/1996 |
| JP | 61-100436 | 5/1986 |
| WO | WO 96/18972 | 6/1996 |
| JP | 62-043774 | 3/1987 |
| WO | WO 97/09688 | 3/1997 |
| JP | 62-264999 | 11/1987 |
| WO | WO 97/40459 | 10/1997 |

| | | |
|---|---|---|
| WO | WO 98/21683 | 5/1998 |
| WO | WO 98/22291 | 5/1998 |
| WO | WO 98/45778 | 10/1998 |
| WO | WO 99/03057 | 1/1999 |
| WO | WO 99/12136 | 3/1999 |
| WO | WO 99/14055 | 3/1999 |
| WO | WO 99/21321 | 4/1999 |
| WO | WO 99/27492 | 6/1999 |
| WO | WO 99/40548 | 8/1999 |
| WO | WO 99/47983 | 9/1999 |
| WO | WO 99/49424 | 9/1999 |
| WO | WO 00/10144 | 2/2000 |
| WO | WO 00/38088 | 6/2000 |
| WO | WO 00/49586 | 8/2000 |
| WO | WO 00/73989 | 12/2000 |
| WO | WO 01/04825 | 1/2001 |
| WO | WO 01/13320 | 2/2001 |
| WO | WO 01/15098 | 3/2001 |
| WO | WO 01/18745 | 3/2001 |
| WO | WO 01/25872 | 4/2001 |
| WO | WO 01/43095 | 6/2001 |
| WO | WO 01/55955 | 8/2001 |
| WO | WO 01/72224 | 10/2001 |
| WO | WO 01/77856 | 10/2001 |
| WO | WO 01/78024 | 10/2001 |
| WO | WO 01/80473 | 10/2001 |
| WO | WO 01/86535 | 11/2001 |
| WO | WO 01/86599 | 11/2001 |
| WO | WO 01/90962 | 11/2001 |
| WO | WO 01/95243 | 12/2001 |
| WO | WO 02/01485 | 1/2002 |
| WO | WO 03/007623 | 1/2002 |
| WO | WO 02/13134 | 2/2002 |
| WO | WO 02/063545 | 8/2002 |
| WO | WO 02/065246 | 8/2002 |
| WO | WO 02/065404 | 8/2002 |
| WO | WO 02/067190 | 8/2002 |
| WO | WO 02/069221 | 9/2002 |
| WO | WO 02/073512 | 9/2002 |
| WO | WO 02/086665 | 10/2002 |
| WO | WO 02/091281 | 11/2002 |
| WO | WO 02/097575 | 12/2002 |
| WO | WO 02/101670 | 12/2002 |
| WO | WO 04/52657 | 6/2004 |

OTHER PUBLICATIONS

Examination Report dated Oct. 26, 2006 for EP03763325.2.
Office Action dated Aug. 3, 2006 in JP2004-562629.
Office Action dated Mar. 8, 2007 in JP2004-562629.
Final Office Action dated Oct. 4, 2007 in JP2004-562629.
ISR dated Apr. 22, 2004 for PCT/US03/21279.
Office Action dated Oct. 4, 2007 for JP2007-026166.
Non-Final Office Action issued Mar. 26, 2008 in U.S. Appl. No. 10/905,005.
Non-Final Office Action issued Nov. 1, 2006 in U.S. Appl. No. 10/905,006.
Notice of Allowance issued Jul. 12, 2007 in U.S. Appl. No. 10/905,006.
Non-Final Office Action issued Jun. 20, 2006 in U.S. Appl. No. 10/318,480.
Notice of Allowance issued Jan. 24, 2007 in U.S. Appl. No. 10/318,480.
Supplemental Notice of Allowance issued Mar. 13, 2007 in U.S. Appl. No. 10/318,480.
ISR dated Apr. 22, 2004 for PCT/US03/21447.
Non-Final Office Action issued Nov. 22, 2005 in U.S. Appl. No. 10/876,822.
Final Office Action issued Aug. 3, 2006 in U.S. Appl. No. 10/876,822.
Non-Final Office Action issued Feb. 6, 2007 in U.S. Appl. No. 10/876,822.
Final Office Action issued Jul. 18, 2007 in U.S. Appl. No. 10/876,822.
Non-Final Office Action issued Jan. 28, 2008 in U.S. Appl. No. 10/876,822.
Final Office Action issued Aug. 22, 2008 in U.S. Appl. No. 10/876,822.
Non-Final Office Action issued Mar. 23, 2006 in U.S. Appl. No. 10/318,432.
Restriction Requirement issued Jan. 17, 2007 in U.S. Appl. No. 10/318,432.
Non-Final Office Action issued May 1, 2007 in U.S. Appl. No. 10/318,432.
Non-Final Office Action issued Dec. 13, 2007 in U.S. Appl. No. 10/318,432.
Non-Final Office Action issued Jun. 27, 2008 in U.S. Appl. No. 10/318,432.
ISR dated Apr. 22, 2004 for PCT/US03/21280.
Non-Final Office Action issued Mar. 10, 2008 in U.S. Appl. No. 11/160,627.
Final Office Action issued Jun. 24, 2008 in U.S. Appl. No. 11/160,627.
Advisory Action issued Aug. 6, 2008 in U.S. Appl. No. 11/160,627.
Restriction Requirement issued Apr. 30, 2008 in U.S. Appl. No. 11/160,548.
Non-Final Office Action issued Aug. 21, 2008 in U.S. Appl. No. 11/160,548.
Non-Final Office Action issued Jul. 8, 2005 in U.S. Appl. No. 10/708,839.
Final Office Action issued Nov. 21, 2005 in U.S. Appl. No. 10/708,839.
Advisory Action issued Feb. 9, 2006 in U.S. Appl. No. 10/708,839.
Non-Final Office Action issued May 2, 2006 in U.S. Appl. No. 10/708,839.
Final Office Action issued Jan. 25, 2007 in U.S. Appl. No. 10/708,839.
Notice of Abandonment issued Oct. 11, 2007 in U.S. Appl. No. 10/708,839.
Non-Final Office Action issued Sep. 7, 2006 in U.S. Appl. No. 10/708,585.
Notice of Allowance issued May 11, 2007 in U.S. Appl. No. 10/708,585.
Non-Final Office Action issued Nov. 28, 2005 in U.S. Appl. No. 10/708,823.
Final Office Action issued May 11, 2007 in U.S. Appl. No. 10/708,823.
Notice of Abandonment issued Jan. 5, 2007 in U.S. Appl. No. 10/708,823.
Non-Final Office Action issued May 13, 2008 in U.S. Appl. No. 10/708,545.
ISR/WO dated Aug. 19, 2008 for PCT/US05/07905.
Non-Final Office Action issued Sep. 7, 2006 in U.S. Appl. No. 10/708,550.
Notice of Allowance issued May 11, 2007 in U.S. Appl. No. 10/708,550.
ISR/WO dated Feb. 16, 2007 for PCT/US05/36848.
IPRP (Ch 1) dated Apr. 26, 2007 for PCT/US05/36848.
Non-Final Office Action issued Apr. 4, 2007 in U.S. Appl. No. 10/711,965.
Non-Final Office Action issued Oct. 16, 2007 in U.S. Appl. No. 10/711,965.
Final Office Action issued Mar. 28, 2008 in U.S. Appl. No. 10/711,965.
Advisory Action issued Jul. 31, 2008 in U.S. Appl. No. 10/711,965.
Final Office Action issued Aug. 18, 2008 in U.S. Appl. No. 10/711,965.
Non-Final Office Action issued May 4, 2006 in U.S. Appl. No. 10/711,970.
Notice of Allowance issued Feb. 2, 2007 in U.S. Appl. No. 10/711,970.
ISR/WO dated Aug. 17, 2006 for PCT/US05/36828.
IPRP (Ch 1) dated Apr. 26, 2007 for PCT/US05/36828.
Non-Final Office Action issued Feb. 25, 2008 in U.S. Appl. No. 10/711,964.

Final Office Action issued Jun. 30, 2008 in U.S. Appl. No. 10/711,964.
Advisory Action issued Sep. 10, 2008 in U.S. Appl. No. 10/711,964.
Non-Final Office Action issued Oct. 3, 2006 in U.S. Appl. No. 10/711,966.
Final Office Action issued May 21, 2007 in U.S. Appl. No. 10/711,966.
Non-Final Office Action issued Dec. 11, 2007 in U.S. Appl. No. 10/711,966.
Non-Final Office Action issued Nov. 28, 2005 in U.S. Appl. No. 10/708,824.
Final Office Action issued May 17, 2006 in U.S. Appl. No. 10/708,824.
Notice of Abandonment issued Jan. 5, 2007 in U.S. Appl. No. 10/708,824.
Non-Final Office Action issued Dec. 13, 2005 in U.S. Appl. No. 10/708,825.
Final Office Action issued May 11, 2006 in U.S. Appl. No. 10/708,825.
Notice of Abandonment issued Jan. 25, 2007 in U.S. Appl. No. 10/708,825.
Non-Final Office Action issued Nov. 29, 2005 in U.S. Appl. No. 10/708,826.
Final Office Action issued May 17, 2006 in U.S. Appl. No. 10/708,826.
Notice of Abandonment issued Jan. 5, 2007 in U.S. Appl. No. 10/708,826.
Non-Final Office Action issued Jan. 10, 2006 in U.S. Appl. No. 10/708,827.
Final Office Action issued May 9, 2006 in U.S. Appl. No. 10/708,827.
Notice of Abandonment issued Jan. 5, 2007 in U.S. Appl. No. 10/708,827.
Non-Final Office Action issued Jan. 27, 2006 in U.S. Appl. No. 10/708,828.
Final Office Action issued Jul. 21, 2006 in U.S. Appl. No. 10/708,828.
Notice of Abandonment issued Mar. 22, 2007 in U.S. Appl. No. 10/708,828.
Non-Final Office Action issued Dec. 15, 2005 in U.S. Appl. No. 10/708,829.
Final Office Action issued May 25, 2006 in U.S. Appl. No. 10/708,829.
Notice of Abandonment issued Jan. 5, 2007 in U.S. Appl. No. 10/708,829.
Non-Final Office Action issued Nov. 27, 2006 in U.S. Appl. No. 10/708,832.
Notice of Abandonment issued Aug. 16, 2007 in U.S. Appl. No. 10/708,832.
Non-Final Office Action issued Jan. 20, 2006 in U.S. Appl. No. 10/708,834.
Final Office Action issued May 25, 2006 in U.S. Appl. No. 10/708,834.
Notice of Abandonment issued Jan. 5, 2007 in U.S. Appl. No. 10/708,834.
Non-Final Office Action issued Dec. 16, 2005 in U.S. Appl. No. 10/708,835.
Final Office Action issued May 17, 2006 in U.S. Appl. No. 10/708,835.
Notice of Abandonment issued Jan. 5, 2007 in U.S. Appl. No. 10/708,835.
Non-Final Office Action issued Dec. 16, 2005 in U.S. Appl. No. 10/708,836.
Final Office Action issued May 25, 2006 in U.S. Appl. No. 10/708,836.
Notice of Abandonment issued Jan. 5, 2007 in U.S. Appl. No. 10/708,836.
Non-Final Office Action issued Aug. 8, 2005 in U.S. Appl. No. 10/708,838.
Final Office Action issued Nov. 29, 2005 in U.S. Appl. No. 10/708,838.
Advisory Action issued Feb. 9, 2006 in U.S. Appl. No. 10/708,838.
Non-Final Office Action issued Apr. 18, 2006 in U.S. Appl. No. 10/708,838.
Notice of Abandonment issued Nov. 1, 2006 in U.S. Appl. No. 10/708,838.
ISR/WO issued Jan. 29, 2008 in PCT/US06/22542.
Non-Final Office Action issued Nov. 1, 2007 in U.S. Appl. No. 10/711,613.
Restriction Requirement issued Aug. 7, 2008 in U.S. Appl. No. 10/711,613.
"What's New: Timex Watch Features Speedpass System", http://www.speedpass.com/news/article.jsp?id=51 (1 page).
"Physical Reality: A Second Look", Ken Sharp, Senior Technical Editor, http://www.idsystems.com/reader/1999_03/phys0399_pt2/phys0399_pt2.htm (6 pages).
Prophecy Central Update #9, Oct. 10, 1997, http://www.bible-prophecy.com/pcu9.htm (5 pages).
"RFID Smart Cards Gain Ground: The convenience of contactless transactions is driving widespread adoption of contactless smart cards", RFID Journal, Apr. 9, 2003.
Functional Specification, Standard Card IC MF1 IC S50, Philips Semiconductors, Product Specification Rev. 5.1 May 2001.
USBanker, Article 5, 1995, http://www.banking.com/us-banker/art5.
Financial Technology International Bulletin, V14, n1, p4, Sep. 1996.
Greene, Thomas C., "American Express Offers temporary CC numbers for the web," Sep. 9, 2000, The Register, www.theregister.co.uk.
CNN.com, U.S. News, "American Express to offer disposable credit card numbers," Sep. 8, 2000, Associated Press, www.cnn.com.
American Express, "Private PaymentsSM ; A New Level of Security from American Express," American Express Website, Cards.
Martin, Zack, "One-Time Numbers Stop Web Hackers From Pilfering Data," Jan. 2001, Card Marketing, Thomson Financial, www.crdfrum.com.
The Dollar Stretcher, "Disposable Credit Card Numbers," Jan. 2001, CardRatings.org, www.stretcher.com.
ISO/IEC 7816-6:1996(E)—First Edition—May 15, 1996.
ISO/IEC 7816-4:1995(E)—First Edition—Sep. 1, 1995.
"Biometrics: Speaker Verification", by Kulkarni, et al., http://biometrics.cse.msu.edu/speaker.html, Mar. 8, 2004, 5 pages.
"Judge Dismisses FTC Suit Against Rambus", Evers, IDG New Service, http://www.infoworld.com/article/04/02/18/HNjudgedismisses_1.html, Feb. 18, 2004, 3 pages.
"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.
"The Evolution of Mobile Payment", by McPherson, Financial Insights, Feb. 2, 2004, http://www.banktech.com./story/mews/show/Article/jhtml?article ID=17601432, 2 pages.
"Pay by Touch Press Releases", http://www.paybytouch.com/press.html, Feb. 10, 2004, 3 pages.
"Putting Their Finger on It", by Wilson, http://sanfrancisco.bizjournals.com/sanfrancisco/stories/2003/10/20/story6.html?t=printable, Feb. 9, 2004, 2 pages.
"TI Embraces Prox Card Standard", by Roberti, Mar. 6, 2003, http://www.ti.com/tiris/docs/in-the-news/2003/3-6-03.shtml, 2 pages.
"Paying It by Ear", The Guardian, Jan. 18, 2003, http://money.guardian.co.uk/creditanddebt/creditcards/story/0,1456,876908,00.html, 3 pages.
Pay by Touch—Company, http://www.paybytouch.com/company.html.
"Identix Inc.—Empowering Identification™—Understanding Biometrics", http://www.identix.com/newsroom/news_biometrics_face.html, 1 page.
"International Biometric Group—Signature Biometrics: How It Works", http://www.ibgweb.com./reports/public/reports/signature-scan_tech.html, Feb. 18, 2004, 1 page.
"International Biometric Group—Voice Recognition Technology: How It Works", http://www.ibgweb.com/reports/public/ reports/voice-scan_tech.html, Feb. 18, 2004, 1 page.
"The Henry Classification System", International Biometric Group, 7 pages.
"Individual Biometrics—Hand Geometry", http://ctl.ncsc.dni.us/biomet%20web/BMHand.html, Feb. 18, 2004, 2 pages.
"Individual Biometrics—Retinal Scan", http:ctl.ncsc.dni.us/biomet%20web/BMRetinal.html, Feb. 18, 2004, 2 pages.

"Individual Biometrics—Iris Scan", http:ctl.ncsc.dni.us/biomet%20web/BMIris.html, Feb. 18. 2004, 2 pages.

"Individual Biometrics—Vascular Patterns", http:ctl.ncsc.dni.us/biomet%20web/BMVascular.html, Feb. 18, 2004, 1 page.

"Fingerprint Technology—Indentix Inc.—Empowering Identification™—Understanding Biometrics", http://www.identix.com/newsroom/news_biometrics_finger.html, Feb. 18, 2004, 1.

"Individual Biometrics—Facial Recognition", http:ctl.ncsc.dni.us/biomet%20web/BMfacial.html, Feb. 18, 2004, 2 pages.

"Fingerprint Analysis—The Basics", http://www.crimtrac.gov.au/fingerprintanalysis.htm, Feb. 18, 2004, 3 pages.

"Visual Speech and Speaker Recognition", by Luettin, Jun. 30, 2000, http://herens.idiap.ch/~luettin/luettin-thesis.bib.abs. html, 1 page.

"Automatic Ear Recognition by Force Field Transformations", by Hurley, et al., The Institution of Electrical Engineers, 2000, pp. Jul. 1-Jul. 5.

"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.

"How Facial Recognition Systems Work", by Bonsor, http://computer.howstuffworks.com/facial-recognition.htm/printable, Feb. 18, 2004, 6 pages.

"Biometrics: Hand Geometry", by Ross, et al., http://biometrics.cse.msu.edu/hand_geometry.html, Feb. 26, 2004, 2 pages.

"Biometric Person Authentication: Odor", by Korotkaya, Department of Information Technology, Laboratory of Applied Mathematics, Lappeenranta University of Technology, 18 pages.

"ISO Magnetic Stripe Card Standards", http://www.cyberd.co.uk/support./technotes/ioscards.htm, Feb. 9, 2004, 4 pages.

"Smart Card Developer's Kit: Some Basic Standards for Smart Cards", http:unix.be.eu.org/docs/smart-card-developer-kit/ch03/033-035.html, Feb. 9, 2004, 2 pages.

"Smart Card Technology and Applications"; http://disc.cba.uh.edu/~rhirsch/fall96/lara.htm (8 pages).

Goldman, J., "Internet Security, The Next Generation, When Software Encryption is not Enough," Web Techniques, Nov. 1997, pp. 43-46.

Simmons, J., "Smart Cards Hold the Key to Secure Internet Commerce," EC World, Dec. 1998, pp. 36-38.

Wayner, P., "Digital Cash," AP Professional, 1996, pp. 76-83, 85-100.

"ISO Standards," available from http://www.iso.ch/projects/loading.html.

Turban, et al., "Using Smartcards in Electronic Commerce," Proc. 31st Annual Hawaii Inter. Conf. on System Sciences, vol. 4, 1998, pp. 62-69.

Dhem, et al., "SCALPS: Smart Cards for Limited Payment Systems," IEEE Micro, Jun. 1996, pp. 42-51.

Notice of Allowance issued May 8, 2006 in U.S. Appl. No. 10/708,549.

Non-Final Office Action issued May 17, 2007 in U.S. Appl. No. 10/810,469.

Final Office Action issued Jan. 11, 2008 in U.S. Appl. No. 10/810,469.

Advisory Action issued Apr. 30, 2008 in U.S. Appl. No. 10/810,469.

Notice of Allowance issued Aug. 5, 2008 in U.S. Appl. No. 101810,469.

Final Office Action issued Jul. 28, 2005 in U.S. Appl. No. 10/710,307.

Final Office Action issued Nov. 21, 2005 in U.S. Appl. No. 10/710,307.

Advisory Action issued Feb. 10, 2006 in U.S. Appl. No. 10/710,307.

Non-Final Office Action issued May 2, 2006 in U.S. Appl. No. 10/710,307.

Final Office Action issued Oct. 10, 2006 in U.S. Appl. No. 10/710,307.

Advisory Action issued Jan. 5, 2007 in U.S. Appl. No. 10/710,307.

Non-Final Office Action issued Apr. 10, 2007 in U.S. Appl. No. 10/710,307.

Notice of Allowance issued Oct. 4, 2007 in U.S. Appl. No. 10/710,307.

Supplemental Notice of Allowance issued Nov. 8, 2007 in U.S. Appl. No. 710,307.

Office Action dated Mar. 6, 2008 for AU2005270228.

Office Action dated Jun. 18, 2008 for AU2005270228.

Office Action dated Apr. 14, 2008 for CA2570739.

ISR/WO dated Oct. 10, 2006 for PCT/US05/19388.

IPRP dated Mar. 15, 2007 for PCT/US05/19388.

Non-Final Office Action issued Feb. 26, 2008 in U.S. Appl. No. 11/859,153.

Notice of Allowance issued Jun. 20, 2008 in U.S. Appl. No. 11/859,153.

Examination Report dated Jun. 22, 2007 for GB 0700319.7.

Examination Report dated Nov. 22, 2007 for GB 0700319.7.

Search Report dated May 23, 2008 for GB 0700319.7.

Non-Final Office Action issued Feb. 26, 2008 in U.S. Appl. No. 11/859,171.

Notice of Allowance issued Jun. 19, 2008 in U.S. Appl. No. 11/859,171.

Examination Report dated Jun. 16, 2008 for SG200608843-9.

Non-Final Office Action issued Jul. 29, 2005 in U.S. Appl. No. 10/710,308.

Final Office Action issued Nov. 29, 2005 in U.S. Appl. No. 10/710,308.

Advisory Action issued Feb. 10, 2006 in U.S. Appl. No. 10/710,308.

Non-Final Office Action issued May 2, 2006 in U.S. Appl. No. 10/710,308.

Final Office Action issued Oct. 10, 2006 in U.S. Appl. No. 10/710,308.

Advisory Action issued Jan. 8, 2007 in U.S. Appl. No. 10/710,308.

Non-Final Office Action issued May 1, 2007 in U.S. Appl. No. 10/710,308.

Notice of Allowance issued Sep. 26, 2007 in U.S. Appl. No. 10/710,308.

Supplemental Notice of Allowance issued Dec. 11, 2007 in U.S. Appl. No. 10/710,308.

Non-Final Office Action issued Mar. 18, 2008 in U.S. Appl. No. 11/860,704.

Notice of Allowance issued Jul. 3, 2008 in U.S. Appl. No. 11/860,704.

Non-Final Office Action issued Apr. 3, 2008 in U.S. Appl. No. 11/860,726.

Notice of Allowance issued Jul. 14, 2008 in U.S. Appl. No. 11/860,726.

Non-Final Office Action issued Jul. 19, 2005 in U.S. Appl. No. 10/710,309.

Final Office Action issued Nov. 21, 2005 in U.S. Appl. No. 10/710,309.

Advisory Action issued Feb. 10, 2006 in U.S. Appl. No. 10/710,309.

Non-Final Office Action issued May 2, 2006 in U.S. Appl. No. 10/710,309.

Notice of Abandonment issued Dec. 19, 2006 in U.S. Appl. No. 10/710,309.

Non-Final Office Action issued May 6, 2005 in U.S. Appl. No. 10/710,310.

Final Office Action issued Oct. 19, 2005 in U.S. Appl. No. 10/710,310.

Advisory Action issued Dec. 29, 2005 in U.S. Appl. No. 10/710,310.

Non-Final Office Action issued Apr. 5, 2006 in U.S. Appl. No. 10/710,310.

Notice of Abandonment issued Oct. 20, 2006 in U.S. Appl. No. 10/710,310.

Non-Final Office Action issued Dec. 9, 2003 in U.S. Appl. No. 10/242,584.

Notice of Allowance issued Jul. 9, 2004 in U.S. Appl. No. 10/242,584.

Office Action dated May 23, 2008 for JP2004-543166.

ISR dated Mar. 7, 2003 for PCT/US02/32653.

WO dated Aug. 27, 2004 for PCT/US02/32653.

IPER dated Jan. 10, 2005 for PCT/US02/32653.

Ex-Parte Quayle Action issued Jun. 6, 2005 in U.S. Appl. No. 10/710,484.

Notice of Allowance issued Aug. 2, 2005 in U.S. Appl. No. 10/710,484.

Non-Final Office Action issued May 17, 2005 in U.S. Appl. No. 10/711,773.
Final Office Action issued Nov. 1, 2005 in U.S. Appl. No. 10/711,773.
Advisory Action issued Feb. 15, 2006 in U.S. Appl. No. 10/711,773.
Notice of Allowance issued May 17, 2006 in U.S. Appl. No. 10/711,773.
ISR/WO dated Jun. 20, 2005 for PCT/US05/07195.
IPRP (Ch 1) dated Apr. 19, 2007 for PCT/US05/07195.
Non-Final Office Action issued Feb. 28, 2006 in U.S. Appl. No. 10/709,815.
Notice of Allowance issued Sep. 26, 2006 in U.S. Appl. No. 10/709,815.
Non-Final Office Action issued Jul. 10, 2008 in U.S. Appl. No. 11/163,595.
Non-Final Office Action issued Jul. 12, 2005 in U.S. Appl. No. 10/708,822.
Final Office Action issued Nov. 2, 2005 in U.S. Appl. No. 10/708,822.
Advisory Action issued Dec. 20, 2005 in U.S. Appl. No. 10/708,822.
Non-Final Office Action issued Apr. 7, 2006 in U.S. Appl. No. 10/708,822.
Final Office Action issued Oct. 19, 2006 in U.S. Appl. No. 10/708,822.
Advisory Action issued Jan. 10, 2007 in U.S. Appl. No. 10/708,822.
Non-Final Office Action issued Apr. 23, 2007 in U.S. Appl. No. 10/708,822.
Notice of Allowance issued Sep. 19, 2007 in U.S. Appl. No. 10/708,822.
ISR/WO dated Nov. 16, 2005 for PCT/US05/09452.
IPRP dated Aug. 16, 2006 for PCT/US05/09452.
IPRP dated Jan. 5, 2007 for PCT/US05/09452.
Non-Final Office Action issued Jan. 22, 2008 in U.S. Appl. No. 11/858,958.
Non-Final Office Action issued Jun. 6, 2005 in U.S. Appl. No. 10/708,830.
Non-Final Office Action issued Oct. 4, 2005 in U.S. Appl. No. 10/708,830.
Notice of Allowance issued Mar. 2, 2006 in U.S. Appl. No. 10/708,830.
Supplemental Notice of Allowance issued Aug. 4, 2006 in U.S. Appl. No. 10/708,830.
Non-Final Office Action issued May 15, 2007 in U.S. Appl. No. 10/708,831.
Notice of Allowance issued Oct. 31, 2007 in U.S. Appl. No. 10/708,831.
Notice of Abandonment issued Mar. 6, 2008 in U.S. Appl. No. 10/708,831.
Non-Final Office Action issued Jun. 6, 2005 in U.S. Appl. No. 10/708,833.
Notice of Allowance issued Dec. 9, 2005 in U.S. Appl. No. 10/708,833.
Supplemental Notice of Allowance issued Feb. 23, 2006 in U.S. Appl. No. 10/708,833.
Non-Final Office Action issued Mar. 22, 2006 in U.S. Appl. No. 10/708,837.
Final Office Action issued Oct. 10, 2006 in U.S. Appl. No. 10/708,837.
Advisory Action issued Jan. 12, 2007 in U.S. Appl. No. 10/708,837.
Non-Final Office Action issued Apr. 23, 2007 in U.S. Appl. No. 10/708,837.
Notice of Allowance issued Oct. 12, 2007 in U.S. Appl. No. 10/708,837.
Supplemental Notice of Allowance issued Dec. 20, 2007 in U.S. Appl. No. 10/708.837.
Non-Final Office Action issued Dec. 11, 2007 in U.S. Appl. No. 11/851,533.
Final Office Action issued Jul. 25, 2008 in U.S. Appl. No. 11/851,533.
Advisory Action issued Aug. 29, 2008 in U.S. Appl. No. 11/851,533.
Non-Final Office Action issued Jan. 4, 2008 in U.S. Appl. No. 11/851,556.
Final Office Action issued Jul. 31, 2008 in U.S. Appl. No. 11/851,556.
Non-Final Office Action issued Sep. 19, 2006 in U.S. Appl. No. 10/710,311.
Notice of Abandonment issued Jun. 28, 2007 in U.S. Appl. No. 10/710,311.
Non-Final Office Action issued Feb. 9, 2006 in U.S. Appl. No. 10/710,315.
Final Office Action issued Jul. 13, 2006 in U.S. Appl. No. 10/710,315.
Notice of Abandonment issued Apr. 20, 2007 in U.S. Appl. No. 10/710,315.
Non-Final Office Action issued Feb. 9, 2006 in U.S. Appl. No. 10/710,317.
Final Office Action issued Jul. 18, 2006 in U.S. Appl. No. 10/710,317.
Notice of Abandonment issued Mar. 22, 2007 in U.S. Appl. No. 10/710,317.
Non-Final Office Action issued Sep. 19, 2006 in U.S. Appl. No. 10/710,319.
Notice of Abandonment issued Aug. 9, 2007 in U.S. Appl. No. 10/710,319.
Non-Final Office Action issued Mar. 9, 2006 in U.S. Appl. No. 10/710,323.
Notice of Abandonment issued Dec. 12, 2006 in U.S. Appl. No. 10/710,323.
Non-Final Office Action issued Oct. 10, 2006 in U.S. Appl. No. 10/710,324.
Notice of Abandonment issued Oct. 11, 2007 in U.S. Appl. No. 10/710,324.
Non-Final Office Action issued Oct. 10, 2006 in U.S. Appl. No. 10/710,325.
Notice of Abandonment issued Jun. 4, 2007 in U.S. Appl. No. 10/710,325.
Non-Final Office Action issued Mar. 22, 2006 in U.S. Appl. No. 10/710,326.
Final Office Action issued Oct. 10, 2006 in U.S. Appl. No. 10/710,326.
Advisory Action issued Jan. 12, 2007 in U.S. Appl. No. 10/710,326.
Non-Final Office Action issued May 1, 2007 in U.S. Appl. No. 10/710,326.
Notice of Allowance issued Oct. 4, 2007 in U.S. Appl. No. 10/710,326.
Supplemental Notice of Allowance issued Nov. 8, 2007 in U.S. Appl. No. 10/710,326.
Non-Final Office Action issued May 1, 2008 in U.S. Appl. No. 11/861,347.
Non-Final Office Action issued May 2, 2008 in U.S. Appl. No. 11/861,351.
Non-Final Office Action issued May 1, 2008 in U.S. Appl. No. 11/861,354.
Non-Final Office Action issued May 25, 2007 in U.S. Appl. No. 10/710,327.
Notice of Allowance issued Nov. 13, 2007 in U.S. Appl. No. 10/710,327.
Non-Final Office Action issued May 1, 2008 in U.S. Appl. No. 11/861,463.
Non-Final Office Action issued May 8, 2008 in U.S. Appl. No. 11/861,481.
Non-Final Office Action issued Sep. 21, 2006 in U.S. Appl. No. 10/710,328.
Notice of Abandonment issued Jun. 28, 2007 in U.S. Appl. No. 10/710,328.
Non-Final Office Action issued Sep. 19, 2006 in U.S. Appl. No. 10/710,329.
Notice of Abandonment issued Aug. 23, 2007 in U.S. Appl. No. 10/710,329.
Non-Final Office Action issued Mar. 9, 2006 in U.S. Appl. No. 10/710,330.
Notice of Abandonment issued Nov. 17, 2006 in U.S. Appl. No. 10/710,330.
Non-Final Office Action issued Jul. 29, 2005 in U.S. Appl. No. 10/710,331.
Final Office Action issued Nov. 29, 2005 in U.S. Appl. No. 10/710,331.

Advisory Action issued Feb. 9, 2006 in U.S. Appl. No. 10/710,331.
Non-Final Office Action issued May 3, 2006 in U.S. Appl. No. 10/710,331.
Notice of Abandonment issued Jan. 10, 2007 in U.S. Appl. No. 10/710,331.
Non-Final Office Action issued Jul. 19, 2005 in U.S. Appl. No. 10/710,332.
Final Office Action issued Nov. 21, 2005 in U.S. Appl. No. 10/710,332.
Advisory Action issued Feb. 10, 2006 in U.S. Appl. No. 10/710,332.
Non-Final Office Action issued May 3, 2006 in U.S. Appl. No. 10/710,332.
Final Office Action issued Oct. 10, 2006 in U.S. Appl. No. 10/710,332.
Advisory Action issued Jan. 5, 2007 in U.S. Appl. No. 10/710,332.
Non-Final Office Action issued Apr. 20, 2007 in U.S. Appl. No. 10/710,332.
Notice of Allowance issued Oct. 4, 2007 in U.S. Appl. No. 10/710,332.
Supplemental Notice of Allowance issued Nov. 8, 2007 in U.S. Appl. No. 10/710,332.
Non-Final Office Action issued May 2, 2008 in U.S. Appl. No. 11/861,600.
Muller, "Desktop Encyclopedia of the Internet," 1999, Artech House Inc., Norwood, MA, all pages.
"The Bank Credit Card Business," American Bankers Association, 1996, all pages.
Menezes, et al., "Handbook of Applied Cryptography," 1997, CRC Press, Chapter 10.
Provisional U.S. Appl. No. 60/395,606, filed on Jul. 15, 2002.
"Credit Card Offer Travelers New Benefit," PR Newswire, Aug. 5, 1987.
"Inside's Next Gen Smart Card: The French company plans to introduce an RFID card that uses a 16-bit microprocessor and new encryption technology," RFID Journal, Oct. 29, 2002.
"New Evidence about Positive Three-Tier Co-Pay Performance Presented at Express Scripts 2000 Outcomes Conference," PR Newswire Association, Inc., Jun. 28, 2000.
"Prestige Credit Cards: Those Pricey Plastics," Changing Times, Apr. 1986.
"Shell Introduces Optional Credit Card," The Associated Press, Sep. 3, 1985.
"Shell Introducing Expanded 'Signature' Credit Card," Tulsa Business Chronicle, Sep. 5, 1985.
"Shell-Oil: Introduces Shell Signature Travel and Entertainment Credit Card," Business Wire, Sep. 3, 1985.
"The Chase Manhattan Bank Today Announced a Comprehensive Program to Enhance the Value of All of its Credit Cards," PR Newswire, Dec. 18, 1986.
Carey, Gordon, "Multi-tier Copay," Pharmaceutical Executive, Feb. 2000.
Crumbaugh, Darlene M., "Effective Marketing Positions: Check card as consumer lifeline," Hoosier Banker, Apr. 1998, p. 10, vol. 82, issue 4.
Gabber, et al., "Agora: A Minimal Distributed Protocol for Electronic Commerce," USENIX Oakland, CA, Nov. 18, 1996.
Goldwasser, Joan, "Best of the Cash-Back Cards," Kiplinger's Personal Finance Magazine, Apr. 1999.
Kuntz, Mary, "Credit Cards as Good as Gold," Forbes, Nov. 4, 1985.
Lahey, Liam, "Microsoft Bolsters Rebate Structure," Computer Dealer News, Feb. 8, 2002.
Lamond, "Credit Card Transactions Real World and Online," Copyright 1996.
Nyman, Judy, "Free Income Tax Clinics are Opening as Apr. 30 Deadline Draws Nearer," The Toronto Star, Final Edition, Mar. 25, 1986.
Obel, Michael, "Oil Companies Push Marketing, Cost Cutting to Fortify Earnings," Oil & Gas Journal, Sep. 16, 1985.
Schmuckler, Eric, "Playing Your Cards Right," Forbes, Dec. 28, 1987.
"Core One Credit Union—Discover the Advantage," http://coreone.org/2visa.html, Copyright 2001 (last visited Oct. 9, 2002).
Non-Final Office Action issued Apr. 20, 2005 in U.S. Appl. No. 10/192,488.
Final Office Action issued Sep. 8, 2005 in U.S. Appl. No. 10/192,488.
Advisory Action issued Nov. 10, 2005 in U.S. Appl. No. 10/192,488.
Non-Final Office Action issued Jan. 18, 2006 in U.S. Appl. No. 10/192,488.
Final Office Action issued Sep. 25, 2006 in U.S. Appl. No. 10/192,488.
Notice of Allowance issued Feb. 2, 2007 in U.S. Appl. No. 10/192,488.
Examiner's Report dated Oct. 5, 2006 for AU2002318293.
Office Action dated Jun. 28, 2007 in CA 2,452,351.
Office Action dated Apr. 25, 2008 in CA 2,452,351.
Supplemental Search Report dated Nov. 16, 2004 for EP02748120.9.
Examination Report dated Mar. 8, 2005 for EP02748120.9.
Examination Report dated Feb. 8, 2006 for EP02748120.9.
Examination Report dated Oct. 24, 2007 for EP02748120.9.
Office Action dated Mar. 9, 2006 in JP2003-513257.
Office Action dated Oct. 20, 2006 in JP2003-513257.
Office Action dated Aug. 1, 2007 in JP2003-513257.
Office Action dated Jan. 29, 2008 in JP2003-513257.
Office Action dated Jul. 11, 2007 for MX PA/a/2004/000253.
Office Action dated Jan. 27, 2005 in NZ530497.
ISR dated Dec. 30, 2002 for PCT/US02/0219903.
Office Action dated Dec. 30, 2005 for CN02813783.3.
Office Action dated May 16, 2007 for CN02813783.3.
Non-Final Office Action mailed Feb. 8, 2008 in U.S. Appl. No. 10/340,352.
Final Office Action mailed Jun. 13, 2008 in U.S. Appl. No. 10/340,352.
Advisory Action mailed Aug. 19, 2008 in U.S. Appl. No. 10/340,352.
Office Action dated Jan. 29, 2007 for CA2458143.
Office Action dated Dec. 19, 2007 for CA2458143.
Non-Final Office Action issued May 1, 2008 in U.S. Appl. No. 11/861,626.
Non-Final Office Action issued Jan. 27, 2005 in U.S. Appl. No. 10/710,334.
Final Office Action issued Sep. 30, 2005 in U.S. Appl. No. 10/710,334.
Advisory Action issued Dec. 19, 2005 in U.S. Appl. No. 10/710,334.
Non-Final Office Action issued Apr. 10, 2006 in U.S. Appl. No. 10/710,334.
Notice of Abandonment issued Nov. 6, 2006 in U.S. Appl. No. 10/710,334.
Non-Final Office Action issued Aug. 8, 2005 in U.S. Appl. No. 10/710,335.
Final Office Action issued Dec. 15, 2005 in U.S. Appl. No. 10/710,335.
Advisory Action issued Mar. 8, 2006 in U.S. Appl. No. 10/710,335.
Non-Final Office Action issued May 9, 2006 in U.S. Appl. No. 10/710,335.
Final Office Action issued Oct. 19, 2006 in U.S. Appl. No. 10/710,335.
Advisory Action issued Jan. 12, 2007 in U.S. Appl. No. 10/710,335.
Non-Final Office Action issued Apr. 19, 2007 in U.S. Appl. No. 10/710,335.
Notice of Allowance issued Sep. 19, 2007 in U.S. Appl. No. 10/710,335.
Supplemental Notice of Allowance issued Oct. 25, 2007 in U.S. Appl. No. 10/710,335.
Non-Final Office Action issued May 1, 2008 in U.S. Appl. No. 11/862,268.
Non-Final Office Action issued Aug. 4, 2008 in U.S. Appl. No. 11/306,617.
ISR/WO dated Jul. 9, 2008 for PCT/US06/45362.
Non-Final Office Action issued Jun. 24, 2008 in U.S. Appl. No. 11/161,295.
Non-Final Office Action issued Sep. 8, 2005 in U.S. Appl. No. 10/906,732.
Final Office Action issued Mar. 8, 2006 in U.S. Appl. No. 10/906,732.
Advisory Action issued Jul. 5, 2006 in U.S. Appl. No. 10/906,732.
Notice of Allowance issued Aug. 11, 2006 in U.S. Appl. No. 10/906,732.

Non-Final Office Action issued Oct. 15, 2007 in U.S. Appl. No. 11/161,105.
Final Office Action issued Apr. 21, 2008 in U.S. Appl. No. 11/161,105.
Notice of Allowance issued Jul. 3, 2008 in U.S. Appl. No. 11/161,105.
Non-Final Office Action issued Apr. 11, 2008 in U.S. Appl. No. 11/552,886.
Final Office Action issued Aug. 6, 2008 in U.S. Appl. No. 11/552,886.
Advisory Action issued Sep. 18, 2008 in U.S. Appl. No. 11/552,886.
Non-Final Office Action issued Jan. 10, 2008 in U.S. Appl. No. 10/708,840.
Final Office Action issued Jul. 17, 2008 in U.S. Appl. No. 10/708,840.
Advisory Action issued Sep. 5, 2008 in U.S. Appl. No. 10/708,840.
Non-Final Office Action issued Feb. 8, 2008 in U.S. Appl. No. 11/851,580.
Non-Final Office Action issued Feb. 11, 2008 in U.S. Appl. No. 11/851,623.
Restriction Requirement issued Aug. 20, 2008 in U.S. Appl. No. 11/851,623.
Non-Final Office Action issued Feb. 15, 2008 in U.S. Appl. No. 11/858,393.
Non-Final Office Action issued Jan. 30, 2006 in U.S. Appl. No. 10/708,841.
Final Office Action issued May 25, 2006 in U.S. Appl. No. 10/708,841.
Notice of Allowance issued Oct. 6, 2006 in U.S. Appl. No. 10/708,841.
Non-Final Office Action issued Mar. 11, 2008 in U.S. Appl. No. 11/164,352.
Final Office Action issued Aug. 18, 2008 in U.S. Appl. No. 11/164,352.
ISR/WO dated Jul. 11, 2008 for PCT/US06/07570.
Non-Final Office Action issued Aug. 11, 2004 in U.S. Appl. No. 10/611,563.
Final Office Action issued Mar. 24, 2005 in U.S. Appl. No. 10/611,563.
Advisory Action issued May 18, 2005 in U.S. Appl. No. 10/611,563.
Non-Final Office Action issued Jul. 27, 2005 in U.S. Appl. No. 10/611,563.
Non-Final Office Action issued Nov. 16, 2005 in U.S. Appl. No. 10/611,563.
Final Office Action issued May 31, 2006 in U.S. Appl. No. 10/611,563.
Advisory Action issued Oct. 6, 2006 in U.S. Appl. No. 10/611,563.
Non-Final Office Action issued Jan. 8, 2007 in U.S. Appl. No. 10/611,563.
Non-Final Office Action issued Jun. 18, 2007 in U.S. Appl. No. 10/611,563.
Notice of Allowance issued Sep. 24, 2007 in U.S. Appl. No. 10/611,563.
ISR dated Mar. 26, 2004 for PCT/US03/34602.
WO dated Oct. 13, 2004 for PCT/US03/34602.
IPER dated Jan. 20, 2005 for PCT/US03/34602.
Office Action dated Feb. 16, 2005 for TW092131042.
Office Action dated May 18, 2006 for AR 041912 A1.
Office Action dated Mar. 8, 2007 for AR 041912 A1.
Non-Final Office Action issued Apr. 1, 2008 in U.S. Appl. No. 10/810,473.
Non-Final Office Action issued Oct. 17, 2007 in U.S. Appl. No. 10/710,611.
Final Office Action issued May 28, 2008 in U.S. Appl. No. 10/710,611.
Advisory Action issued Sep. 5, 2008 in U.S. Appl. No. 10/710,611.
Non-Final Office Action issued Mar. 4, 2008 in U.S. Appl. No. 10/711,720.
Final Office Action issued Jul. 23, 2008 in U.S. Appl. No. 10/711,720.
Non-Final Office Action issued Jul. 7, 2005 in U.S. Appl. No. 10/708,548.
Notice of Allowance issued Jan. 31, 2006 in U.S. Appl. No. 10/708,548.
Non-Final Office Action issued Feb. 25, 2008 in U.S. Appl. No. 10/708,569.
Non-Final Office Action issued Sep. 24, 2007 in U.S. Appl. No. 10/708,547.
Final Office Action issued Feb. 14, 2008 in U.S. Appl. No. 10/708,547.
Advisory Action issued Jul. 29, 2008 in U.S. Appl. No. 10/708,547.
Non-Final Office Action issued Mar. 22, 2006 in U.S. Appl. No. 10/708,597.
Final Office Action issued Oct. 10, 2006 in U.S. Appl. No. 10/708,597.
Restriction Requirement issued Mar. 22, 2007 in U.S. Appl. No. 10/708,597.
Non-Final Office Action issued Aug. 8, 2007 in U.S. Appl. No. 10/708,597.
Final Office Action issued Mar. 17, 2008 in U.S. Appl. No. 10/708,597.
Advisory Action issued Jul. 11, 2008 in U.S. Appl. No. 10/708,597.
Non-Final Office Action issued Nov. 1, 2007 in U.S. Appl. No. 10/746,781.
Final Office Action issued Jul. 10, 2008 in U.S. Appl. No. 10/746,781.
Ex-Parte Quayle Action issued Dec. 14, 2005 in U.S. Appl. No. 10/708,549.
Smith, M.T., "Smart Cards: Integrating for Portable Complexity," Computer-Integrated Engineering, August 1998, pp. 110-115.
Geer, et al., "Token-Mediated Certification and Electronic Commerce," Proc. 2nd USENIX Workshop on Electronic Commerce, Nov. 18-21, 1996, pp. 13-22.
Gobioff, et al., "Smart Cards in Hostile Environments," Proc. 2nd USENIX Workshop in Electronic Commerce, Nov. 18-21, 1996, pp. 23-28.
Fancher, C.H., "In Your Pocket Smartcards," IEEE Spectrum, February 1997, pp. 47-53.
Blythe, I., "Smarter, More Secure Smartcards," Byte, June 1997, pp. 63-64.
Leach, Dr. J., "Dynamic Authentication for Smartcards," Computers and Security, vol. 14, No. 5, 1995, pp. 385-389.
Wu, et al., "Authenticating Passwords Over an Insecure Channel," Computers and Security, vol. 15, No. 5, 1996, pp. 431-439.
Manninger, et al., "Adapting an Electronic Purse for Internet Payments," ACISP '98 Proceedings, Jul. 13-15, 1998, pp. 205-214.
Yan, et al., "Banking on the Internet and Its Applications," Proc. 13th Annual Hawaii International Conference on System Sciences, vol. 4, 1997, pp. 275-284.
Transport Layer Security Working Group, "The SSL Protocol, Version 3.0," Nov. 18, 1996 (also available at http://home.netscape.com/eng/ssl3/draft302.txt).
Business Wire (press release), "Master Card E-Wallet," Jul. 11, 2000.
Obongo.com Website, "Obongo," August 8, 2000 (Description of wallet toolbar also available at http://www.obongo.com/chabi/website/index.htm).
PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.
"'Magic Wands' to Speed Mobile Sales", Bob Brewin, Jan. 15, 2001, http://www.computerworld.com/mobiletopics/mobile/story/1,10801,563300.html.
"Mobile Speedpass Goes Global as Mobil Singapore Rolls Out Asia's First RFID-Based Pay-At-The-Pump System", Press Release, April 5, 1999, http://www.ti.com/tiris/docs/news_releases/rel12.htm (3 pages).
"Speedpass Unleashed", Jun. 4, 2002 http://www.cardweb.com/cardtrak/news/cf2_20a_97.html (2 pages).
International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).

"Microsoft: See SPOT Run on Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048, a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 2003.

"TI Embraces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

http://www.semiconductors.phillips.com/news/content/file_878.html, Apr. 7, 2003.

http://www.palowireless.com/infotooth/whatis.asp, Apr. 28, 2003.
http://www.palowireless.com/infotooth/tutorial.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.polowireless.com/infotooth/tutorial/baseband.asp, Apr. 28, 2003.
http://www.palowireless.com/infotooth/tutorial/lmp.asp, Apr. 28, 2003.
http://www.palowireless.com/infotooth/tutorial/hci.asp, Apr. 28, 2003.
http://www.palowireless.com/infotooth/tutorial/l2cap.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/tutorialk1_gap.asp, Apr. 28, 2003.

"Sony, Phillips to Test RFID Platform", RFID Journal, May 8, 2003.

"RFID Take Priority With Wal-Mart", by DocMemory, http://www.simmtester.com/page/news/shownews.asp? num=6550, Feb. 9, 2004, 2 pages.

"Microsoft, IBM and Phillips Test RFID Technology", by Rohde, IDG New Service, http:www.computerweekly.com/Article127889.htm, Feb. 9, 2004, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.

Derfler, "How Networks Work," Bestseller Edition 1996, Ziff-Davis Press, Emeryville, CA, all pages.

White, "How Computers Work," Millennium Edition, 1999, Que Corporation, Indianapolis, IN, all pages.

Gralla, "How the Internet Works," Millennium Edition, 1999, Que Corporation, Indianapolis, IN, all pages.

* cited by examiner

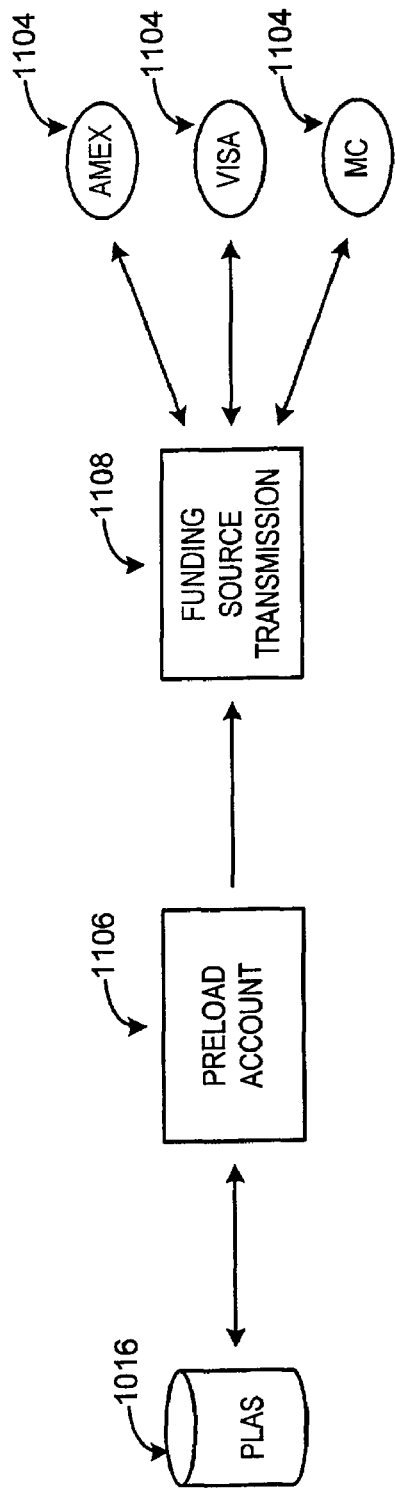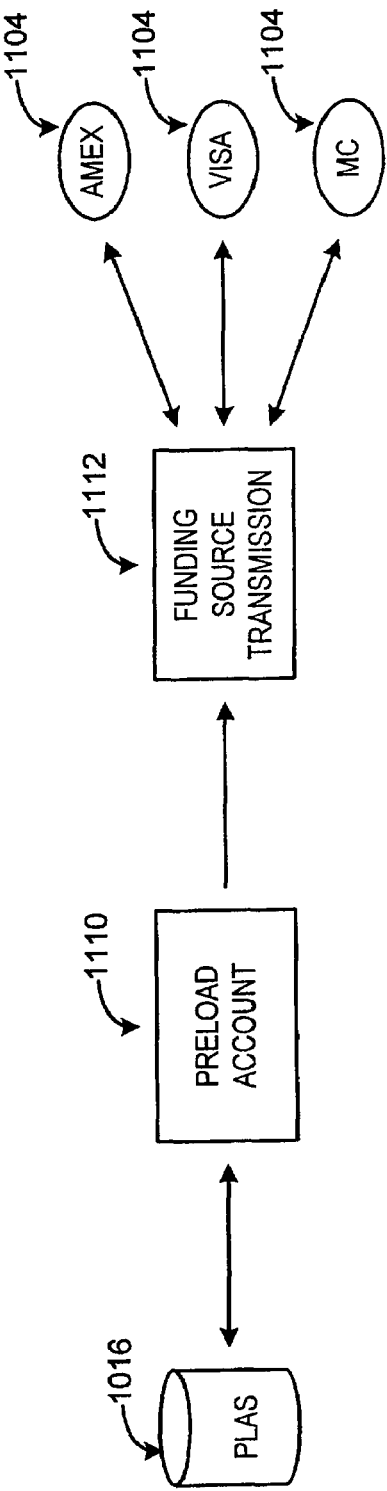
FIG. 11A
FIG. 11B

HAND GEOMETRY RECOGNITION BIOMETRICS ON A FOB

CROSS REFERENCE TO RELATED APPLICATIONS

This application is a continuation of U.S. Ser. No. 10/708,831, filed on Mar. 26, 2004. The 831 applications is a continuation-in-part of U.S. Ser. No. 10/340,352, filed on Jan. 10, 2003, and entitled "SYSTEM AND METHOD FOR INCENTING PAYMENT USING RADIO FREQUENCY IDENTIFICATION IN CONTACT AND CONTACTLESS TRANSACTIONS." The '352 application is a non-provisional of U.S. Provisional No. 60/396,577 filed on Jul. 16, 2002. The '352 application is also a continuation-in-part of U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002, which has now issued as U.S. Pat. No. 7,239,226 on Jul. 3, 2007. The '488 application is a non-provisional of U.S. Provisional No. 60/304,216, filed on Jul. 10, 2001. The '352 application is also a continuation-in-part of U.S. patent application Ser. No. 10/318,432, entitled "SYSTEM AND METHOD FOR SELECTING LOAD OPTIONS FOR USE IN RADIO FREQUENCY IDENTIFICATION IN CONTACT AND CONTACTLESS TRANSACTIONS," filed Dec. 13, 2002. The '432 application is a non-provisional of U.S. Provisional No. 60/396,577 filed Jul. 16, 2002. The '352 application is also a continuation-in-part of U.S. patent application Ser. No. 10/318,480, entitled "SYSTEM AND METHOD FOR PAYMENT USING RADIO FREQUENCY IDENTIFICATION IN CONTACT AND CONTACTLESS TRANSACTIONS," filed Dec. 13, 2002, which has issued as U.S. Pat. No. 7,249,112 on Jul. 24, 2007. The '480 application is also a non-provisional of U.S. Provisional No. 60/396,577, filed Jul. 16, 2002. All of the above applications are hereby incorporated by reference.

FIELD OF INVENTION

This invention generally relates to a system and method for using biometrics with a transponder-reader system, and more particularly, to configuring a transponder and transponder-reader for biometric security.

BACKGROUND OF THE INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical fob includes a transponder and is ordinarily a self-contained device which may be contained on any portable form factor. In some instances, a battery may be included with the fob to power the transponder. In which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328, discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. Inadvertent presentation of the fob may result in initiation and completion of an unwanted transaction. Thus, a fob system is needed which allows the fob user to control activation of the fob to limit transactions being undesirably completed.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point of Sale (POS) device. Fob identification data is typically passed to a third-party server database, where the identification data is referenced to a customer (e.g., user) credit or debit account. In an exemplary processing method, the server seeks authorization for the transaction by passing the transaction and account data to an authorizing entity. Once authorization is received by the server, clearance is sent to the point of sale device for completion of the transaction. In this way, the conventional transaction processing method involves an indirect path which causes undue overhead due to the use of the third-party server.

A need exists for a transaction authorization system which allows fob transactions to be authorized while eliminating the cost associated with using third-party servers.

In addition, conventional fobs are limited in that they must be used in proximity to the Point of Sale device. That is, for fob activation, conventional fobs must be positioned within the area of transmission cast by the RF interrogation signal. More particularly, conventional fobs are not effective for use in situations where the user wishes to conduct a transaction at a point of interaction such as a computer interface.

Therefore, a need exists for a fob embodying RFID acquisition technology, which is capable of use at a point of interaction device and which is additionally capable of facilitating transactions via a computer interface connected to a network (e.g., the Internet).

Existing transponder-reader payment systems are also limited in that the conventional fob used in the systems is only responsive to one interrogation signal. Where multiple interrogation signals are used, the fob is only responsive to the interrogation signal to which it is configured. Thus, if the RFID reader of the system provides only an interrogation signal to which the fob is incompatible, the fob will not be properly activated.

Therefore, a need exists for a fob which is responsive to more than one interrogation signal.

Existing transponder-reader payment systems are additionally limited in that the payment systems are typically linked to a funding source associated with the transponder which includes a predetermined spending limit. Thus no flexibility is provided in instances where the payment is requested which exceeds the predetermined spending limit. This is typically true in that traditional methods for processing a requested transaction involve comparing the transaction to the spending limit or to an amount stored in a preloaded value data file prior to providing transaction authorization to a merchant.

Thus, a system is needed which processes transponder reader payment requests irrespective of the spending limit assigned to an associated transponder-reader payment system funding source.

Further, traditional transponder-reader systems do not permit the user to manage the system user account data. This is extremely problematic where the user wishes to change a transponder-reader system funding source to a source which provides more available spending room, or where changes are made to the user's status (e.g., change in address, phone number, email, etc.) for which the transponder-reader account provider wishes to readily update the user's account.

Thus a need exists for a transponder-reader system which will allow the user limited access to the transponder-reader account for managing account data.

Further still, existing transponder-reader systems do not usually permit means for automatically incenting the use of the fob associated with the system as opposed to the credit or charge card associated with the fob. That is, conventional transponder-reader systems do not provide a means for encouraging usage of the transponder reader system by encouraging use of the fob product since the present systems do not sufficiently distinguish between usage of a system transponder and a charge or credit card account associated with the transponder.

Consequently, a need exists for a transponder-reader system which is capable of determining when a system transponder is used, and providing an incentive for such usage.

Still further, present systems are limited in that the systems are unable to track credit or charge card usage and fob usage for a single funding source. For example, in typical prior art systems, a fob may be linked to a specified funding source (e.g., American Express, MasterCard, Visa, etc.) which may be used to provide funds for satisfaction of a transaction request. The funding source may additionally have a consumer credit or charge card which may be associated with the fob and which may be used for contact transactions. Where the credit or charge card is used, a statement reporting the card usage is provided to the card user. However, the reporting statement does not include a reporting of the fob product usage. Thus, a fob user is unable to adequately chart, analyze or compare fob usage to the usage of the associated card. This is especially problematic where the funding source is used by more than one entity (e.g., spouses, multiple company personnel, etc.) or where one entity may use the fob and a separate entity may use the card associated with the fob.

Thus, a need exists for a transponder-reader payment system which would permit reporting of the fob usage and the credit card usage in a single file.

SUMMARY OF THE INVENTION

Described herein is a system and method for using RFID technology to initiate and complete financial transactions. The transponder-reader payment system described herein may include a RFID reader operable to provide a RF interrogation signal for powering a transponder system, receiving a transponder system RF signal, and providing transponder system account data relative to the transponder system RF signal. The transponder-reader payment system may include a RFID protocol/sequence controller in electrical communication with one or more interrogators for providing an interrogation signal to a transponder, a RFID authentication circuit for authenticating the signal received from the transponder, a serial or parallel interface for interfacing with a point of interaction device, and an USB or serial interface for use in personalizing the RFID reader and/or the transponder. The transponder-reader payment system may further include a fob including one or more transponders (e.g., modules) responsive to one or more interrogation signals and for providing an authentication signal for verifying that the transponder and/or the RFID reader are authorized to operate within the transponder-reader payment system. In this way, the fob may be responsive to multiple interrogation signals provided at different frequencies. Further, the fob may include a USB or serial interface for use with a computer network or with the RFID reader.

The RFID system and method according to the present invention may include a transponder which may be embodied in a fob, tag, card or any other form factor (e.g., wrist-watch, keychain, cell phone, etc.), which may be capable of being presented for interrogation. In that regard, although the transponder is described herein as embodied in a fob, the invention is not so limited.

The system may further include a RFID reader configured to send a standing RFID recognition signal which may be transmitted from the RFID reader via radio frequency (or electromagnetic) propagation. The fob may be placed within proximity to the RFID reader such that the RFID signal may interrogate the fob and initialize fob identification procedures.

In one exemplary embodiment, as a part of the identification process, the fob and the RFID reader may engage in mutual authentication. The RFID reader may identify the fob as including an authorized system transponder for receiving encrypted information and storing the information on the fob memory. Similarly, the fob, upon interrogation by the RFID reader, may identify the RFID reader as authorized to receive the encrypted and stored information. Where the RFID reader and the fob successfully mutually authenticate, the fob may transmit to the RFID reader certain information identifying the transaction account or accounts to which the fob is associated. The RFID reader may receive the information and forward the information to facilitate the completion of a transaction. In one exemplary embodiment, the RFID reader may forward the information to a point of interaction device (e.g., POS or computer interface) for transaction completion. The mutual authorization process disclosed herein aids in ensuring fob transponder-reader payment system security.

In another exemplary embodiment, the fob according to the present invention, includes means for completing transactions via a computer interface. The fob may be connected to the computer using a USB or serial interface fob account information may be transferred to the computer for use in completing a transaction via a network (e.g., the Internet).

In yet another exemplary embodiment of the present invention, a system is provided which incents usage of the transponder-reader system transponder (e.g., fob). The system distinguishes between the usage of a fob and the usage of a charge or credit card sharing the same funding source as the fob. Where the fob is used, the system may provide incentives to the user based on criteria predetermined by the fob issuer. Additionally, where a preloaded fob system is used, the present invention recognizes when the associated fob preloaded value data file is loaded or reloaded with funds. The invention then may provide reward points based on the criteria associated with the loading or reloading action. Further, the system according to this invention may incent patronage of a merchant. In this case, the system may receive a fob transaction request and incent the fob user based on a marker or other identifier correlated with the merchant. The marker may be included in the transaction identification, in a merchant identification provided with the transaction, or a combination of both.

In still another exemplary embodiment of the invention, a system is disclosed which enables the fob user/owner to manage the account associated with the fob. The user is provided limited access to all or a portion of the fob account information stored on the account provider database for updating, for example, demographic information, account funding source, and/or account restrictions (e.g., spending limits, personal identification number, etc.). Access to all or a portion of the account may be provided to the user telephonically, via a network (e.g., online) or via offline communications. For example, the fob user may be provided access to a system which has delayed communications with the account provider database wherein such a system may include, for example, a kiosk which provides batch transmissions to the account provider system. In this way, the fob user/owner may update his account information in real-time (e.g., telephonically or online) or at the time the account provider receives the updated information (e.g., offline).

In a further exemplary embodiment, the present invention provides methods for processing a transaction request whereby the amount of the transaction request may be approved prior to requesting funding from the funding source and/or verifying that the amount for completing the transaction is available. In this way, the transaction may be approved provided the transaction and/or account meets certain predetermined authorization criteria. Once the criteria is met, the transaction is authorized and authorization is provided to the requesting agent (e.g., merchant). In one instance the payment for the transaction is requested from the funding source simultaneously to, or immediately following, the providing of the authorization to the merchant. In another instance, the payment for transactions is requested at a time period later than when the authorization is provided to the merchant.

In yet another embodiment, the transponder, transponder-reader, and/or transponder-reader system are configured with a biometric security system. The biometric security system includes a transponder and a reader communicating with the system. The biometric security system also includes a biometric sensor that detects biometric samples and a device for verifying biometric samples.

In yet another embodiment, the present invention discloses methods for processing biometric samples to facilitate authorization of transactions.

These features and other advantages of the system and method, as well as the structure and operation of various exemplary embodiments of the system and method, are described below.

BRIEF DESCRIPTION OF DRAWINGS

The accompanying drawings, wherein like numerals depict like elements, illustrate exemplary embodiments of the present invention, and together with the description, serve to explain the principles of the invention. In the drawings:

FIGS. 11A-B are depictions of an exemplary preloaded fob account reload process in accordance with the present invention;

DETAILED DESCRIPTION

The present invention may be described herein in terms of functional block components, screen shots, optional selections and various processing steps. Such functional blocks may be realized by any number of hardware and/or software components configured to perform to specified functions. For example, the present invention may employ various integrated circuit components, (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN).

Where required, the system user may interact with the system via any input device such as, a keypad, keyboard, mouse, kiosk, personal digital assistant, handheld computer (e.g., Palm Pilot®, Blueberry®), cellular phone and/or the like). Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates, the use, sale, or distribution of any goods, services or information over any network having similar functionality described herein.

Figure 1A:
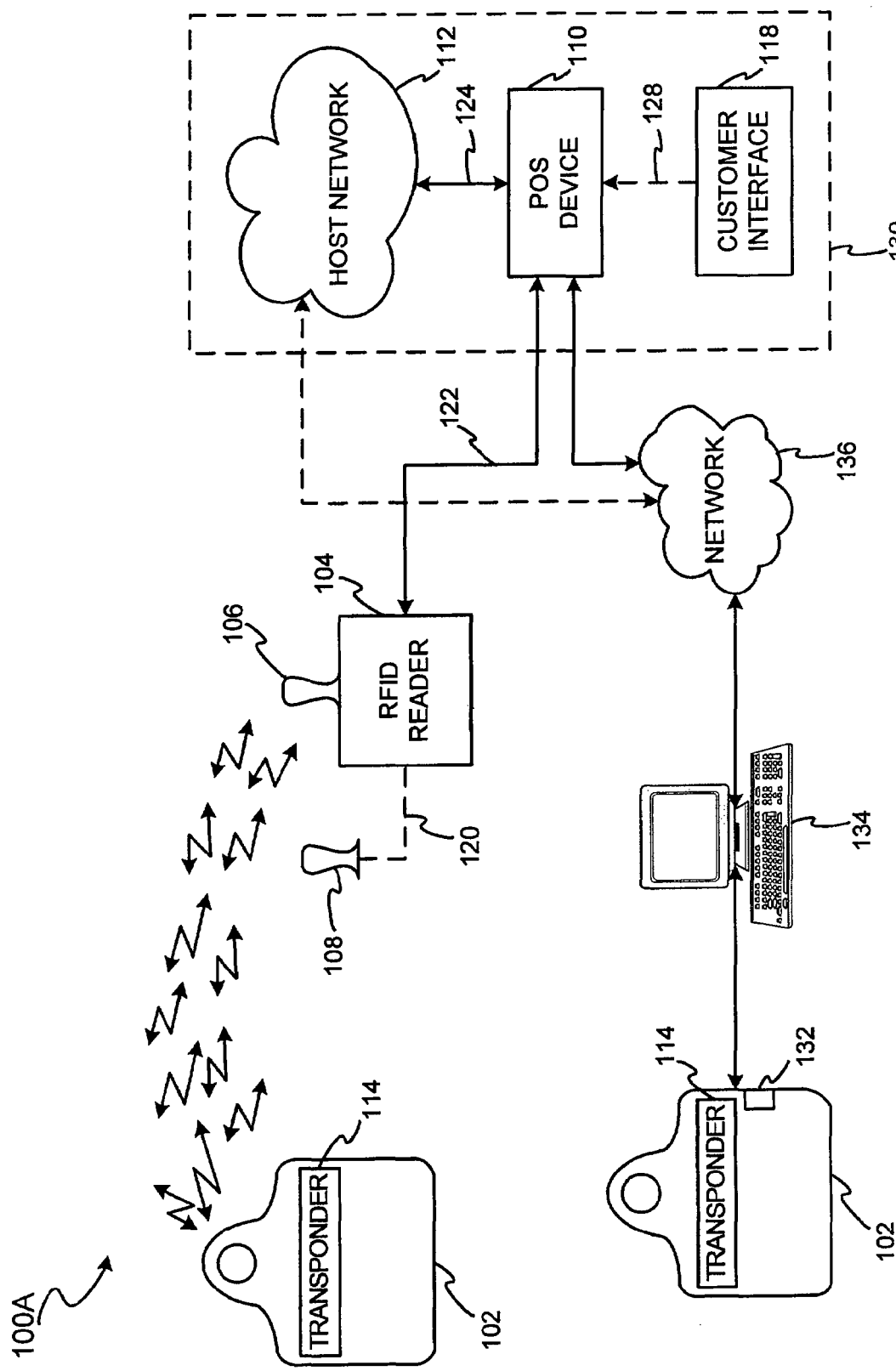
FIG. 1A illustrates an exemplary RFID-based system in accordance with the present invention, wherein exemplary components used for fob transaction completion are depicted.

FIG. 1A illustrates an exemplary RFID transaction system 100A in accordance with the present invention, wherein exemplary components for use in completing a fob transaction are depicted. In general, the operation of system 100A may begin when a fob 102 is presented for payment, and is interrogated by a RFID reader 104 or, alternatively, interface 134. Fob 102 and RFID reader 104 may then engage in mutual authentication after which the transponder 114 may provide the transponder identification and/or account identifier to RFID reader 104 which may further provide the information to the merchant system 130 POS device 110.

System 100A may include fob 102 having a transponder 114 and RFID reader 104 in RF communication with fob 102. Although the present invention is described with respect to fob 102, the invention is not to be so limited. Indeed, system 100 may include any device having a transponder which is configured to communicate with RFID reader 104 via RF communication. Typical devices may include, for example, a key ring, tag, card, cell phone, wristwatch or any such form capable of being presented for interrogation.

RFID reader 104 may be configured to communicate using a RFID internal antenna 106. Alternatively, RFID reader 104 may include an external antenna 108 for communications with fob 102, where the external antenna may be made remote to RFID reader 104 using a suitable cable and/or data link 120. RFID reader 104 may be further in communication with a merchant system 130 via a data link 122. System 100A may include a transaction completion system including a point of interaction device such as, for example, a merchant point of sale (POS) device 110 or a computer interface (e.g., user interface) 134. In one exemplary embodiment the transaction completion system may include a merchant system 130 including POS device 110 in communication with RFID reader 104 (via data link 122). As described more fully below, the transaction completion system may include user interface 134 connected to a network 136 and to the transponder via a USB connector 132.

Although the point of interaction device is described herein with respect to a merchant point of sale (POS) device, the invention is not to be so limited. Indeed, a merchant POS device is used herein by way of example, and the point of interaction device may be any device capable of receiving fob account data. In this regard, the POS may be any point of interaction device enabling the user to complete a transaction using fob 102. POS device 110 may be in further communication with a customer interface 118 (via data link 128) for entering at least a customer identity verification information. In addition, POS device 110 may be in communication with a merchant host network 112 (via data link 124) for processing any transaction request. In this arrangement, information provided by RFID reader 104 is provided to POS device 110 of merchant system 130 via data link 122. POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, merchant system 130 including POS device 110 and host network 112 may reside on a local area network which interfaces to a remote network (not shown) for remote authorization of an intended transaction. Merchant system 130 may communicate with the remote network via a leased line, such as a T1, D3 line, or the like. Such communications lines are described in a variety of texts, such as, "Understanding Data Communications," by Gilbert Held, which is incorporated herein by reference.

An account number, as used herein, may include any identifier for an account (e.g., credit, charge debit, checking, savings, reward, loyalty, or the like) which may be maintained by a transaction account provider (e.g., payment authorization center) and which may be used to complete a financial transaction. A typical account number (e.g., account data) may be correlated to a credit or debit account, loyalty account, or rewards account maintained and serviced by such entities as American Express®, Visa® and/or MasterCard® or the like. For ease in understanding, the present invention may be described with respect to a credit account. However, it should be noted that the invention is not so limited and other accounts permitting an exchange of goods and services for an account data value is contemplated to be within the scope of the present invention.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express® Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number stored as Track 1 and Track 2 data as defined in ISO/IEC 7813, and further may be made unique to fob 102. In one exemplary embodiment, the account number may include a unique fob serial number and user identification number, as well as specific application applets. The account number may be stored in fob 102 inside a database 214, as described more fully below. Database 214 may be configured to store multiple account numbers issued to fob 102 user by the same or different account providing institutions. Where the account data corresponds to a loyalty or rewards account, database 214 may be configured to store the attendant loyalty or rewards points data.

Figure 2:
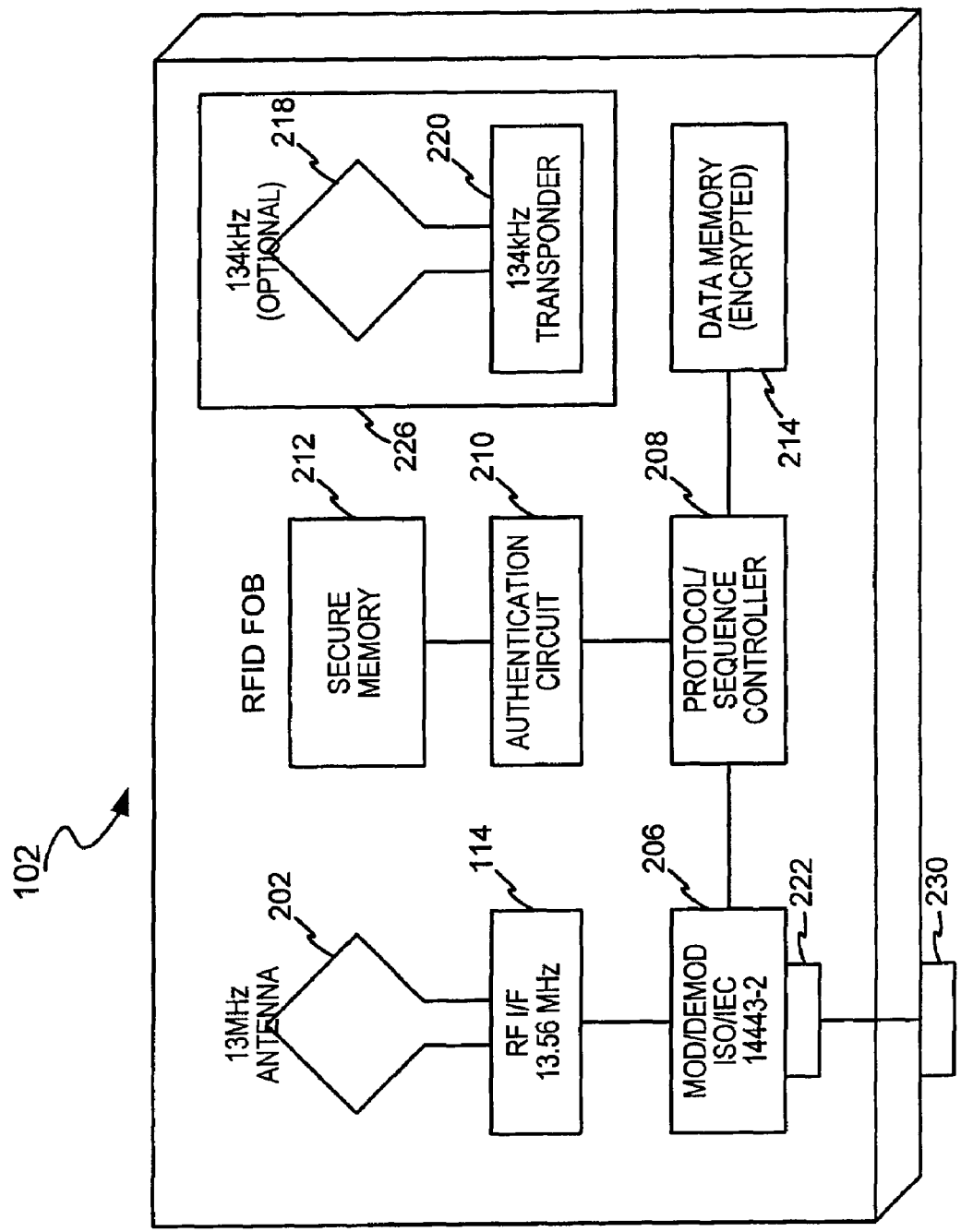
FIG. 2 is a schematic illustration of an exemplary fob in accordance with the present invention.

FIG. 2 illustrates a block diagram of the many functional blocks of an exemplary fob 102 in accordance with the present invention. Fob 102 may be a RFID fob 102 which may be presented by the user to facilitate an exchange of funds or points, etc., for receipt of goods or services. As described herein, by way of example, fob 102 may be a RFID fob which may be presented for facilitating payment for goods and/or services.

Fob 102 may include an antenna 202 for receiving an interrogation signal from RFID reader 104 via antenna 106 (or alternatively, via external antenna 108). Fob antenna 202 may be in communication with a transponder 114. In one exemplary embodiment, transponder 114 may be a 13.56 MHz transponder compliant with the ISO/IEC 14443 standard, and antenna 202 may be of the 13 MHz variety. Transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of fob 102 account number. In this regard, protocol/sequence controller 208 may be any suitable digital or logic driven circuitry capable of facilitating determination of the sequence of operation for fob 102 inner-circuitry. For example, protocol/sequence controller 208 may be configured to determine whether the signal provided by RFID reader 104 is authenticated, and thereby providing to RFID reader 104 the account number stored on fob 102.

Protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 212 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from RFID reader 104.

In addition, protocol/sequence controller 208 may be in communication with a database 214 for storing at least fob 102 account data, and a unique fob 102 identification code. Protocol/sequence controller 208 may be configured to retrieve the account number from database 214 as desired. Database 214 may be of the same configuration as database 212 described above. The fob account data and/or unique fob identification code stored on database 214 may be encrypted prior to storage. Thus, where protocol/sequence controller 208 retrieves the account data, and or unique fob identification code from database 214, the account number may be encrypted when being provided to RFID reader 104. Further, the data stored on database 214 may include, for example, an unencrypted unique fob 102 identification code, a user identification, Track 1 and 2 data, as well as specific application applets.

Fob 102 may be configured to respond to multiple interrogation frequency transmissions provided by RFID reader 104. That is, as described more fully below, RFID reader 104 may provide more than one RF interrogation signal. In this case, fob 102 may be configured to respond to the multiple frequencies by including in fob 102 one or more additional RF signal receiving/transmitting units 226. RF signal receiving/transmitting unit 226 may include an antenna 218 and transponder 220 where antenna 218 and transponder 220 are compatible with at least one of the additional RF signals provided by RFID reader 104. For example, in one exemplary embodiment, fob 102 may include a 134 KHz antenna 218 configured to communicate with a 134 KHz transponder 220. In this exemplary configuration, an ISO/IEC 14443-2 compliant modulator/demodulator may not be required. Instead, the 134 KHz transponder may be configured to communicate directly with protocol/sequence controller 208 for transmission and receipt of authentication and account number signals as described above.

In another embodiment, fob 102 may further include a universal serial bus (USB) connector 132 for interfacing fob 102 to a user interface 134. User interface 134 may be further in communication with POS device 110 via network 136. Network 136 may be the Internet, an intranet, or the like as is described above with respect to network 112. Further, user interface 134 may be similar in construction to any conventional input devices and/or computing systems aforementioned for permitting the system user to interact with the system. In one exemplary embodiment, fob 102 may be configured to facilitate online Internet payments. A USB converter 222 may be in communication with a USB connector 232 for facilitating the transfer of information between the modulator/demodulator 206 and USB connector 132. Alternatively, USB converter 222 may be in communication with protocol/sequence controller 208 to facilitate the transfer of information between protocol/sequence controller 208 and USB connector 132.

Where fob 102 includes a USB connector 132, fob 102 may be in communication with, for example, a USB port on user interface 134. The information retrieved from fob 102 may be compatible with credit card and/or smart card technology enabling usage of interactive applications on the Internet. No RFID reader may be required in this embodiment since the connection to POS device 110 may be made using a USB port on user interface 134 and network 136.

Fob 102 may include means for enabling activation of the fob by the user. In one exemplary embodiment, a switch 230 which may be operated by the user of fob 102. Switch 230 on fob 102 may be used to selectively or inclusively activate fob 102 for particular uses. In this context, the term "selectively" may mean that switch 230 enables the user to place fob 102 in a particular operational mode. For example, the user may place fob 102 in a mode for enabling purchase of a good or of a service using a selected account number. Alternatively, the fob may be placed in a mode as such that the fob account number is provided by USB port 132 (or serial port) only and the fob transponder 114 is disabled. In addition, the term "inclusively" may mean that fob 102 is placed in an operational mode permitting fob 102 to be responsive to the RF interrogation and interrogation via USB connector 132. In one particular embodiment, switch 230 may remain in an OFF position ensuring that one or more applications or accounts associated with fob 102 are non-reactive to any commands issued by RFID reader 104. As used herein, the OFF position may be termed the "normal" position of activation switch 230, although other normal positions are contemplated.

In another exemplary embodiment, when switch 230 is moved from the OFF position, fob 102 may be deemed activated by the user. That is, switch 230 may activate internal circuitry in fob 102 for permitting the fob to be responsive to RF signals (e.g., commands from RFID reader 104). In this way, switch 230 may facilitate control of the active and inactive states of fob 102. Such control increases the system security by preventing inadvertent or illegal use of fob 102.

In one exemplary embodiment, switch 230 may be a simple mechanical device in communication with circuitry which may electrically prevent the fob from being powered by a RFID reader. That is, when switch 230 is in its normal position, switch 230 may provide a short to fob 102 internal circuitry, preventing fob 102 from being responsive to interrogation by RF or via the USB connector 230. In this arrangement, switch 230 may be, for example, a "normally closed" (NC) configured switch, which may be electrically connected to the antenna 202 at the interface of the antenna 202 and transponder 114. Switch 230 may be depressed, which may open switch 230 fully activating the antenna 202.

In yet another exemplary embodiment, fob 102 may include a biometric sensor and biometric membrane configured to operate as switch 230 and activate fob 102 when provided biometric signal from fob 102 user. Such biometric signal may be the digital reading of a fingerprint, thumbprint, or the like. Typically, where biometric circuitry is used, the biometric circuitry may be powered by an internal voltage source (e.g., battery). In this case, the switch may not be a simple mechanical device, but a switch which is powered. In yet another exemplary embodiment, switch 230 may be battery powered though no biometric circuitry is present in fob 102.

In yet another embodiment, switch 230 may be a logic switch. Where switch 230 is a logic switch, switch 230 control software may be read from the sequence controller 208 to selectively control the activation of the various fob 102 components.

Figure 3:
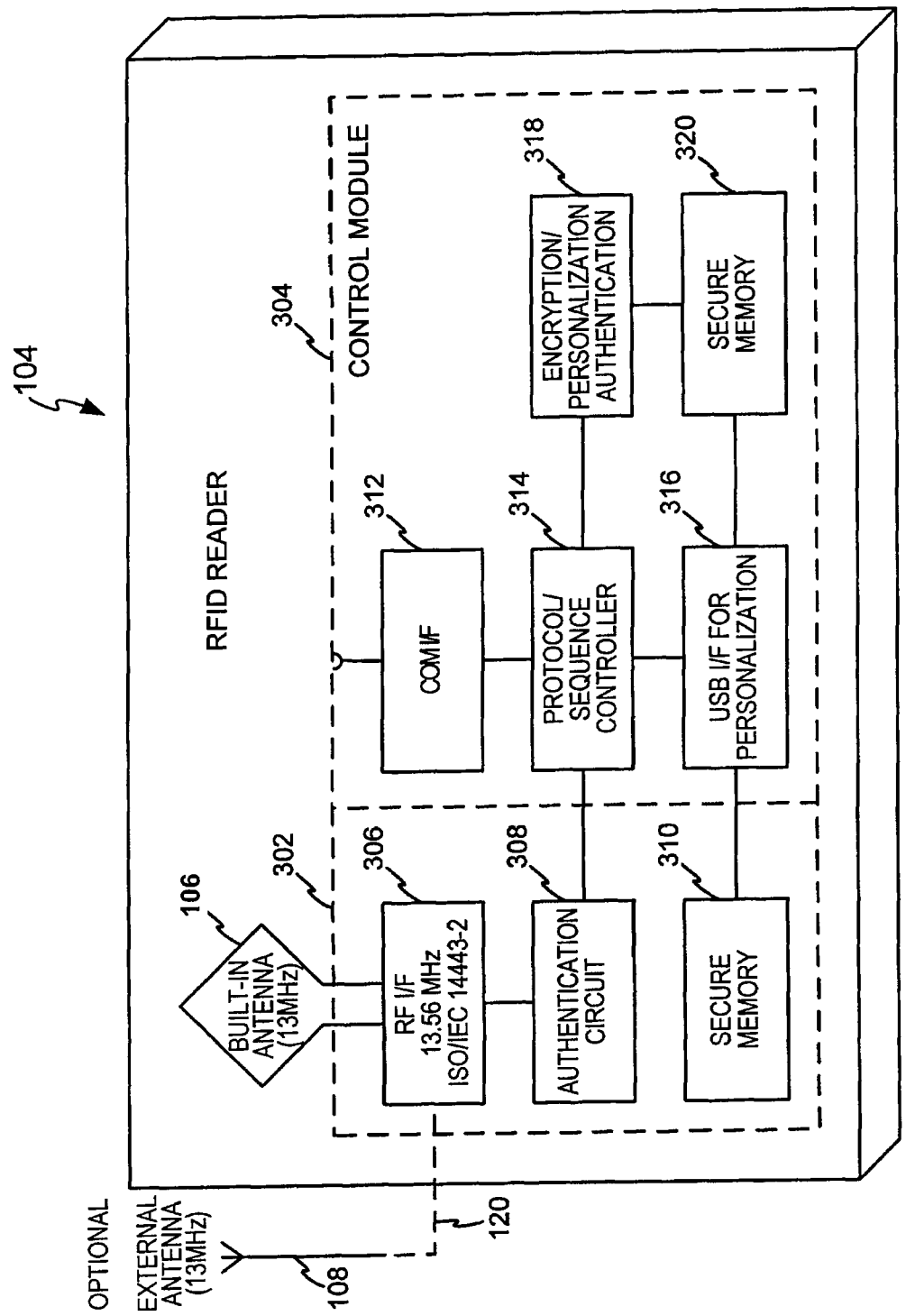
FIG. 3 is a schematic illustration of an exemplary RFID reader in accordance with the present invention.

FIG. 3 illustrates an exemplary block diagram of RFID reader 104 in accordance with an exemplary embodiment of the present invention. RFID reader 104 includes, for example, an antenna 106 coupled to a RF module 302, which is further coupled to a control module 304. In addition, RFID reader 104 may include an antenna 108 positioned remotely from RFID reader 104 and coupled to RFID reader 104 via a suitable cable 120, or other wire or wireless connection.

RF module 302 and antenna 106 may be suitably configured to facilitate communication with fob 102. Where fob 102 is formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 106 may be 13 MHz and may be configured to transmit an interrogation signal of about 13.56 MHz. That is, fob 102 may be configured to include a first and second RF module (e.g., transponder) where the first module may operate using a 134 kHz frequency and the second RF module may operate using a 13.56 MHz frequency. RFID reader 104 may include two receivers which may operate using the 134 kHz frequency, the 13.56 MHz frequency or both. When the reader 104 is operating at 134 kHz frequency, only operation with the 134 kHz module on fob 102 may be possible. When the reader 104 is operating at the 13.56 MHz frequency, only operation with the 13.56 MHz module on fob 102 may be possible. Where the reader 104 supports both a 134 kHz frequency and a 13.56 MHz RF module, fob 102 may receive both signals from the reader 104. In this case, fob 102 may be configured to prioritize selection of the one or the other frequency and reject the remaining frequency. Alternatively, the reader 104 may receive signals at both frequencies from the fob upon interrogation. In this case, the reader 104 may be configured to prioritize selection of one or the other frequency and reject the remaining frequency.

Further, protocol/sequence controller 314 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform fob 102 user that the transaction is initiated (e.g., fob is being interrogated), the fob is valid (e.g., fob is authenticated), transaction is being processed, (e.g., fob account number is being read by RFID reader) and/or the transaction is accepted or denied (e.g., transaction approved or disapproved). Such an optional feedback may or may not be accompanied by an audible indicator (or may present the audible indicator singly) for informing fob 102 user of the transaction status. The audible feedback may be a simple tone, multiple tones, musical indicator, and/or voice indicator configured to signify when the fob 102 is being interrogated, the transaction status, or the like.

RFID antenna 106 may be in communication with a transponder 306 for transmitting an interrogation signal and receiving at least one of an authentication request signal and/or an account data from fob 102. Transponder 306 may be of similar description as transponder 114 of FIG. 2. In particular, transponder 306 may be configured to send and/or receive RF signals in a format compatible with antenna 202 in similar manner as was described with respect to fob transponder 114. For example, where transponder 306 is 13.56 MHz RF rated antenna 202 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to fob 102 which are authorized to transact business over system 100. Database 310 may additionally store RFID reader 104 identifying information for providing to fob 102 for use in authenticating whether RFID reader 104 is authorized to be provided the fob account number stored on fob database 214.

Authentication circuitry 308 may be of similar description and operation as authentication circuitry 210. That is, authentication circuitry 308 may be configured to authenticate the signal provided by fob 102 in similar manner that authentication circuitry 210 may be configured to authenticate the signal provided by RFID reader 104. As is described more fully below, fob 102 and RFID reader 104 engage in mutual authentication. In this context, "mutual authentication" may mean that operation of the system 100 may not take place until fob 102 authenticates the signal from RFID reader 104, and RFID reader 104 authenticates the signal from fob 102.

Figure 4:
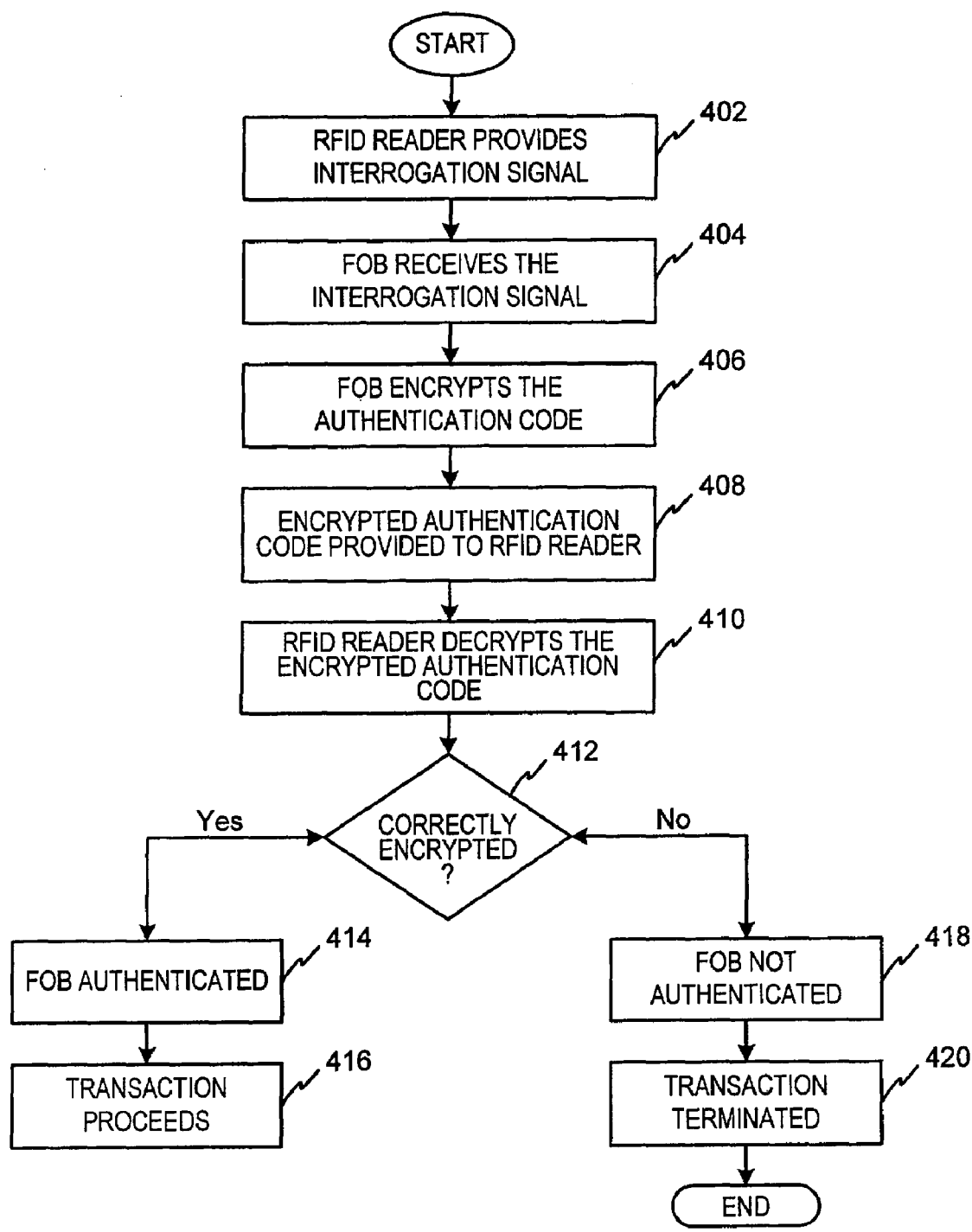
FIG. 4 is an exemplary flow diagram of an exemplary authentication process in accordance with the present invention.

FIG. 4 is a flowchart of an exemplary authentication process in accordance with the present invention. The authentication process is depicted as one-sided. That is, the flowchart depicts the process of RFID reader 104 authenticating fob 102, although similar steps may be followed in the instance that fob 102 authenticates RFID reader 104.

As noted, database 212 may store security keys for encrypting or decrypting signals received from RFID reader 104. In an exemplary authentication process, where RFID reader 104 is authenticating fob 102, RFID reader 104 may provide an interrogation signal to fob 102 (step 402). The interrogation signal may include a random code generated by the RFID reader authentication circuit 210, which is provided to fob 102 and which is encrypted using an unique encryption key corresponding to fob 102 unique identification code. For example, protocol/sequence controller 314 may provide a command to activate the authentication circuitry 308. Authentication circuitry 308 may provide from database 310 a fob interrogation signal including a random number as a part of the authentication code generated for each authentication signal. The authentication code may be an alphanumeric code which is recognizable (e.g., readable) by RFID reader 104 and fob 102. The authentication code may be provided to fob 102 via the RFID RF interface 306 and antenna 106 (or alternatively antenna 108).

Fob 102 receives the interrogation signal (step 404). The interrogation signal including the authorization code may be received at the RF interface 114 via antenna 202. Once fob 102 is activated, the interrogation signal including the authorization code may be provided to the modulator/demodulator circuit 206 where the signal may be demodulated prior to providing the signal to protocol/sequence controller 208. Protocol/sequence controller 208 may recognize the interrogation signal as a request for authentication of fob 102, and provide the authentication code to authentication circuit 210. Fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to RFID reader 104 (step 408). That is, the encrypted authentication code may be provided to RFID reader 104 via modulator/demodulator circuit 206, RF interface 114 (e.g., transponder 114) and antenna 202.

RFID reader 104 may then receive the encrypted authentication code and decrypt it (step 410). That is, the encrypted authentication code may be received at antenna 106 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on fob 102 unique identification code. For example, the encrypted authentication code may be provided along with the unique fob 102 identification code. The authentication circuit may receive fob 102 unique identification code and retrieve from the database 310 a transponder system decryption key correlative to the unique fob 102 identification code for use in decrypting the encrypted authentication code.

Once the authentication code is decrypted, the decrypted authentication code is compared to the authentication code provided by RFID reader 104 at step 402 (step 412) to verify its authenticity. If the decrypted authorization code is not readable (e.g., recognizable) by the authentication circuit 308, fob 102 is deemed to be unauthorized (e.g., unverified) (step 418) and the operation of system 100 is terminated (step 420). Contrarily, if the decrypted authorization code is recognizable (e.g., verified) by fob 102, the decrypted authorization code is deemed to be authenticated (step 414), and the transaction is allowed to proceed (step 416). In one particular embodiment, the proceeding transaction may mean that fob 102 may authenticate RFID reader 104 prior to RFID reader 104 authenticating fob 102, although, it should be apparent that RFID reader 104 may authenticate fob 102 prior to fob 102 authenticating RFID reader 104.

It should be noted that in an exemplary verification process, the authorization circuit 308 may determine whether the unlocked authorization code is identical to the authorization code provided in step 402. If the codes are not identical then fob 102 is not authorized to access system 100. Although, the verification process is described with respect to identically, identically is not required. For example, authentication circuit 308 may verify the decrypted code through any protocol, steps, or process for determining whether the decrypted code corresponds to an authorized fob 102.

Figure 5:
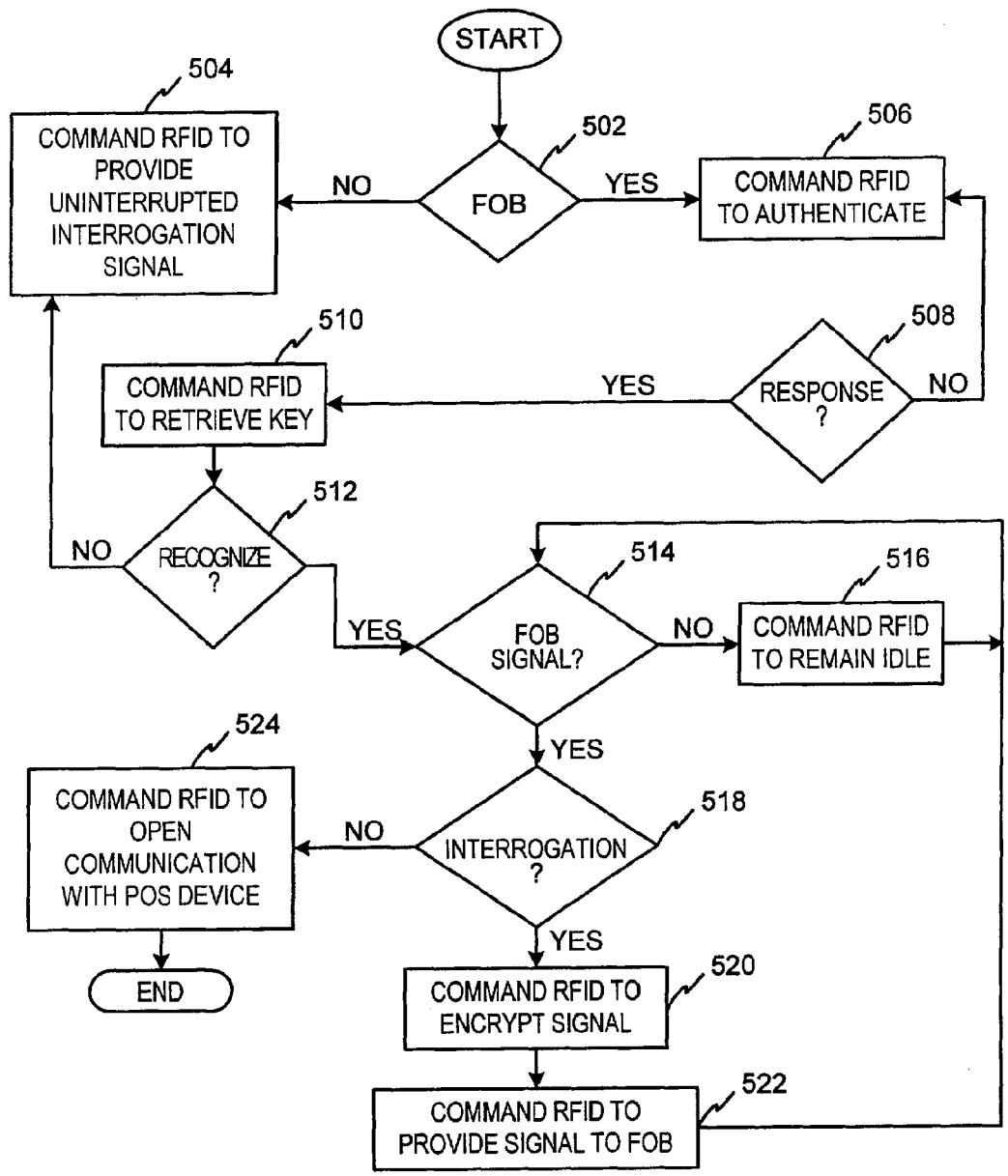
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That is, protocol/sequence device controller 314 may be configured to determine the order of operation of RFID reader 104 components. For example, FIG. 5 illustrates and exemplary decision process under which protocol/sequence controller 314 may operate. Protocol/sequence controller 314 may command the different components of RFID reader 104 based on whether fob 102 is present (step 502). For example, if fob 102 is not present, then protocol/sequence controller 314 may command RFID reader 104 to provide an uninterrupted interrogation signal (step 504). That is, the protocol/sequence controller may command the authentication circuit 308 to provide an uninterrupted interrogation signal until the presence of fob 102 is realized. If fob 102 is present, protocol/sequence controller 314 may command RFID reader 104 to authenticate fob 102 (step 506).

As noted above, authentication may mean that protocol/sequence controller 314 may command the authentication circuit 308 to provide fob 102 with an authorization code. If a response is received from fob 102, protocol/sequence controller may determine if the response is a response to RFID reader 104 provided authentication code, or if the response is a signal requiring authentication (step 508). If the signal requires authentication, then protocol/sequence controller 314 may activate the authentication circuit as described above (step 506). On the other hand, if fob 102 signal is a response to the provided authentication code, then protocol/sequence controller 314 may command RFID reader 104 to retrieve the appropriate security key for enabling recognition of the signal (step 510). That is, protocol/sequence controller 314 may command the authentication circuit 308 to retrieve from database 310 a security key (e.g., transponder system decryption key), unlock the signal, and compare the signal to the signal provided by RFID reader 104 in the authentication process (e.g., step 506). If the signal is recognized, protocol/sequence controller 314 may determine that fob 102 is authorized to access the system 100. If the signal is not recognized, then fob 102 is considered not authorized. In which case, protocol/sequence controller 314 may command the RFID controller to interrogate for authorized fobs (step 504).

Once the protocol/sequence controller determines that fob 102 is authorized, protocol/sequence controller 314 may seek to determine if additional signals are being sent by fob 102 (step 514). If no additional signal is provided by fob 102, then protocol/sequence controller 314 may provide all the components of RFID reader 104 to remain idle until such time as a signal is provided (step 516). Contrarily, where an additional fob 102 signal is provided, protocol/sequence controller 314 may determine if fob 102 is requesting access to the merchant point of sale terminal 110 (e.g., POS device) or if fob 102 is attempting to interrogate RFID reader 104 for return (e.g., mutual) authorization (step 518). Where fob 102 is requesting access to a merchant point of sale terminal 110, protocol/sequence controller 314 may command RFID reader 104 to open communications with point of sale terminal 110 (step 524). In particular, protocol/sequence controller 314 may command the point of sale terminal communications interface 312 to become active, permitting transfer of data between RFID reader 104 and the merchant point of sale terminal 110.

On the other hand, if the protocol/sequence controller determines that fob 102 signal is a mutual interrogation signal, then the protocol/sequence controller may command RFID reader 104 to encrypt the signal (step 520). Protocol/sequence controller 314 may command the encryption authentication circuit 318 to retrieve from database 320 the appropriate encryption key in response to fob 102 mutual interrogation signal. Protocol/sequence controller 314 may then command RFID reader 104 to provide the encrypted mutual interrogation signal to fob 102. Protocol/sequence controller 314 may command the authentication circuit 318 to provide an encrypted mutual interrogation signal for fob 102 to mutually authenticate. Fob 102 may then receive the encrypted mutual interrogation signal and retrieve from authentication circuitry 212 a RFID reader decryption key.

Although an exemplary decision process of protocol/sequence controller 314 is described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device is so connected.

Encryption/decryption component 318 may be further in communication with a secure account number database 320 which stores the security keys necessary for decrypting the encrypted fob account number. Upon appropriate request from protocol/sequence controller 314, encryption/decryption component (e.g., circuitry 318) may retrieve the appropriate security key, decrypt the fob account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. That is, in accordance with the invention, there is no need to translate or correlate the account number to traditional magnetic stripe format as is done with the prior art. The invention processes the transaction request directly, as if the card associated with the account has been presented for payment.

Upon receiving the account number in magnetic stripe format, protocol/sequence controller 314 may forward the account number to POS device 110 via a communications interface 312 and data link 122, as best shown in FIG. 1. POS device 110 may receive the decrypted account number and forward the magnetic stripe formatted account number to a merchant network 112 for processing under the merchant's business as usual standard. In this way, the present invention eliminates the need of a third-party server. Further, where POS device 110 receives a response from network 112 (e.g., transaction authorized or denied), protocol/sequence controller 314 may provide the network response to the RF module 302 for optically and/or audibly communicating the response to fob 102 user.

RFID reader 104 may additionally include a USB interface 316, in communication with the protocol/sequence controller 314. In one embodiment, the USB interface may be a RS22 serial data interface. Alternatively, RFID reader 104 may include a serial interface such as, for example, a RS232 interface in communication with the protocol/sequence controller 314. The USB connector 316 may be in communication with a personalization system 116 (shown in FIG. 1B) for initializing RFID reader 104 to system 100 application parameters. That is, prior to operation of system 100, RFID reader 104 may be in communication with personalization system 116 for populating database 310 with a listing of security keys belonging to authorized fobs 102, and for populating database 320 with the security keys to decrypt fob 102 account numbers placing the account numbers in ISO/IEC 7813 format. In this way, RFID reader 104 may be populated with a unique identifier (e.g., serial number) which may be used by fob authentication circuitry 210 to determine if RFID reader 104 is authorized to receive fob 102 encrypted account number.

Figure 1B:
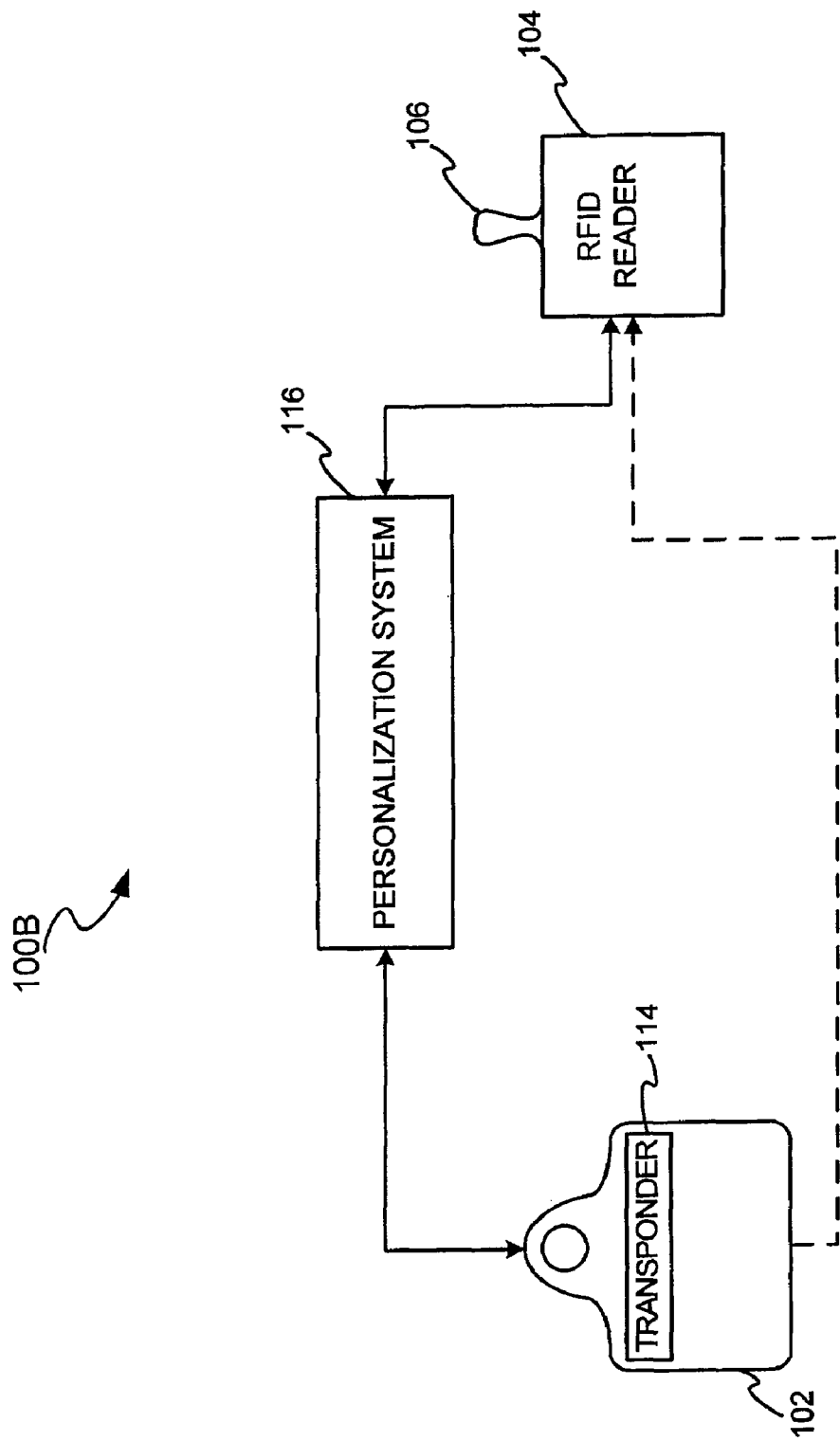
FIG. 1B illustrates an exemplary personalization system in accordance with the present invention.

FIG. 1B illustrates an exemplary personalization system 100B, in accordance with the present invention. In general, typical personalization system 100B may be any system for initializing RFID reader 104 and fob 102 for use in system 100A. With reference to FIG. 1B, the similar personalization process for fob 102 may be illustrated. For example, personalization system 116 may be in communication with fob 102 via RF ISO 14443 interface 114 for populating fob database 212 with the security keys for facilitating authentication of the unique RFID reader 104 identifier. In addition, personalization system 116 may populate on database 212 a unique fob 102 identifier for use by RFID reader 104 in determining whether fob 102 is authorized to access system 100. Personalization system 116 may populate (e.g., inject) the encrypted fob 102 account number into fob database 214 for later providing to an authenticated RFID reader 104.

In one exemplary embodiment, personalization system 116 may include any standard computing system as described above. For example, personalization system 116 may include a standard personal computer containing a hardware security module operable using any conventional graphic user interface. Prior to populating the security key information account number and unique identifying information into fob 102 or RFID reader 104, the hardware security module may authenticate fob 102 and RFID reader 104 to verify that the components are authorized to receive the secure information.

Figure 6A:
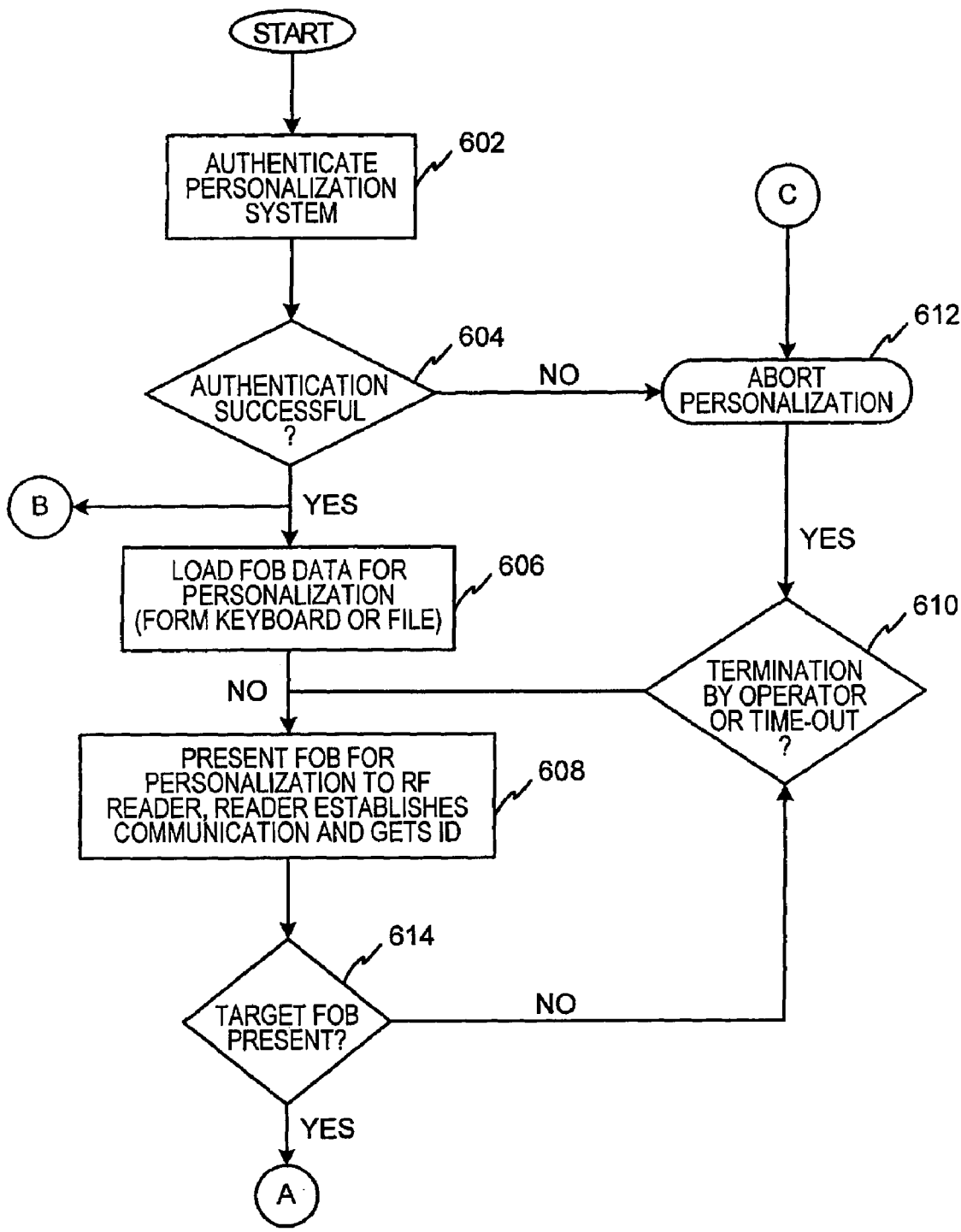
FIGS. 6A-B are exemplary flow diagrams of a fob personalization process in accordance with the present invention.
Figure 6B:
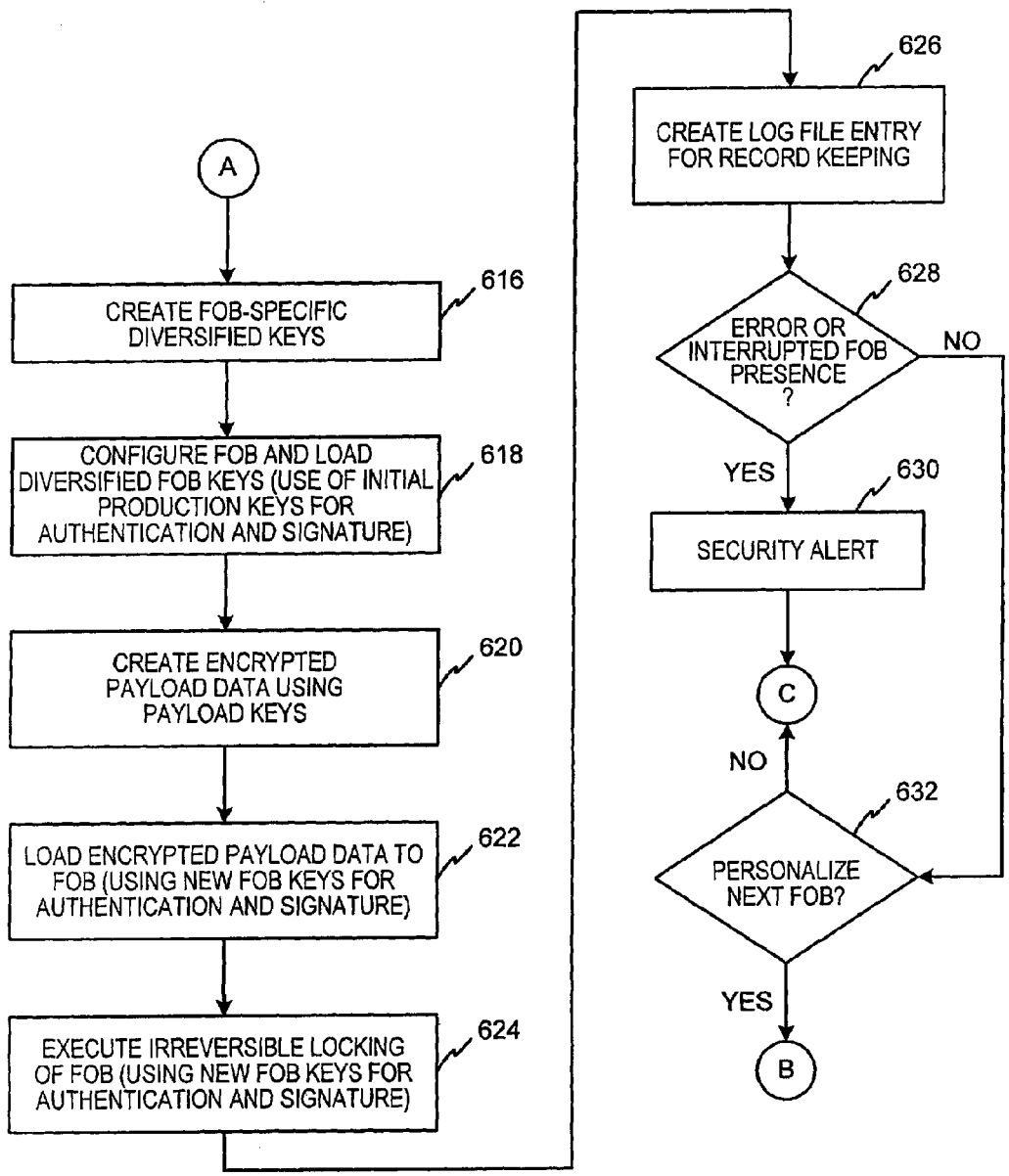

FIGS. 6A-B illustrate an exemplary flowchart of a personalization procedure which may be used to personalize fob 102 and/or RFID reader 104. Although the following description discusses mainly personalization of fob 102, RFID reader 104 may be personalized using a similar process. The personalization process, which occurs between the personalization system 116 and the device to be personalized (e.g., fob 102 or RFID reader 104), may begin, for example at step 602. Mutual authentication may occur between the personalization system 116 and the device to be authenticated in much the same manner as was described above with regard to fob 102 mutually authenticating with RFID reader 104. That is, personalization system 116 may transmit a personalization system 116 identifier to the device to be authenticated which is compared by the device authentication circuitry 210, 308 against personalization system identifiers stored in the device database 212, 310. Where a match does not occur (step 604), the personalization process may be aborted (step 612). Where a match occurs (step 604), the personalization system may prepare a personalization file to be provided to the device to be personalized (step 606). If the personalization system is operated manually, the personalization file may be entered into the personalization system 116 using any suitable system interface such as, for example, a keyboard (step 606). Where the personalization system 116 operator elects to delay the preparation of the personalization files, the system 116 may abort the personalization process (step 610). In this context, the personalization file may include the unique fob 102 or RFID reader 104 identifier, security key for loading into database 212 and 310, and/or security keys for decrypting a fob account number which may be loaded in database 320.

Fob 102 may be personalized by direct connection to the personalization system 116 via RF ISO/IEC 14443 interface 114, or fob 102 may be personalized using RFID reader 104. Personalization system 116 and RFID reader 104 may engage in mutual authentication and RFID reader 104 may be configured to transmit the fob personalization file to fob 102 via RF. Once fob 102 is presented to RFID reader 104 (steps 608, 614) for personalization, fob 102 and RFID reader 104 may engage in mutual authentication (step 614). Where fob 102 is not presented to RFID reader 104 for personalization, the personalization process may be aborted (step 610).

If fob 102 is detected, the personalization system 116 may create as a part of the personalization file, a unique identifier for providing to fob 102 (step 616). The identifier is unique in that one identifier may be given only to a single fob. That is, no other fob may have that same identifier. The fob may then be configured and loaded with that identifier (step 618).

The encrypted fob 102 account number may be populated into fob 102 in the same manner as is described with respect to fob 102 unique identifier. That is, personalization system 116 may pre-encrypt the account data (step 620) and inject the encrypted account into fob database 214 (step 622). The encrypted account data may be loaded (e.g., injected) into fob 102 using RFID reader 104 as discussed above.

Once the personalization file is populated into fob 102, the populated information is irreversibly locked to prevent alteration, unauthorized reading and/or unauthorized access (step 624). Personalization system 116 may then create a log of the personalization file information for later access and analysis by the personalization system 116 user (step 626).

It should be noted that in the event the personalization process is compromised or interrupted (step 628), personalization system 116 may send a security alert to the user (step 630) and the personalization process may be aborted (step 612). On the other hand, where no such compromising or interruption exists, personalization system 116 may be prepared to begin initialization on a second device to be personalized (step 632).

Figure 7A:
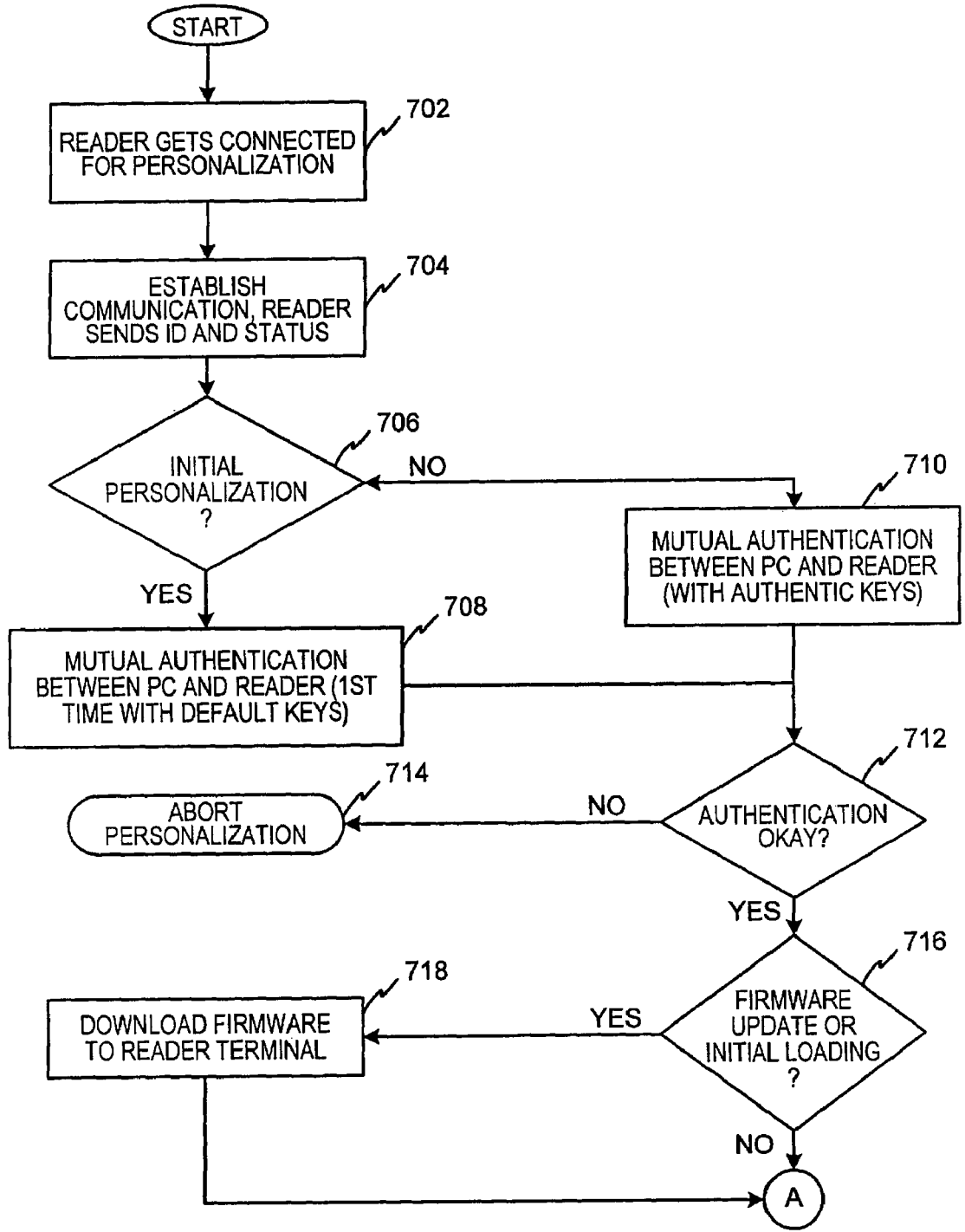
FIGS. 7A-B are exemplary flow diagrams of a RFID reader personalization process in accordance with the present invention.
Figure 7B:
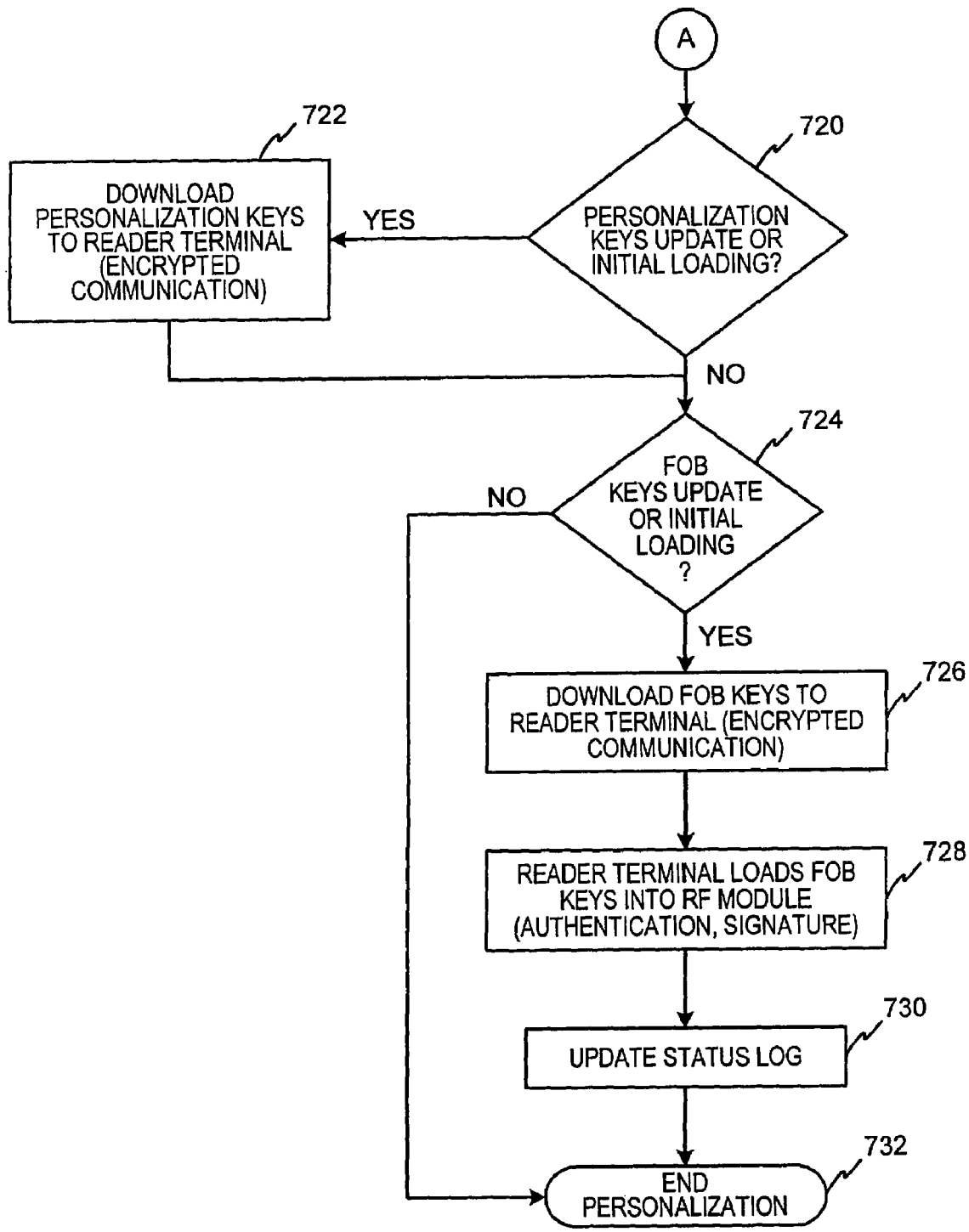

FIGS. 7A-B illustrate another exemplary embodiment of a personalization process which may be used to personalize RFID reader 104. RFID reader 104 may be in communication with a personalization system 116 via RFID reader USB connection 316 (step 702). Once connected, personalization system 116 may establish communications with RFID reader 104 and RFID reader 104 may provide personalization system 116 any RFID reader 104 identification data presently stored on RFID reader 104 (step 704). In accordance with step 708, where RFID reader 104 is being personalized for the first time (step 706) RFID reader 104 and personalization system 116 may engage in mutual authentication as described above with respect to FIGS. 6A-B. After the mutual authentication is complete, personalization system 116 may verify that RFID reader 104 is properly manufactured or configured to operate within system 100. The verification may include evaluating the operation of RFID reader 104 by determining if the RFID reader will accept predetermined default settings. That is, personalization system 116 may then provide RFID reader 104 a set of default settings (step 708) and determine if RFID reader 104 accepts those settings (step 712). If RFID reader 104 does not accept the default settings, personalization system 116 may abort the personalization process (step 714).

If personalization system 116 determines that the personalization process is not the first personalization process undertaken by RFID reader 104 (step 706), personalization system 116 and RFID reader 104 may engage in a mutual authentication process using the existing security keys already stored on RFID reader 104 (step 710). If authentication is unsuccessful (step 712), personalization system 116 may abort the personalization process (step 714).

Where personalization system 116 and RFID reader 104 successfully mutually authenticate, personalization system 116 may update RFID reader 104 security keys (step 716). Updating the security keys may take place at any time as determined by a system 100 manager. The updating may take place as part of a routine maintenance or merely to install current security key data. The updating may be performed by downloading firmware into RFID reader 104 (step 718). In the event that personalization system 116 determines in step 706 that RFID reader 104 is undergoing an initial personalization, the firmware may be loaded into RFID reader 104 for the first time. In this context, "firmware" may include any file which enables the RFID reader 102 to operate under system 100 guidelines. For example, such guidelines may be directed toward the operation of RFID reader protocol/sequence controller 314.

Personalization system 116 may then determine if the personalization keys (e.g., security keys, decryption keys, RFID identifier) need to be updated or if RFID reader 104 needs to have an initial installation of the personalization keys (step 720). If so, then personalization system 116 may download the personalization keys as appropriate (step 722).

Personalization system 116 may then check RFID reader 104 to determine if fob 102 identifiers and corresponding security keys should be updated or initially loaded (step 724). If no updating is necessary personalization system 116 may end the personalization procedure (step 732). Contrarily, if personalization system 116 determines that fob 102 identifiers and corresponding keys need to be updated or installed, personalization system 116 may download the information onto RFID reader 104 (step 726). The information (e.g., fob security keys and identifiers) may be downloaded in an encrypted format and RFID reader 104 may store the information in the RFID reader database 310 as appropriate (step 728). Personalization system 116 may then create or update a status log cataloging for later use and analysis by personalization system 116 user (step 730). Upon updating the status log, the personalization process may be terminated (step 732).

It should be noted that, in some instances it may be necessary to repersonalize the RFID reader in similar manner as described above. In that instance, the personalization process described in FIGS. 7A and 7B may be repeated.

Figure 8:
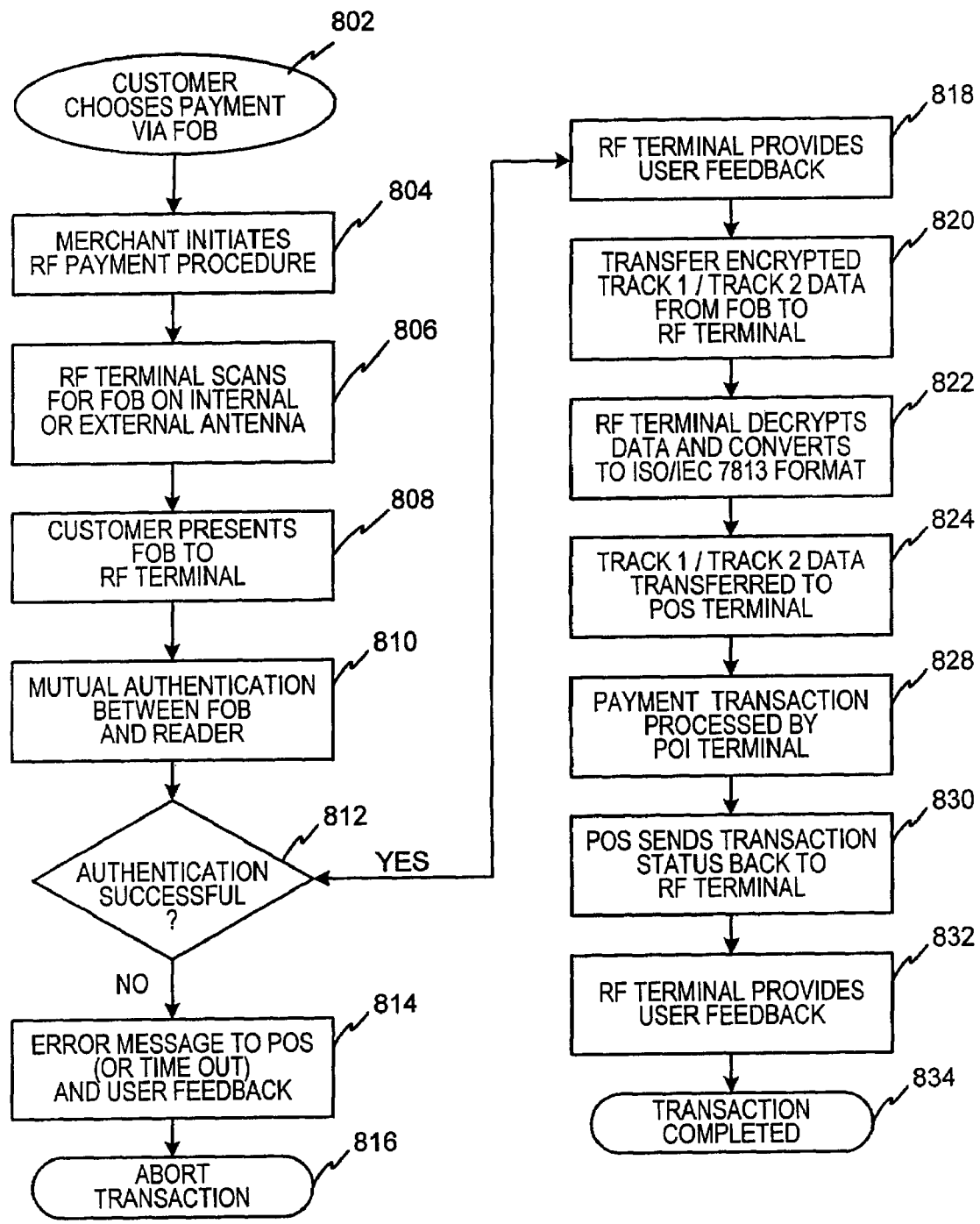
FIG. 8 is a flow diagram of an exemplary payment/transaction process in accordance with the present invention.

FIG. 8 illustrates an exemplary flow diagram for the operation of system 100A. The operation may be understood with reference to FIG. 1A, which depicts the elements of system 100A which may be used in an exemplary transaction. The process is initiated when a customer desires to present fob 102 for payment (step 802). Upon presentation of fob 102, the merchant initiates the RF payment procedure via an RFID reader 104 (step 804). In particular, the RFID reader sends out an interrogation signal to scan for the presence of fob 102 (step 806). The RF signal may be provided via the RFID reader antenna 106 or optionally via external antenna 108. The customer then may present fob 102 for payment (step 808) and fob 102 is activated by the RF interrogation signal provided.

Fob 102 and RFID reader 104 may then engage in mutual authentication (step 810). Where the mutual authentication is unsuccessful, an error message may be provided to the customer via the RFID optical and/or audible indicator (step 814) and the transaction may be aborted (step 816). Where the mutual authentication is successful (step 812), RFID reader 104 may provide the customer with an appropriate optical and/or audible message (e.g., "transaction processing" or "wait") (step 818). The fob protocol/sequence controller 208 may then retrieve from database 214 an encrypted fob account number and provide the encrypted account number to RFID reader 104 (step 820).

RFID reader 104 may then decrypt the account number and convert the account number into magnetic stripe (ISO/IEC 7813) format (step 822) and provide the unencrypted account number to merchant system 130 (step 828). In particular, the account number may be provided to POS 110 device for transmission to merchant network 112 for processing. Exemplary processing methods according to the present invention are discussed with respect to FIGS. 10-13, shown below. Upon processing, POS device 110 may then send an optical and/or audible transaction status message to RFID reader 104 (step 830) for communication to the customer (step 832).

The methods for processing the transactions may include one of several formats as required by the fob issuer. For example, one processing method may include processing the transaction under a preloaded fob format wherein a payment value (e.g., monetary value, reward points value, barter points value, etc.) may be preloaded into a preloaded value account or data file prior to permitting usage of the fob. In this way, the user may be permitted to set aside a payment amount for transactions for goods and services using the fob. During processing of the transaction, approval of the transaction may involve comparing the transaction amount to the amount stored (or remaining) in the preloaded value data file. Comparison may be made by a preloaded value processing system wherein the preloaded value processing system may compare the transaction amount to be processed to the preload value data file. Where the transaction amount exceeds the amount stored in the preloaded value account, the preloaded value processing system may deny authorization for completion of the transaction, request that the user increase the value in the data file, request another form of payment to satisfy all or a portion of the transaction amount, and/or any other means to satisfy the associated financial institution of payment. Where the transaction amount does not exceed the amount stored in the preloaded value data file account, the preloaded value processing system may provide for authorization of the transaction.

Figure 10:
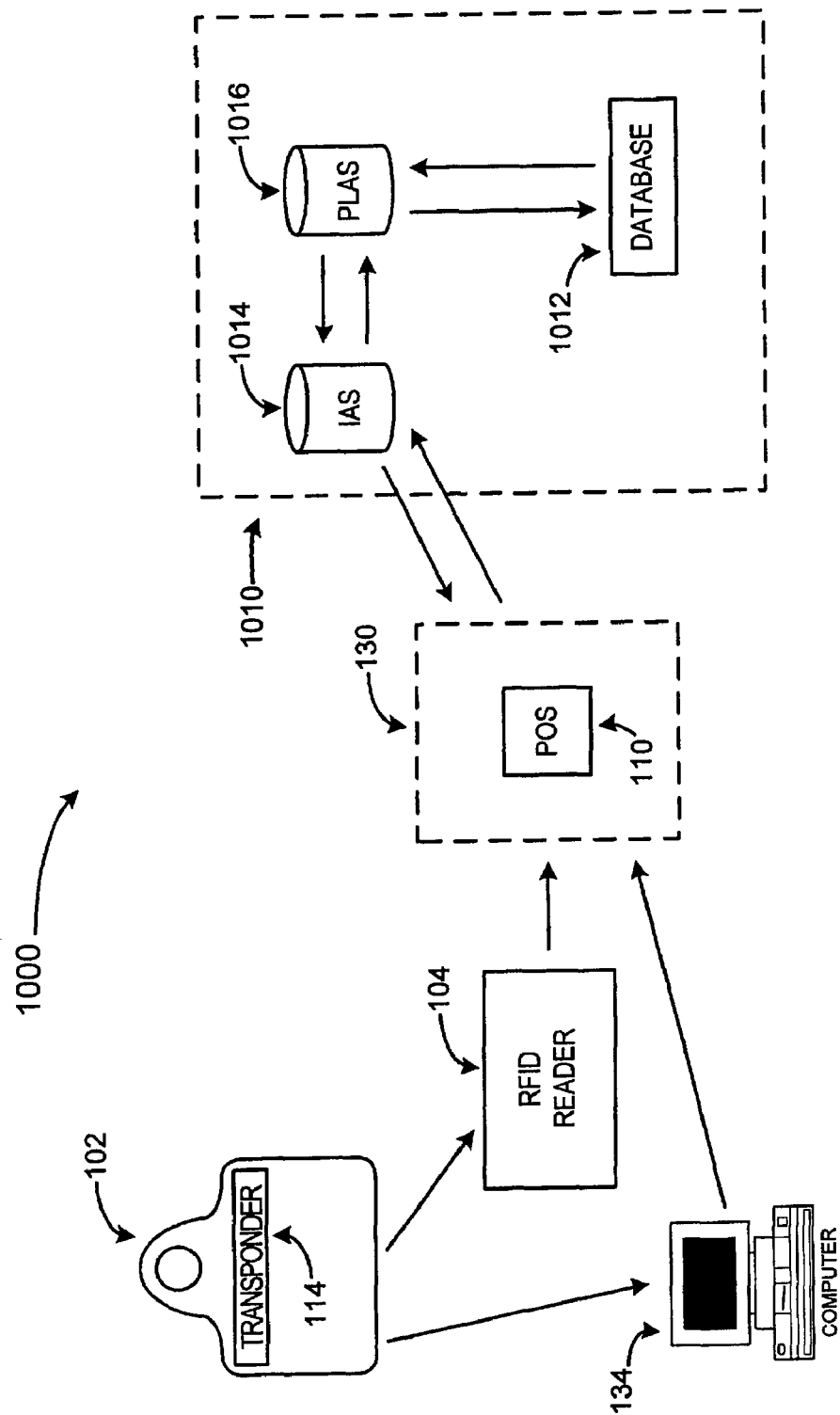
FIG. 10 is a depiction of an exemplary preloaded fob payment/transaction process in accordance with the present invention.

An exemplary preloaded value processing system 1000 is shown with respect to FIG. 10. Preloaded value processing system 1000 may include fob 102 including transponder 114, which is in communication with a merchant system 130 via RFID reader 104 or computer interface 134 as is described with respect to FIG. 1A. The merchant system may be in communication with an issuer system 1010, where issuer system 1010 may be maintained by any entity (e.g., non-financial or financial institution, American Express®, Visa® and/or MasterCard®, etc.) which permits fob 102 user to store a preload value amount in a preloaded value account (e.g., data file) maintained on an issuer database 1012 of similar construction as database 212. Issuer system 1010 may further include one or more process servers for processing a fob transaction. As shown, POS device 110 (included in merchant system 130) may be in communication with an issuer account server (IAS) 1014 for receiving the fob account information from POS device 110. IAS 1014 may be in further communication with a preloaded value authorization server (PLAS) 1016 for processing transactions involving a preloaded value fob. PLAS 1016 may be in further communication with issuer database 1012 for retrieving funds from the preloaded value data file (not shown) which are used for satisfying the preloaded fob or merchant transaction request. In this instance, the preloaded value data file may be included on database 1012 as, for example, one or more sub-files.

As used herein, the term "issuer" or "account provider" may refer to any entity facilitating payment of a transaction using a fob, and may include systems permitting payment using at least one of a preloaded and non-preloaded fob. Typical issuers may be, for example, American Express®, MasterCard®, Visa, Discover®, and the like. In the preloaded value processing context, an exchange value (e.g., money, rewards points, barter points, etc.) may be stored in a preloaded value data file for use in completing a requested transaction. In one embodiment, the exchange value is not be stored on the fob itself. Further, the preloaded value data file may be debited the amount of the transaction, so the preloaded value account may be replenished. As described more fully below, the preloaded value system platform may be used to complete "direct link" transactions. In which case, the preloaded value account may function as a place holder and may store a zero value.

The preloaded value data file may be any conventional data file configuration for storing a value (e.g., monetary, rewards points, barter points, etc.) which may be exchanged for goods or services. In that regard, the preloaded value data file may have any configuration as determined or desired by the issuer system 1010.

In exemplary operation, fob identifying information (e.g., account number or fob marker) may be provided to POS device 110 in similar manner as was discussed with respect to FIG. 1A. That is, fob 102 may be presented to merchant system 130 via RFID reader 104 or a computer interface 134, which may provide the fob identifying information in Track 1 or Track 2 format, or any format recognizable by POS device 110 and/or issuer system 1010. POS device 110 included in merchant system 130 may receive fob 102 identifying information and provide fob 102 identifying information along with the transaction identifying information (e.g., amount, quantity, merchant identification, etc.) to issuer system 1010 for authorization. Merchant system 130 may additionally include a merchant system marker or identifier for indicating a merchant system identity. Merchant system 130 may combine fob 102 identifying information, the merchant identifying information, and/or the transaction identifying information, into a merchant transaction request for providing to the issuer system 1010.

IAS 1014 may receive the transaction and fob identifying information (or merchant transaction request) and suitably recognize that the transaction is being requested relative to a preloaded value account associated with a preloaded fob. That is, IAS 1014 may recognize that the user has presented a preloaded fob 102 for payment. Recognition of fob 102 as a preloaded fob may mean that the fob identifying information includes a marker or identifier indicating that the fob is associated with a preloaded value data file. Upon recognition of the marker, IAS 1014 may forward transaction and fob identifying information to PLAS 1016 for processing. PLAS 1016 may compare the transaction amount to the value stored or remaining in the preloaded value to determine if authorization should be granted or denied. Where the transaction amount exceeds the value stored in the preloaded value data file, PLAS 1016 may forward a transaction denied message to IAS 1014 for providing to the merchant system 130, or the PLAS may facilitate a request that the user increase the value in the data file, request another form of payment to satisfy all or a portion of the transaction amount, and/or any other means to satisfy the associated financial institution of current or future payment. Alternatively, where the transaction amount is less than or equal to the value stored in the preload value data file PLAS 1016 may deduct from the preloaded value data file the necessary amount for satisfaction of the transaction.

As noted above, in one exemplary embodiment of the present invention, PLAS 1016 may provide a transaction denied message to IAS 1014 for various financial security reasons, such as where the amount stored in the preloaded value account is less than required for satisfying the merchant or fob transaction request. In this instance, where the preloaded value falls below a predetermined minimum level (e.g., minimum depletion level), it may be necessary for the fob user to reload the preloaded value data file. Reloading of the preloaded value account may take place manually (e.g., by the fob user telephonically or online) or may take place automatically when the value stored in the preloaded value data file is depleted to a predefined level. Where the reloading is done automatically, reloading may occur under rules established by the fob issuer or owner. For example, reloading may occur at preselected time intervals, when the value stored is below a predetermined amount, until a maximum number of reloads in a predetermined time period has occurred or until a maximum reload amount is reached in a predetermined time period.

In another exemplary operation, processing system 1000 may be operated offline. For example, merchant system 130 may be offline with respect to issuer system 1010. That is, transactions may be approved at merchant system 130, prior to the transaction identifying information being transferred to the issuer system. Instead, merchant system 130 may be provided an approval protocol for use in evaluating the merchant transaction request. For example, the approval protocol may provide for transaction approval where the transaction is below a certain amount, includes a particular merchant or goods or service, or is requested from a particular location or the like. Once the offline transaction is completed, the merchant may seek satisfaction of the transaction at a later time-period by submitting the transaction to the issuer individually, in batch, or under any submission processing determined by the merchant.

For offline transactions, fob 102 may include a counter (not shown) which may track the number of offline transactions. Once a predetermined number of transactions are attempted, the counter may be used to facilitate disenabling fob 102 usage. At which point fob 102 user may be required to perform an online transaction whereby the counter may be reset, again permitting offline usage of the fob. As can be understood, requiring online usage following a predetermined number of offline usages may function as an additional security measure.

FIGS. 11A and 11B depict exemplary preloading and reloading processes which may be performed in accordance with the present invention. The preloading and reloading processes may be preformed using one or more servers (e.g., PLAS 1016) in communication with a funding source 1104. Although the processes are demonstrated using a PLAS 1016, it is contemplated that any server configured for establishing and managing data files may be used. However, to facilitate further understanding of the invention, the preloading and reloading aspects of the invention are described with reference to PLAS 1016.

PLAS 1016 may be used to establish on the server or on a database (e.g., database 1012) a preloaded value account (e.g. data file) (1106). The preload value account may be funded or maintained by a fob issuer/account provider which may establish a credit, charge, debit, rewards value account, loyalty account, or the like, in connection with a charge or credit card (e.g., Visa, MasterCard, American Express, Discover, etc.), debit or direct debit authorization (DDA) system.

The preloaded value account may be established to at least a predetermined minimum preload amount or value (e.g., minimum preload level) as determined by the account provider and/or the fob user or owner. In this context, the predetermined minimum value (e.g., minimum preload value) required to establish the preloaded value account may vary with respect to a particular fob user. The preloaded value account may be loaded (e.g., preloaded or reloaded) from funds received from one of a funding source 1104 (American Express, Visa, MasterCard, Discover, fuel cards, or the like). Further, the preloaded value account may be loaded with value received from loyalty or rewards points provider. To facilitate the understanding of the invention, the loyalty or rewards point provider may be referred to herein as a funding source. Thus, PLAS 1016 may communicate with the funding source 1104 to obtain funds or value for loading and/or reloading the preloaded value account (1108).

FIG. 11B shows an exemplary reloading process in accordance with the invention. During operation, a consumer may present to merchant system 130 the prepaid fob 102 for purchasing goods or services (1110). The preloaded value account is then depleted the value amount paid to merchant system 130. The process for purchasing goods may be repeated until the value stored in the preloaded value account equals or is less than a minimum level balance (e.g., minimum depletion level). The minimum depletion level may be predetermined by the fob user or fob issuer, and may be the minimum value permitted to be stored in the preloaded value account before the file is to be reloaded.

Once the preloaded value data is depleted such that the minimum depletion level is reached, PLAS 1016 may trigger an automatic reload to reload the preloaded value account from funds retrieved from the funding source 1104 (1112). The amount of funds retrieved may be sufficient for loading the preloaded value account to the minimum amount described above or to some other predetermined reload value. In one exemplary embodiment, PLAS 1016 may trigger automatic reloading where a predetermined minimum depletion level (e.g., "minimum level balance") is reached. That is, the preloaded value account may not be entirely depleted to zero value before automatic reloading occurs. In this instance, PLAS 1016 may charge the funding necessary for automatic reloading against the available funds at funding source 1104. In another exemplary embodiment, the automatic reloading may occur where the transaction exceeds the amount stored in or remaining in the preloaded value account. In this way, the preloaded value account may be restored to an amount necessary for completion of the transaction. For example, where automatic reloading restores the preloaded value account to a value suitable for transaction completion, the preloaded value account may be automatically reloaded prior to processing the transaction.

In another exemplary embodiment, automatic reloading may occur based on different user or issuer automatic reload criteria. Other automatic reload criteria may include, but are not limited to, reloading until a defined maximum load amount in a defined time period is reached, reloading at a selected reoccurring time interval (e.g., once a month), reloading as permitted until a defined maximum number of reloads in a specified time period is reached, or reloading until a defined maximum reload amount is reached in a specified time period. In some instances, reloading may be accomplished manually, such as, for example, when the fob user contacts the issuer telephonically or via user interface to provide a specified funding criteria and funding source for use in reloading the preloaded value account.

In yet another exemplary embodiment, the preloaded value transaction processing system may permit approval of a transaction where the transaction value exceeds the preloaded value amount stored in the preloaded value account. That is, the preloaded fob may be used for purchases exceeding the preloaded value amount provided that the charge submitted by the merchant is less than or equal to the maximum reload amount permitted plus the amount stored on the card at the time the charge is submitted.

In another exemplary embodiment, the preloaded value system may approve transactions based on a particular merchant's transaction processing protocol. Where the issuer has reviewed and/or approved a merchant's transaction processing method, the system may take the method in consideration in determining whether to approve a merchant's transaction request. For example, a merchant's transaction processing method may include the merchant submitting transaction requests which exceed the preloaded value amount, but the actual charge may be less than or equal to the preloaded value amount. Under this transaction processing method a merchant, Such as, for example, a gasoline merchant, may seek pre-approval of an anticipated gasoline fueling amount. Neither the consumer nor the merchant may know the exact final value of the purchase, especially, for example, where the consumer decides to fill his automobile gas tank or purchase non-fuel items. Thus, the merchant may submit a transaction request which may be higher than the final amount of the transaction. The merchant may submit the transaction request in real-time or at a later time period in a similar manner as is described above with respect to offline transaction request processing. In either on line or off line processing, the preloaded value transaction processing system may still be configured to approve the transaction request. The processing system may recognize that a transaction came from a particular merchant and institute a predetermined approval protocol correlative to that merchant, since the approval protocol may include information that the merchant is sending a transaction request exceeding the actual charge.

The transaction processing system may use any one of the acceptable techniques for identifying merchants, such as recognition of the merchant ID, or a marker appended to the transaction, or the like. The processing system may correlate the merchant ID with a merchant protocol for requesting a transaction approval of an amount greater than the preloaded value (or reload value), and approve the merchant request accordingly.

In accordance with an alternate exemplary embodiment of a preloaded value processing system 1000, upon receiving the transaction request from the IAS 1014, PLAS 1016 may evaluate the transaction request based upon several risk criteria established by the issuer for either online or offline transactions. If all the criteria are successfully met, then PLAS 1016 may send authorization of the transaction (e.g., "transaction granted") to IAS 1014 for providing to merchant system 130. Simultaneous with or subsequent to, providing the transaction authorization to the IAS 1014, PLAS 1016 may seek satisfaction of the transaction from the fob value account maintained on the account provider database 1012. The transaction request may be provided to IAS 1014 for processing. That is, IAS 1014 may seek to deduct the transaction value from the balance of the amount stored in the preloaded value account.

Figure 12:
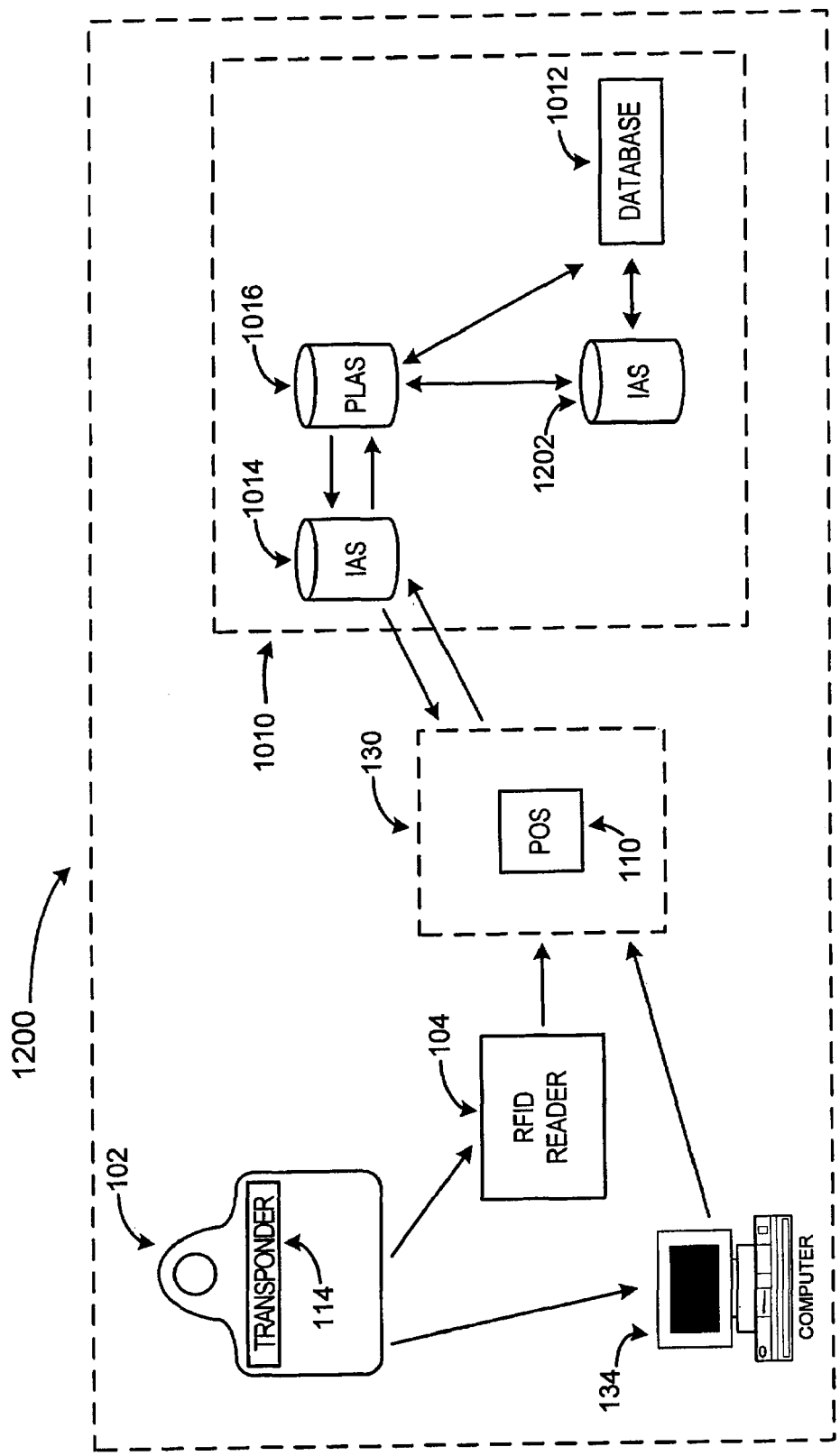
FIG. 12 is a depiction of an exemplary Direct Link payment/transaction process in accordance with the present invention.

FIG. 12 depicts an exemplary embodiment of another transaction processing system ("direct link" system) 1200 in accordance with the present invention. More particularly, FIG. 12 depicts a direct link system 1200 which may be used to process a merchant transaction request. In this context, a direct link system may be any system which facilitates satisfaction of a transaction request using a fob or other presentable medium (credit card, charge card, debit card, or the like) directly linked to an account which stores an exchange value (e.g., money, credit or charge, or rewards points, etc.). In this instance, the preloaded value account may not be preloaded as described above. Further, the preloaded value account may be linked to a contact financial product such as a credit, debit, and/or DDA card, and the like, which may be presented for payment of goods and services. In this regard, the fob (here called "direct link fob") and the card are associated with the same funding source and the user or merchant may seek satisfaction of a transaction from the funding source independent of whether the direct link fob or card is used. In the exemplary direct link system 1200, the direct link fob 102 user may not establish a preloaded value account with value. Instead, the preloaded value account may perpetually store a zero value or fob 102 may be associated with a fob transaction account which may be used to provide payment to the merchant for goods and services where the account may be a credit, debit, loyalty account or the like.

In accordance with an exemplary embodiment of the invention, a transaction request associated with a direct link fob 102 may be processed using the preloaded value transaction system processing described above. However, as noted, in this instance the preloaded value account is used as a place holder storing a zero value. A transaction account containing a transaction account value which is associated with the direct link fob is treated as the funding source for satisfying direct link transactions. In this instance, the transaction may be satisfied according to a fob user or issuer predefined protocol or criteria.

As shown, merchant system 130 may be in communication with an issuer system 1010 for receiving a merchant transaction request. More particularly, POS device 110 may be in communication with an issuer server, such as, for example, an issuer account server (IAS) 1014 for receiving the merchant and/or transaction identifying information. IAS 1014 may be in further communication with a PLAS 1016 for processing the merchant transaction request. In some instances PLAS 1016 may be in further communication with a second IAS 1202, although a second IAS 1202 may not be required where one or more of the existing servers may perform the functions of IAS 1202 described below. However, the IAS 1202 is included herein to simplify the understanding the operation of this exemplary embodiment.

In exemplary operation of system 1200, the direct link fob identifying information (e.g., fob identifier or account number) may be provided to POS device 110 in similar manner as was discussed with respect to FIG. 1A. That is, the direct link fob 102 may be presented to merchant system 130 via RFID reader 104 or computer interface 134, which may provide the direct link fob 102 identifying information in Track 1 or Track 2 format. POS device 110 included in merchant system 130 may receive the direct link fob 102 identifying information and provide the direct link fob 102 identifying information along with the transaction identifying information (e.g., amount, quantity, merchant identification, etc.) to issuer system 1010 for authorization.

IAS 1014 may receive the transaction and fob identifying information and recognize that the transaction as being requested relative to a direct link fob 102. Recognition of the direct link fob 102 in this instance may mean that the direct link fob 102 identifying information includes a marker or identifier indicating that the fob is associated with a zero value preloaded value account. Upon recognition of the marker, IAS 1014 may forward the transaction and fob identifying information to PLAS 1016 for processing.

In similar manner as was described with respect to the operation of the preloaded value processing system of FIG. 10, PLAS 1016 may evaluate the transaction request based upon several risk criteria established by the issuer. Exemplary risk criteria may include, but are not limited to, consideration of transaction amount limits for a specified time period, fob user usage history, fund or reserve limits, pre-determined re-funding rules, user defined limits, or any similar evaluative criteria. If all the criteria are successfully met, then PLAS 1016 may send authorization of the transaction (e.g., "transaction granted") to IAS 1014 for providing to merchant system 130. The transaction authorization may be provided to merchant system 130 based on evaluation of the risk criteria and not upon the value present in preloaded value account or direct link transaction account storing value relative to the direct link fob.

After providing the transaction authorization to the IAS 1014, PLAS 1016 may seek authorization of the transaction against the direct link fob account (e.g., transaction account) which is maintained on issuer database 1012, and which is funded by value received from funding source 1104. The authorization request may be provided to IAS 1202 for approval which may retrieve the necessary value from the direct link fob account. For example, where the direct link fob account is a charge or credit account, PLAS 1016 may request authorization from the second IAS 1202 and IAS 1202 may assess the transaction amount against the direct link fob account on database 1012. IAS 1202 may seek to record the amount of the transaction in the direct link fob usage history data file for payment at the end of a billing cycle (e.g., charge account), or the amount may be recorded on the fob direct link fob usage data file for payment at a date later than the end of the billing cycle (e.g., credit account).

In an alternative operation PLAS 1016 may assess the transaction amount against the direct link fob account, without use of a second IAS 1202. Whether the transaction is processed using a second IAS 1202, it is to be understood that value may not be immediately transferred to the merchant system from the direct link fob account for satisfying the transaction. Instead, the direct link fob issuer may guarantee satisfaction of the merchant transaction by, for example, request until a certain value is retrieved from the direct link fob account at the end of the billing cycle or later. That is, PLAS 1016 may provide authorization of the transaction, but may not retrieve the necessary value for satisfying the transaction until after the merchant provides a request for settlement to the issuer system.

Figure 13:
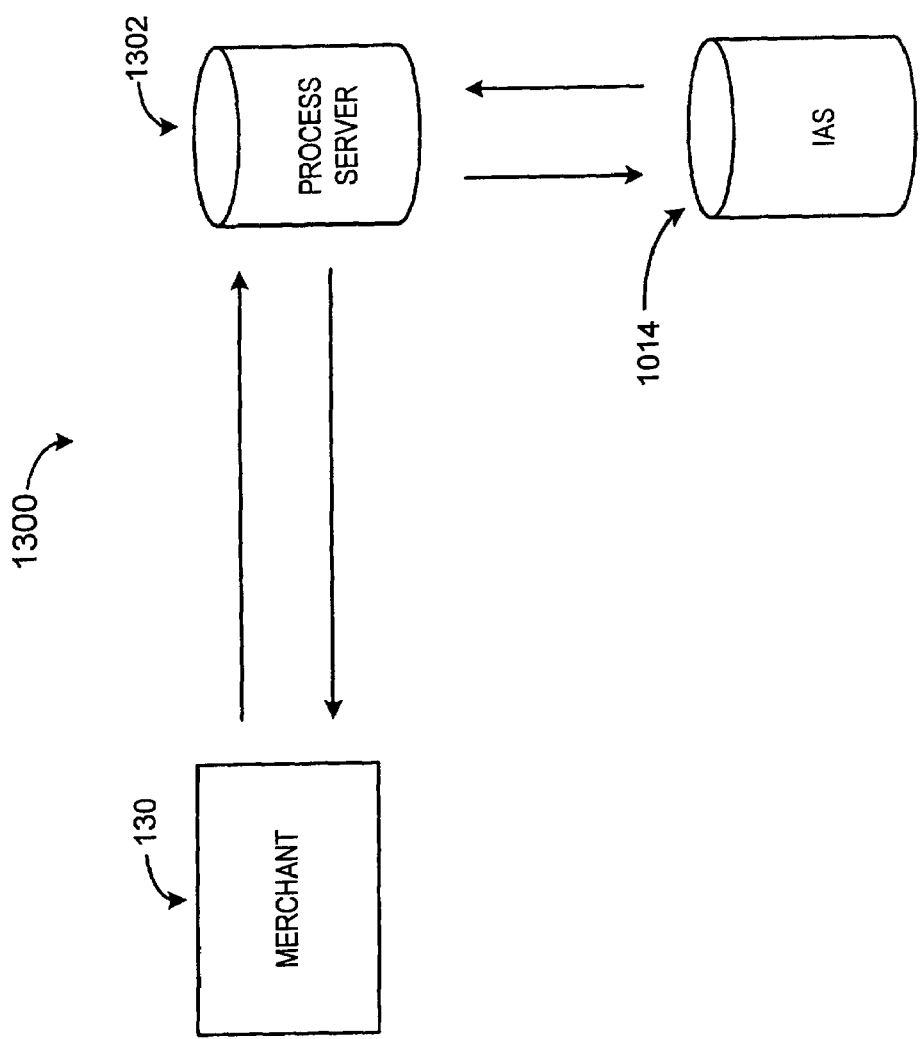
FIG. 13 is a depiction of another exemplary payment/transaction process in accordance with the present invention.

In yet another exemplary transaction processing system 1300 depicted in FIG. 13, merchant system 130 may provide a batch file containing multiple fob transaction requests to be processed to a process server 1302 where the multiple fob transactions may include both preloaded value and direct link transaction request. The system 1300 may include a processserver 1302 which distinguished between preloaded value and direct link transaction requests. That is, process server 1302 may be used for separating the fob transactions which are associated with a preloaded fob account and those that are not associated with a preloaded fob account, as discussed more fully below. Process server 1302 may further be in communication with IAS 1014 for seeking settlement of the transaction. IAS 1014 may process the transaction request in accordance with the direct link transaction process or the preloaded value transaction platform described above.

In exemplary operation of system 1300, process server 1302 may receive the settlement file and identify the files according to the nature of the transaction request. For example, process server 1302 may place markers on the files received and create sub-files of transaction requests relative to the type of fob used in the transaction (e.g., preloaded fob, and direct link fob associated with a charge or credit account). The process server may create the sub-files relative to the file markers. Process server 1302 may create a first fob transaction file for merchant payables and a second fob transaction file for accounts receivable to be forwarded to IAS 1014 for processing. Where the sub-file includes merchant payable, process server 1302 may provide funds to the merchant for payment of the transaction, where the funds provided may be equivalent to the transaction amount minus discount revenues. The funds may be retrieved from the funding source for providing to the merchant. Alternatively, process server 1302 may create a second fob transaction file for accounts receivable payments and forwarded the second fob transaction file to IAS 1014. IAS 1014 may then process the transaction request according to the processes described in FIGS. 10 and 12. That is, IAS 1014 may distinguish the preloaded fob transaction requests from those associated with the direct link fob and process the transactions accordingly.

Considering the operation of the various transaction processing systems described above, it can be seen that the transaction processing systems described may distinguish when a preloaded fob is used, when a card associated with a fob is used, or when an account associated with a preloaded fob is reloaded. In that regard, the present invention may be used to reward points depending on the nature of the fob usage. The points (e.g., loyalty points) may be stored in a points or rewards account maintained on the issuer database (e.g., database 1012). The rewards points may then later be redeemed from the rewards account for exchange for goods and services as desired by the fob user. For more information on loyalty systems and transaction systems, see, for example, U.S. patent application Ser. No. 09/836,213, filed on Apr. 17, 2001, by inventors Voltmer, et al., and entitled "System And Method For Networked Loyalty Program"; U.S. Continuation-In-Part patent application Ser. No. 10/027,984, filed on Dec. 20, 2001, by inventors Ariff, et al., and entitled "System And Method For Networked Loyalty Program"; U.S. Continuation-In-Part patent application Ser. No. 10/010,947, filed on Nov. 6, 2001, by inventors Haines, et al., and entitled "System And Method For Networked Loyalty Program"; the Shop AMEX™ system as disclosed in Ser. No. 60/230,190, filed Sep. 5, 2000; the MR as Currency™ and Loyalty Rewards Systems disclosed in Ser. No. 60/197,296, filed on Apr. 14, 2000, Ser. No. 60/200,492, filed Apr. 28, 2000, and Ser. No. 60/201,114, filed May 2, 2000; a stored value card as disclosed in Ser. No. 09/241,188, filed on Feb. 1, 1999; a system for facilitating transactions using secondary transaction numbers disclosed in Ser. No. 09/800,461, filed on Mar. 7, 2001, and also in related provisional application Ser. No. 60/187,620, filed Mar. 7, 2000, Ser. No. 60/200,625, filed Apr. 28, 2000, and Ser. No. 60/213,323, filed May 22, 2000, all of which are herein incorporated by reference. Other examples of online membership reward systems are disclosed in Netcentives, U.S. Pat. No. 5,774,870, issued on Jun. 30, 1998, and U.S. Pat. No. 6,009,412, issued on Dec. 29, 1999, both of which are hereby incorporated by reference.

As noted, in one instance, points may be provided when the fob is used in addition to when the card associated with the fob is used. For example, IAS 1014 may recognize that a fob is being used and award points (e.g., loyalty points) to the rewards account assigned to the fob user or associated with the fob. The loyalty points may be awarded based on any criteria as determined by the fob issuer. Exemplary rewarding criteria may include rewarding points for, for example, frequency of fob usage, amount of individual purchase using the fob, the total amount of purchases in a given time period, location of merchant, type of merchant, or any such criteria for incenting fob usage.

Where the fob is associated with a preloaded value account such as that described with respect to FIG. 10, points may be awarded for account reloading. That is, IAS 1014 may place award points in the rewards account relative to the amount loaded or reloaded as required. Further IAS 1014 may place reward points in the rewards account relative to usage of the fob at a particular merchant or for a particular transaction.

It should be noted that the transaction account associated with fob 102 may include a usage restriction, such as, for example, a per purchase spending limit, a time of day use, a day of week use, certain merchant use and/or the like, wherein an additional verification is required when using the fob outside of the restriction. The restrictions may be personally assigned by fob 102 user, or the account provider. For example, in one exemplary embodiment, the account may be established such that purchases above $X (i.e., the spending limit) must be verified by the customer. Such verification may be provided using a suitable personal identification number (PIN) which may be recognized by fob 102 or a payment authorization center (not shown) as being unique to fob 102 holder (e.g., customer) and the correlative fob 102 transaction account number. Where the requested purchase is above the established per purchase spending limit, the customer may be required to provide, for example, a PIN, biometric sample and/or similar secondary verification to complete the transaction. That is, for example, fob 102 may enter the unique PIN in a conventional keypad at merchant system 130 or RFID reader 104. The PIN may be provided to the authorization center for comparison with a correlative PIN stored on the issuer system. Alternatively, the PIN may be provided to fob 102 via RFID reader 104. Fob 102 may verify the PIN by comparing the PIN to a correlative PIN stored on, for example, secure memory 212.

Where a verification PIN is used as secondary verification the verification PIN may be checked for accuracy against a corroborating PIN which correlates to fob 102 transaction account number. The corroborating PIN may be stored locally (e.g., on fob 102), or may be stored on a database (1012) at the payment authorization center. The payment authorization center database may be any database 1012 maintained and operated by fob 102 transaction account provider.

The verification PIN may be provided to POS device 110 using a conventional merchant (e.g., POS) PIN key pad 118 in communication with POS device 110 as shown in FIG. 1A, or a RFID keypad in communication with RFID reader 104. PIN keypad may be in communication with POS device 110 (or alternatively, RFID reader 104) using any conventional data link described above. Upon receiving the verification PIN, RFID reader 104 may seek to match the PIN to the corroborating PIN stored on RFID reader 104 at database 310 or 320. Alternatively, the verification PIN may be provided to a payment authorization center to determine whether the PIN matches the PIN stored on the payment authorization center database which correlates to fob 102 account. If a match is made, the purchase may no longer be restricted, and the transaction may be allowed to be completed.

Figure 9:
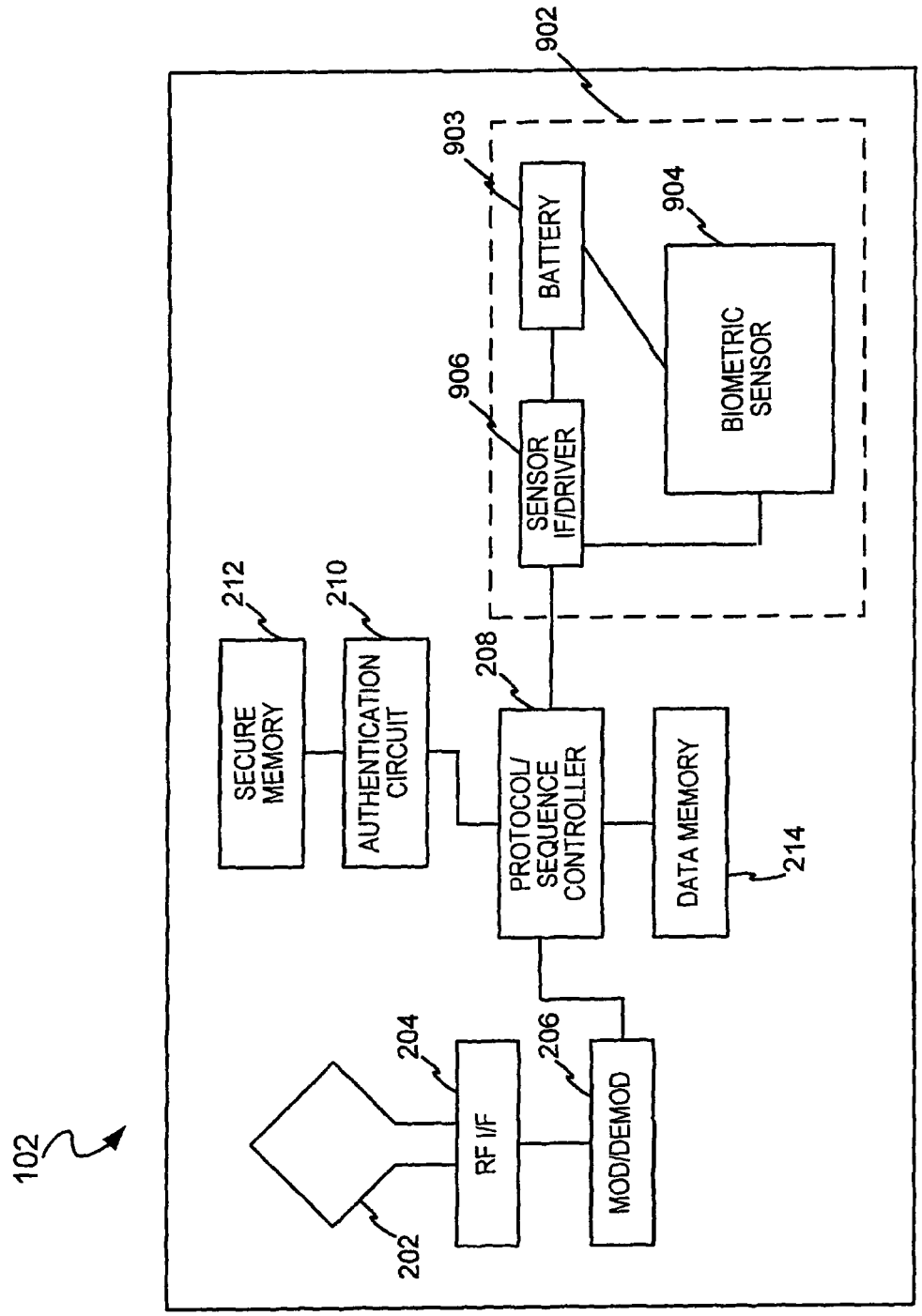
FIG. 9 is another schematic illustration of an exemplary fob in accordance with the present invention.

In an alternate embodiment, verification of purchases exceeding the established spending limit may involve biometrics circuitry included in fob 102. FIG. 9 is a schematic block diagram of an exemplary fob 102 wherein fob 102 includes a biometric security system 902. Biometric security system 902 may include a biometric sensor 904 for sensing the fingerprint of fob 102 user. Biometric sensor 904 may be in communication with a sensor interface/driver 906 for receiving the sensor fingerprint and activating the operation of fob 102. In communication with biometric sensor 904 and sensor interface 906 may be a battery 903 for providing the necessary power for operation of the biometric security system components.

In one exemplary application of fob 102 including biometric security system 902, the customer may place his finger on the biometric sensor to initiate the mutual authentication process between fob 102 and RFID reader 104, or to provide secondary verification of the user's identity. The sensor fingerprint may be digitized and compared against a digitized fingerprint stored in a database (e.g., security database 212) included on fob 102. Such comparison step may be controlled by protocol/sequence controller 208 and may be validated by authentication circuit 210. Where such verification is made, the mutual authentication between fob 102 and RFID reader 104 may begin, and the transaction may proceed accordingly. Alternatively, the comparison may be made with a digitized fingerprint stored on a database maintained by fob 102 transaction account provider system (not shown). The digitized fingerprint may be verified in much the same way as is described above with respect to the PIN.

In one exemplary application of fob 102 including biometric security system 902, system 902 may be used to authorize a purchase exceeding the established per purchase spending limit. In this case, where the customer's intended purchase exceeds the spending limit, the customer may be asked to provide assurance that the purchase is authorized. Accordingly, the customer may provide such verification by placing his finger over biometric sensor 904. Biometric sensor 904 may then digitize the fingerprint and provide the digitized fingerprint for verification as described above. Once verified, fob 102 may provide a transaction authorized signal to RF transponder 202 (or alternatively to transponder 220) for forwarding to RFID reader 104. RFID reader 104 may then provide the transaction authorized signal to POS device 110 in similar manner as is done with conventional PIN driven systems and POS device 110 may process the transaction under the merchant's business as usual standard.

Additional methods and systems for biometric security for system 100 will be discussed further herein.

In accordance with another exemplary embodiment of the invention, the fob user is provided limited access to a fob user data file maintained on an issuer system for managing the fob usage and fob user information. User may have access over the phone, online, or offline. The fob user may access the fob user data file to change, for example, demographic information (e.g., fob user address, phone number, email address, or the like), the funding source (e.g., credit account, charge account, rewards account, barter account, etc.) associated with the fob, view the transaction history, etc. In addition, the fob user may be permitted to load or reload the account or alter automatic reload parameters (e.g., amount to reload, period for reloading, etc.). Where more than one fob 102 is correlated to a transaction account, the user may be provided similar access to the data files corresponding to the additional fobs.

With reference to FIG. 1A, the fob user may connect fob 102 to computer interface 134 via the USB interface 132. The fob user may then use computer interface 134 to access the fob user data file via network 136. In particular, network 136 may be in communication with an issuer system (e.g., system 1010 of FIG. 10) and may be provided limited access to an issuer server (e.g., server 1014) for managing the fob. Issuer server 1014 may be in communication with an issuer system database (e.g., 1012) which stores the information to be managed relative to the user fob user data file. The changes made to the fob user data file by the fob user may be made in real-time, after a brief delay, or after an extended delay. In one instance, changes may be stored in a batch changes file on the issuer database for later batch processing.

In another exemplary embodiment of the present invention, system 100 may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. Certain of these technologies will be described in greater detail herein. Moreover, while some of the examples discussed herein may include a particular biometric system or sample, the invention contemplates any of the biometrics discussed herein in any of the embodiments.

The biometric system may be configured as a security system and may include a registration procedure in which a user of transaction instrument (e.g., fob 102) proffers a sample of his fingerprints, DNA, retinal scan, voice, and/or other biometric sample to an authorized sample receiver (ASR). An ASR may include a local database, a remote database, a portable storage device, a host system, an issuer system, a merchant system, a fob issuer system, an employer, a financial institution, a non-financial institution, a loyalty point provider, a company, the military, the government, a school, a travel entity, a transportation authority, a security company, and/or any other system or entity that is authorized to receive and store biometric samples and associate the samples with specific biometric databases and/or transaction instruments (e.g., fobs 102). As used herein, a user of a fob, fob user, or any similar phrase may include the person or device holding or in possession of the fob, or it may include any person or device that accompanies or authorizes the fob owner to use the fob.

Figure 14:
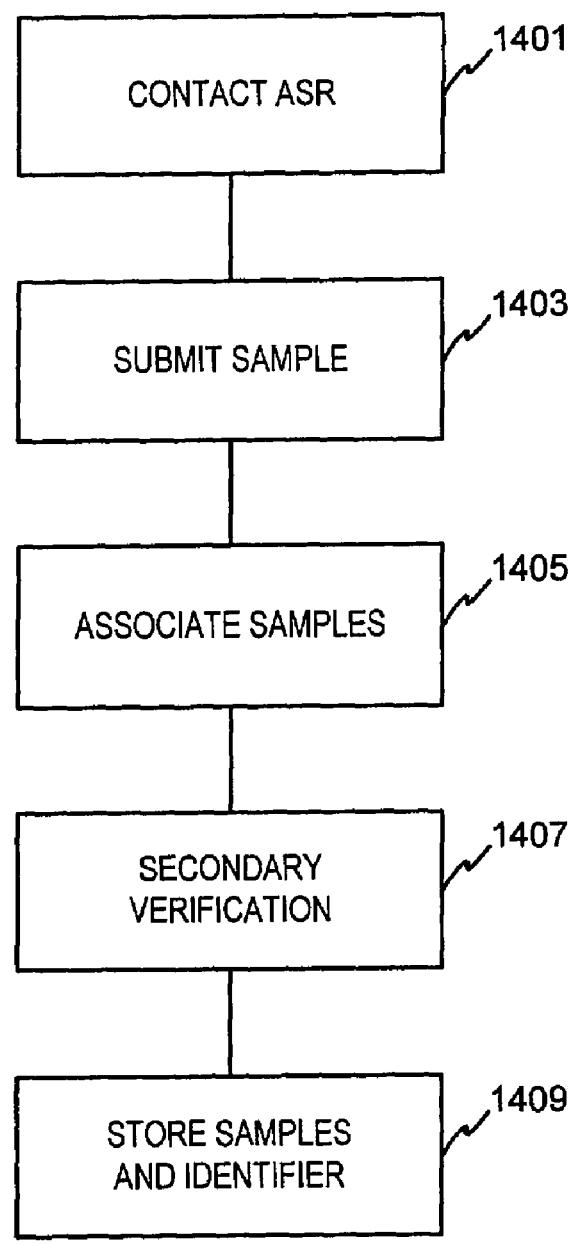
FIG. 14 is a depiction of an exemplary biometrics process in accordance with the present invention.

FIG. 14 illustrates an exemplary registration procedure in accordance with the present invention. In one embodiment, a fob user may contact an ASR to submit one or more biometric samples to an ASR (step 1401). The fob user may contact the ASR and submit a sample in person, through a computer and/or Internet, through software and/or hardware, through a third-party biometric authorization entity, through a kiosk and/or biometric registration terminal, and/or by any other direct or indirect means, communication device or interface for a person to contact an ASR.

A fob user may then proffer a biometric sample to the ASR (step 1403). As used herein, a biometric sample may be any one or more of the biometric samples or technologies, or portion thereof, described herein or known in the art. By proffering one or more biometric samples, a biometric may be scanned by at least one of a retinal scan, iris scan, fingerprint scan, hand print scan, hand geometry scan, voice print scan, vascular scan, facial and/or ear scan, signature scan, keystroke scan, olfactory scan, auditory emissions scan, DNA scan, and/or any other type of scan to obtain a biometric sample. Upon scanning the sample, the system may submit the scanned sample to the ASR in portions during the scan, upon completing the scan or in batch mode after a certain time period. The scanned sample may include a hardcopy (e.g., photograph), digital representation, an analog version or any other configuration for transmitting the sample. The ASR receives the sample and the ASR may also receive copies of a fob user's biometric data along with the sample or at a different time (or within a different data packet) from receiving the sample.

The ASR and/or fob user 102 may correlate and/or register the sample with fob user information to create a data packet for the sample and store the data packet in digital and/or any storage medium known in the art. As used herein, a data packet may include the digitized information relating to at least one of a biometric sample, a registered biometric sample, a stored biometric sample, a proffered biometric, a proffered biometric sample, user information, transponder information, and/or any other information. The terms "data packet," "biometric sample," and "sample" may be used interchangeably. As used herein, registered samples may include samples that have been proffered, stored and associated with user information. By storing the data packet in digital format, the ASR may digitize any information contained in one of the biometric scans described herein. By storing the data packet in any storage medium, the ASR may print and/or store any biometric sample. Hardcopy storage may be desirable for back-up and archival purposes.

The biometric sample may also be associated with user information to create a data packet (step 1405). The sample may be associated with user information at any step in the process such as, for example, prior to submission, during submission and/or after submission. In one embodiment, the user may input a PIN number or zip code into the POS terminal, then scan the biometric to create the biometric sample. The local POS system may associate the biometric sample data with the PIN and zip code, then transmit the entire packet of information to the ASR. In another embodiment, the POS may facilitate transmitting the sample to an ASR, and during the transmission, the sample may be transmitted through a third system which adds personal information to the sample.

The information associated with the biometric sample may include any information such as, for example, fob user information, fob 102 information, fob 102 identifier information, fob 102 vender information, fob 102 operability information, and/or fob 102 manufacturing information. Fob 102 information is not limited to transponder information and may include information related to any transaction instrument such as smart cards, credit cards, debit cards, merchant-specific cards, loyalty point cards, cash accounts and any other transaction instruments and/or accounts. The fob user information may also contain information about the user including personal information—such as name, address, and contact details; financial information—such as one or more financial accounts associated with the fob user; loyalty point information—such as one or more loyalty point accounts (e.g., airline miles, charge card loyalty points, frequent diner points) associated with the fob user; and/or non-financial information—such as employee information, employer information, medical information, family information, and/or other information that may be used in accordance with a fob user.

For example, fob user may have previously associated a credit card account, a debit card account, and a frequent flier account with his biometric sample which is stored at an ASR. Later, when fob user desires to purchase groceries, fob user may submit his biometric sample while using fob 102 for the purchase at a POS. The POS may facilitate sending the biometric sample to the ASR such that the ASR authorizes the biometric sample and checks a look-up table in the ASR database to determine if any information is associated with the sample. If information (e.g., financial accounts) is associated with the sample, the ASR may transmit the information to the POS terminal. The POS terminal may then present fob user with a list of the three accounts associated with the biometric sample. Fob user and/or a merchant may then chose one of the accounts in order to continue and finalize the transaction.

In another embodiment, fob user may associate each account with a different biometric sample. For example, during registration, fob user may submit a sample of his right index fingerprint, and request that the system primarily associate this sample with a particular credit card account. Fob user may additionally submit a sample of his left index fingerprint and request that the system primarily associate the sample with a particular debit account. Additionally, fob user may submit his right thumbprint and request that the system primarily associate that sample with a particular frequent flier account. By "primarily" associating a sample with an account, the system initially associates the sample with that account. For example, fob user submitting his right index fingerprint for a financial transaction may have money for the transaction taken from his credit card account. Fob user may additionally specify which accounts should be secondarily associated with a sample. For example, fob user may have a debit card account secondarily associated with his right index fingerprint. As a result, if fob user submits his right index fingerprint for a transaction, and the primary account associated with the sample is overdrawn or unavailable, the secondary account may be accessed in order to further the transaction.

While primary and secondary account association is described herein, any number of accounts may be associated with a sample. Moreover, any hierarchy or rules may be implemented with respect to the association. For example, the fob user may instruct the system to access a debit card account when it receives a right index fingerprint sample, the purchase qualifies for loyalty points with a certain airline and the purchase amount is less than $50. The fob user may additionally instruct the system to access a credit card account if it receives a right index fingerprint sample, the purchase does not qualify for airline miles and the purchase amount is greater than $50. Further, while fingerprint samples are discussed herein, any biometric sample may have one or more accounts associated with it and may be used to facilitate a transaction using any of the routines discussed herein.

The ASR and/or fob user may associate a specific fob 102 identifier with the biometric sample by any method known in the art for associating an identifier (e.g., through the use of software, hardware and/or manual entry.) The ASR may additionally verify the fob user and/or fob 102 by using one or more forms of the user's secondary identification (step 1407). For example, the ASR may verify the fob user by matching the fob information to information retrieved from scanning information from a fob user's driver's license. The ASR may verify fob 102 by contacting the vendor of fob 102 to confirm that fob 102 was issued to a specific fob user. In another embodiment, the ASR may activate fob 102 during the registration procedure to confirm that the fob 102 transponder identifier and other information is properly associated with the fob user and the fob user's specific biometric samples. The ASR may additionally employ one or more verification methods to confirm that the biometric sample belongs to the user, such as, for example, the ASR may request from the user demographic information, further biometric samples and/or any other information. As used herein, "confirm," "confirmation" or any similar term includes verifying or substantially verifying the accuracy, existence, non-existence, corroboration, and/or the like of the information, component, or any portion thereof. The ASR may additionally employ one or more additional processing methods in order to facilitate association of a biometric sample. As used herein, the term processing may include scanning, detecting, associating, digitizing, printing, comparing, storing, encrypting, decrypting, and/or verifying a biometric and/or a biometric sample, or any portion thereof.

Upon association, authentication and/or verification of the biometric sample and fob 102, the system may create a data packet and for the sample store the data packet and fob 102 identifier (step 1409) in one or more databases on and/or in communication with system 100 via a network, server, computer, or any other means of communicating as described herein. The database(s) may be any type of database described herein. For example, a biometric sample stored on fob 102 may be stored in database 212. The database(s) may be located at or operated by any of the entities discussed herein such as, for example, the ASR and/or by a third-party biometric database operator.

The information stored in the database may be sorted or stored according to one or more characteristics associated with the sample in order to facilitate faster access to the stored sample. For example, fingerprint samples may be stored in a separate database than voice prints. As another example, all fingerprints with certain whirl patterns may be stored in a separate sub-database and/or database from fingerprints with arch patterns.

The biometric samples may also be stored and/or associated with a personal identification number (PIN) and/or other identifier to facilitate access to the sample. The PIN may be fob user selected or randomly assigned to the biometric sample. The PIN may consist of any characters such as, for example, alphanumeric characters and/or foreign language characters.

The system may further protect the samples by providing additional security with the sample. The security may include, for example, encryption, decryption, security keys, digital certificates, firewalls and/or any other security methods known in the art and discussed herein. One or more security vendors may utilize the security methods to store and/or access the biometric samples. The present invention anticipates that storage of the biometric samples may be such that a sample is first encrypted and/or stored under a security procedure, such that the sample may only be accessed by a vendor with the proper level of access or security which corresponds to or provides access to the stored sample. The samples may be accessible by certain vendors such as, for example, fob 102 transaction account provider system, an issuer system, a merchant system, a fob issuer system, an employer, a financial institution, a non-financial institution, a loyalty-point provider, a company, the military, the government, a school, a travel entity, a transportation authority, and/or a security company.

Figure 15:
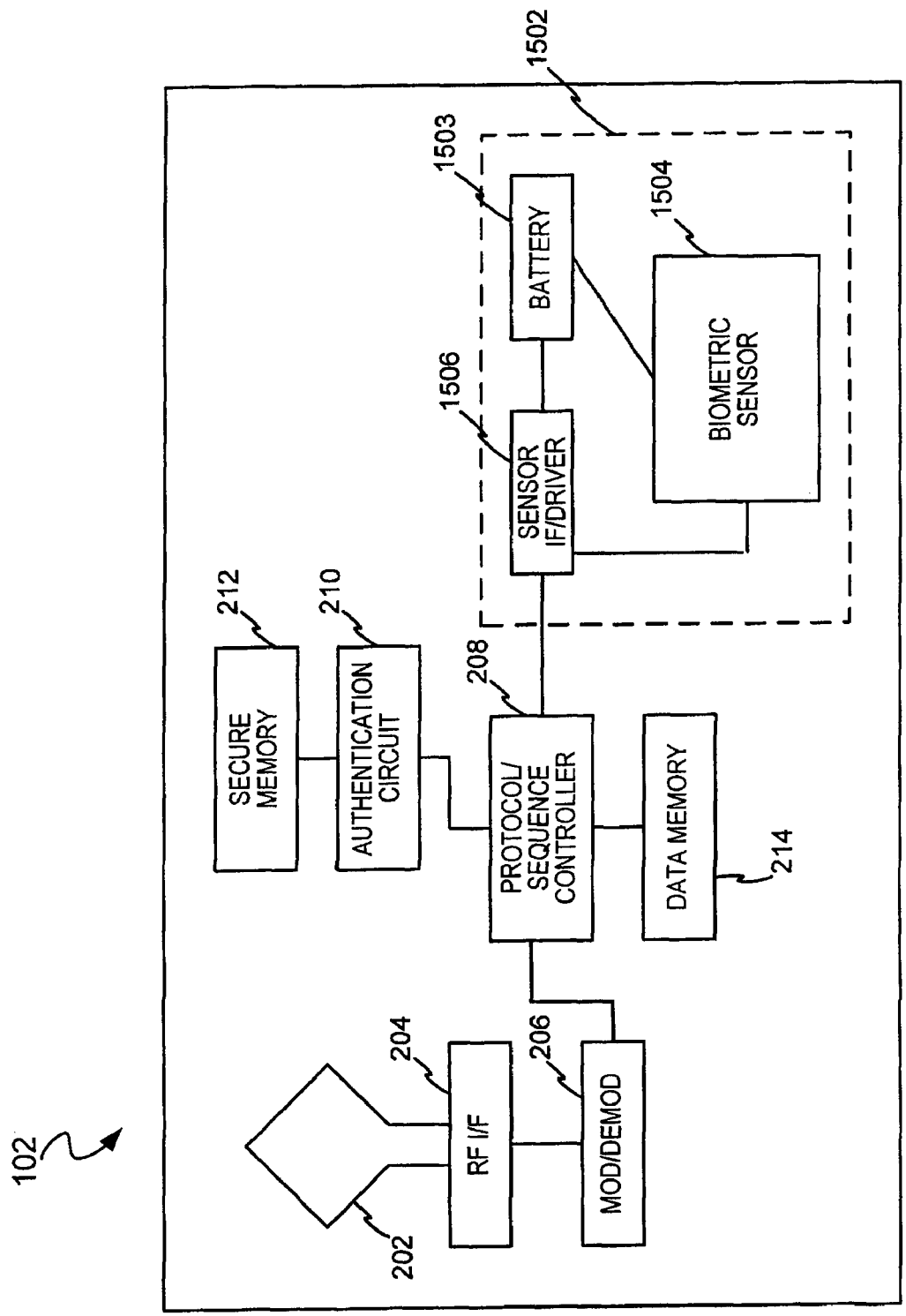
FIG. 15 is another schematic illustration of an exemplary fob in accordance with the present invention.

The fob of the invention may include a particular security system wherein the security system incorporates a particular biometric system. As shown in FIG. 15, fob 102 includes a biometric security system 1502 configured for facilitating biometric security using, for example, fingerprint samples. As used herein, fingerprint samples may include samples of one or more fingerprints, thumbprints, palmprints, footprints, and/or any portion thereof. Biometric security system 1502 may include a biometric sensor 1504 which may be configured with a sensor and/or other hardware and/or software for acquiring and/or processing the biometric data from the person such as, for example, optical scanning, capacitance scanning, or otherwise sensing the portion of fob user. In one embodiment, biometric sensor 1504 of the security system 1502 may scan a finger of a fob user in order to acquire his fingerprint characteristics into fob 102. Biometric sensor 1504 may be in communication with a sensor interface/driver 1506 such that sensor interface 1506 receives the fingerprint information and transmits a signal to controller 208 to facilitate activating the operation of fob 102. A power source (e.g., battery 1503) may be in communication with biometric sensor 1504 and sensor interface 1506 to provide the desired power for operation of the biometric security system components.

In one exemplary application of fob 102 incorporating biometric security system 1502, the user may place his finger on the biometric sensor to initiate the mutual authentication process between fob 102 and RFID reader 104, and/or to provide verification of the user's identity. Fob 102 may digitize the fingerprint and compare it against a digitized fingerprint stored in a database (e.g., security database 212) included on fob 102. The fingerprint information may additionally be compared with information from one or more third-party databases communicating with fob 102 through any communication software and/or hardware, including for example, RFID reader 104, a USB connection, a wireless connection, a computer, a network and/or any other means for communicating. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. As used herein, compare, comparison and similar terms may include determining similarities, differences, existence of elements, non-existence of elements and/or the like.

Protocol/sequence controller 208 may facilitate the local comparison to authenticate the biometric and authentication circuit 210 may validate the information. Any of the embodiments may alternatively or additionally include remote comparisons performed or controlled by one or more third-party security vendors. One or more comparison techniques and/or technologies may be used for comparisons. For example, for fingerprint comparisons, protocol/sequence controller 208 may utilize an existing database to compare fingerprint minutia such as, for example, ridge endings, bifurcation, lakes or enclosures, short ridges, dots, spurs and crossovers, pore size and location, Henry System categories such as loops, whorls, and arches, and/or any other method known in the art for fingerprint comparisons.

Fob 102 may additionally be configured with secondary security procedures to confirm that fake biometric samples are not being used. For example, to detect the use of fake fingers, fob 102 may be further configured to measure blood flow, to check for correctly aligned ridges at the edges of the fingers, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors and/or any other procedures known in the art for authenticating the authenticity of biometric samples.

After verifying the biometric information, fob 102 and RFID reader 104 may begin mutual authentication, and the transaction may proceed accordingly. However, the invention contemplates that the verification of biometric information may occur at any point in the transaction such as, for example, after the mutual authentication. At any point in the transaction, the system may additionally request fob user to enter a PIN and/or other identifier associated with the transaction account and/or biometric sample to provide further verification of fob user's identification. As part of the transaction, fob user payor may be requested to select from one of the financial accounts, loyalty accounts, credit accounts, debit account, and/or other accounts associated with the biometric sample. The user may be presented with a list of account options on a display associated with RFID reader 104, fob 102, a thirdparty security device and/or any other financial or transaction device association with a transaction. In another embodiment, a payee may select one of the accounts. For example, a department store payee may manually and/or automatically select a department store issued account, if available, for a transaction.

In another exemplary embodiment, biometric security system 1502 may be configured for facilitating biometric security using facial recognition or recognition of any other body part or object. As discussed herein, facial recognition may include recognition of any facial features obtained through a facial scan such as, for example, the eyes, nose, cheeks, jaw line, forehead, chin, ear features, head shape, hairline, neck features, shoulder height and/or any portion thereof. Biometric security system 1502 may include a biometric sensor 1504 which may be configured with a video camera, optical scanner, and/or other hardware and/or software for acquiring the biometric data from the person such as, for example video scanning, optical scanning or otherwise sensing any portion of fob user. In one embodiment, biometric sensor 1504 of the security system 1502 may scan the face of a fob user in order to acquire his facial characteristics into fob 102. Biometric sensor 1504 may be in communication with a sensor/interface/driver 1506 such that sensor 1504 receives the facial information and transmits a signal to controller 208 to facilitate activating the operation of fob 102. A power source (e.g., battery 1503) may be in communication with biometric sensor 1504 and sensor interface 1506 to provide the desired power for operation of the biometric security system components.

In one exemplary application of fob 102 incorporating biometric security system 1502, system 1502 may scan the facial features of the fob user to initiate the mutual authentication process between fob 102 and RFID reader 104, and/or to provide verification of the user's identity. Security system 1502 may be configured such that fob user may stand at least two-feet away from sensor 1504. Additionally, sensor 1504 may be configured to detect facial features of a user turned at least 30 degrees toward the camera.

Fob 102 may digitize the facial scan and compare it against a digitized facial scan stored in a database (e.g., security database 212) included on fob 102. The facial scan information may additionally be compared with information from one or more third-party databases communicating with fob 102 through any communication software and/or hardware, including for example, RFID reader 104, a USB connection, a wireless connection, a computer, a network and/or any other means for communicating. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples.

Protocol/sequence controller 208 may facilitate the local comparison to authenticate the biometric, and authentication circuit 210 may validate the information. Any of the embodiments may alternatively or additionally include remote comparisons performed or controlled by one or more third-party security vendors. One or more comparison techniques and/or technologies may be used for comparisons. For example, for facial recognition, protocol/sequence controller 208 may utilize an existing database to compare nodal points such as the distance between the eyes, the width of the nose, the jaw line, and the depth of the user's eye sockets. While only some types of nodal points are listed, the present invention recognizes that it is known that there are over 80 different nodal points on a human face that may be used for comparison in the present invention. Additionally, third-party devices such as facial recognition software and/or hardware systems may be used to facilitate facial recognition, such as the systems developed by Viisage, Imagis, and Identix which employ complex algorithms that facilitate both searching facial and/or ear scans and adjusting stored data based on eyewear, facial hair, and other changes in outward facial and/or ear appearance.

Fob 102 may additionally be configured with secondary security procedures to confirm that fake biometric samples are not being used. For example, to detect the use of fake facial features, fob 102 may be further configured to measure blood flow, to detect a thermal pattern associated with facial features, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors and/or any other procedures known in the art for authenticating the authenticity of biometric samples. After verifying the biometric information, fob 102 and RFID reader 104 may begin mutual authentication by any of the methods described herein.

In another exemplary embodiment, biometric security system 1502 may be configured for facilitating biometric security using voice recognition. As discussed herein, voice recognition may include recognition of voice and/or speaker features such as, phonated excitation, whispered excitation, frication excitation, compression, vibration, parametric waveforms, tone, pitch, dialect, annunciation, and/or any portion thereof. As discussed herein, these voice recognition features may be collectively referred to as a "voice print." Biometric security system 1502 may include a biometric sensor 1504 which may be configured with an audio capture device such as a microphone, telephone, cellular phone, speaker and/or other hardware and/or software for acquiring the biometric data from the person such as, for example auditory scanning, recording or otherwise sensing the portion of fob user.

In one exemplary application of fob 102 incorporating biometric security system 1502, system 1502 may capture the voice print of the fob user to initiate the mutual authentication process between fob 102 and RFID reader 104, and/or to provide verification of the user's identity. In one embodiment, biometric sensor 1504 of the security system 1502 may capture a voice print, when a user recites, for example, a pass phrase or audible PIN. Biometric sensor 1504 may be in communication with a sensor/interface/driver 1506 such that sensor 1504 receives the voice print and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the voice print and compare it against a digitized voice print stored in a database (e.g., security database 212) included on fob 102. The voice print information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

One or more comparison techniques and/or technologies may be used for comparisons. For example, for voice recognition, protocol/sequence controller 208 may utilize an existing database to compare the voice print by comparing voice print waveforms in the time domain, by comparing energy content in the voice prints across the frequency domain, by the use of stochastic models and/or template models, and/or by any other voice recognition method known in the art. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as voice recognition software and/or hardware systems to facilitate voice print comparisons, such as, for example SAFLINK and Voice Security Systems.

Fob 102 and/or any other third-party security vendor system used in connection with fob 102 may additionally be configured with secondary security procedures to confirm that fake biometric samples are not being used. For example, to detect the use of a recorded voice, system 1502 may be further configured to detect audio noise associated with an electronic device and/or any other secondary procedure to thwart biometric security fraud. After verifying the biometric information, fob 102 and RFID reader 104 may begin mutual authentication by the methods described herein.

In another exemplary embodiment of the present invention, biometric security system 1502 may be configured for facilitating biometric security using signature recognition. As discussed herein, signature recognition may include recognition of the shape, speed, stroke, stylus pressure, timing information and/or other signature information and/or any portion thereof during the act of signing. As discussed herein, these signature recognition features may be collectively referred to as a "signature scan." Biometric security system 1502 may include a biometric sensor 1504 which may be configured with an LCD screen, digitizing tablet and/or other hardware and/or software that facilitates digitization of biometric data from the person such as, for example signature scanning, recording or otherwise sensing the signature of fob user.

In one exemplary application of fob 102 incorporating biometric security system 1502, system 1502 may capture the signature scan of the fob user to initiate the mutual authentication process between fob 102 and RFID reader 104, and/or to provide verification of the user's identity. In one embodiment, biometric sensor 1504 of the security system 1502 may capture a signature scan, when a user signs, for example, his name or a specified word or phrase. Biometric sensor 1504 may be in communication with a sensor/interface/driver 1506 such that sensor 1504 receives the signature scan and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the signature scan and compare it against a digitized signature scan stored in a database (e.g., security database 212) included on fob 102. The signature scan information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for voice recognition, protocol/sequence controller 208 may utilize an existing database to compare the features of a signature scan by comparing graphs, charts, and or other data relating to shape, speed, stroke, stylus pressure, timing information and/or by any other signature recognition data. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as signature recognition software and/or hardware systems to facilitate signature scan comparisons, such as, for example CyberSIGN, LCI Computer Group, and Xenetek.

Fob 102 and/or any other third-party security vendor system used in connection with fob 102 may additionally be configured with secondary security procedures to conform that fake biometric samples are not being used. For example, to detect the use of a false signature device, system 1502 may be further configured to detect a thermal pattern associated with a human hand and/or any other secondary procedure to thwart biometric security fraud. After verifying the biometric information, fob 102 and RFID reader 104 may begin mutual authentication by the methods described herein.

In another exemplary embodiment, biometric security system 1502 may be configured for facilitating biometric security using vascular pattern recognition. As discussed herein, vascular pattern may include recognition of structures, depths, and other biometric reference points of arterial tissues, vein tissues, capillary tissues, epithelial tissues, connective tissues, muscle tissues, nervous and/or other inner tissues and/or any portion thereof. As discussed herein, these vascular pattern features may be collectively referred to as a "vascular scan." Biometric security system 1502 may include a biometric sensor 1504 which may be configured with an optical scanner, thermal scanner and/or other hardware and/or software that facilitates capture of biometric data from the person such as, for example scanning, detecting or otherwise sensing a vascular pattern of fob user.

In one exemplary application of fob 102 incorporating biometric security system 1502, system 1502 may capture the vascular scan of the fob user to initiate the mutual authentication process between fob 102 and RFID reader 104, and/or to provide verification of the user's identity. In one embodiment, biometric sensor 1504 of the security system 1502 may capture a vascular scan, when a user places his hand in front of an optical scanner. Biometric sensor 1504 may be in communication with a sensor/interface/driver 1506 such that sensor 1504 receives the vascular scan and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the vascular scan based on biometric reference points and compare it against a digitized vascular scan stored in a database (e.g., security database 212) included on fob 102. The vascular scan information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for vascular pattern recognition, protocol/sequence controller 208 may utilize an existing database to compare the vascular scan by comparing biometric reference points, vascular coordinates, vascular and/or tissue lengths, widths and depths; blood pressure including waveforms, dicrotic notches, diastolic pressure, systolic pressure, anacrotic notches and pulse pressure, and/or any other characteristic of vascular and/or tissue patterns. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as vascular pattern recognition software and/or hardware systems to facilitate vascular scan comparisons, such as, for example VEID International, Identica and ABT Advanced Biometric Technologies.

Fob 102 and/or any other third-party security vendor system used in connection with fob 102 may additionally be configured with secondary security procedures to confirm that fake biometric samples are not being used. For example, to detect the use of a false vascular patterns, system 1502 may be further configured to detect a thermal pattern associated with vascular patterns and/or any other secondary procedure to thwart biometric security fraud. After verifying the biometric information, fob 102 and RFID reader 104 may begin mutual authentication by the methods described herein.

In another exemplary embodiment, biometric security system 1502 may be configured for facilitating biometric security using DNA biometrics. As discussed herein, DNA biometrics may include recognition of structures, gene sequences, and other genetic characteristics of skin tissue, hair tissue, and/or any other human tissue and/or any portion thereof containing genetic information. As discussed herein, these genetic features may be collectively referred to as a "DNA scan." Biometric security system 1502 may include a biometric sensor 1504 which may be configured with an infrared optical sensor, a chemical sensor and/or other hardware and/or software that facilitates capture of biometric data from the person such as, for example scanning, detecting or otherwise sensing a DNA scan of fob user.

In one exemplary application of fob 102 incorporating biometric security system 1502, system 1502 may capture the DNA scan of the fob user to initiate the mutual authentication process between fob 102 and RFID reader 104, and/or to provide verification of the user's identity. In one embodiment, biometric sensor 1504 of the security system 1502 may capture a DNA scan, when a user submits genetic material to sensor 1504. Biometric sensor 1504 may be in communication with a sensor/interface/driver 1506 such that sensor 1504 receives the DNA scan and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the DNA scan based on genetic information reference points and compare it against a digitized DNA scan stored in a database (e.g., security database 212) included on fob 102. The DNA scan information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for DNA recognition, protocol/sequence controller 208 may utilize an existing database to compare the DNA scan by comparing nucleotides, code sequences, regulatory regions, initiation and stop codons, exon/intron borders, and/or any other characteristics of DNA. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as DNA recognition software and/or hardware systems to facilitate DNA scan comparisons, such as, for example Applied DNA Sciences.

Fob 102 and/or any other third-party security vendor system used in connection with fob 102 may additionally be configured with secondary security procedures to confirm that fake biometric samples are not being used. For example, to detect the use false DNA, system 1502 may be further configured to take a DNA sample directly off a user and/or any other secondary procedure to thwart biometric security fraud. After verifying the biometric information, fob 102 and RFID reader 104 may begin mutual authentication by the methods described herein.

In another exemplary embodiment, biometric security system 1502 may be configured for facilitating biometric security using hand geometry biometrics. As discussed herein, hand geometry biometrics may include recognition of hand geometry parameters, such as, for example, hand shape, finger length, finger thickness, finger curvature and/or any portion thereof. As discussed herein, these hand geometry features may be collectively referred to as a "hand geometry scan." Biometric security system 1502 may include a biometric sensor 1504 which may be configured with an infrared optical sensor, a three-dimensional imaging system and/or other hardware and/or software that facilitates capture of biometric data from the person such as, for example scanning, detecting or otherwise sensing a hand geometry scan of fob user.

In one exemplary application of fob 102 incorporating biometric security system 1502, system 1502 may capture the hand geometry scan of the fob user to initiate the mutual authentication process between fob 102 and RFID reader 104, and/or to provide verification of the user's identity. In one embodiment, biometric sensor 1504 of the security system 1502 may capture a hand geometry scan, when a user places his hand in front of an optical scanner. Biometric sensor 1504 may be in communication with a sensor/interface/driver 1506 such that sensor 1504 receives the hand geometry scan and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the hand geometry scan based on hand geometry parameters and compare it against a digitized hand geometry scan stored in a database (e.g., security database 212) included on fob 102. The hand geometry scan information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for hand geometry recognition, protocol/sequence controller 208 may utilize an existing database to compare hand shape, finger length, finger thickness, finger curvature and/or any other of the 90 different hand geometry parameters known in the art. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as hand geometry recognition software and/or hardware systems to facilitate hand geometry scan comparisons, such as, for example IR Recognition Services and Human Recognition Services.

Fob 102 and/or any other third-party security vendor system used in connection with fob 102 may additionally be configured with secondary security procedures to confirm that fake biometric samples are not being used. For example, to detect the use of false hands, system 1502 may be further configured to measure blood flow, to detect body heat and/or any other secondary procedure to thwart biometric security fraud. After verifying the biometric information, fob 102 and RFID reader 104 may begin mutual authentication by the methods described herein.

In another exemplary embodiment, biometric security system 1502 may be configured for facilitating biometric security using auditory emissions biometrics. As discussed herein, auditory emissions biometrics may include emissions that an ear generates when stimulated by sound, such as vibrations and reverberated sound waves and/or any portion thereof. As discussed herein, these auditory emissions features may be collectively referred to as an "auditory emissions scan." Biometric security system 1502 may include a biometric sensor 1504 which may be configured with an infrared optical sensor, an auditory sensor, an auditory generator and/or other hardware and/or software that facilitates the capture of biometric data from the person such as, for example sound generating, scanning, detecting or otherwise sensing an auditory emissions scan of fob user.

In one exemplary application of fob 102 incorporating biometric security system 1502, system 1502 may capture the auditory emissions scan of the fob user to initiate the mutual authentication process between fob 102 and RFID reader 104, and/or to provide verification of the user's identity. In one embodiment, biometric sensor 1504 of the security system 1502 may capture an auditory emissions scan, when a user hears an auditory stimulant and the user's auditory emissions are detected by biometric sensor 1504. Biometric sensor 1504 may be in communication with a sensor/interface/driver 1506 such that sensor 1504 receives the auditory emissions scan and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the auditory emissions scan based on emissions waveforms and compare it against a digitized auditory emissions scan stored in a database (e.g., security database 212) included on fob 102. The auditory emissions scan information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for auditory emissions recognition, protocol/sequence controller 208 may utilize an existing database to compare emissions difference in frequency, wavelength, and/or other characteristics between the transmitted and reverberated sound waves. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as auditory emissions recognition software and/or hardware systems to facilitate auditory emissions scan comparisons, such as, for example those developed by the University of Southampton.

Fob 102 and/or any other third-party security vendor system used in connection with fob 102 may additionally be configured with secondary security procedures to confirm that fake biometric samples are not being used. For example, to detect the use of false auditory emissions scans, system 1502 may be further configured to detect electronic noise associated with a device producing electronic auditory emissions and/or any other secondary procedure to thwart biometric security fraud. After verifying the biometric information, fob 102 and RFID reader 104 may begin mutual authentication by the methods described herein.

In another exemplary embodiment, biometric security system 1502 may be configured for facilitating biometric security using olfactory biometrics. As discussed herein, olfactory biometrics may include odorants that a body generates when odor evaporates from and/or any portion thereof. As discussed herein, these odorants may be collectively referred to as a "smellprint." Biometric security system 1502 may include a biometric sensor 1504 which may be configured with an electronic sensor, a chemical sensor, and/or an electronic or chemical sensor configured as an array of chemical sensors, wherein each chemical sensor may detect a specific odorant, or smell. In another embodiment, biometric sensor 1504 may be configured as a gas chromatograph, spectrometer, conductivity sensor, piezoelectric sensor and/or other hardware and/or software that facilitates the capture of biometric data from the person such as, for example, scanning, detecting or otherwise sensing a smellprint of fob user.

In one exemplary application of fob 102 incorporating biometric security system 1502, system 1502 may capture the smellprint of the fob user to initiate the mutual authentication process between fob 102 and RFID reader 104, and/or to provide verification of the user's identity. In one embodiment, biometric sensor 1504 of the security system 1502 may capture a smellprint, when a user stands within at least two feet of sensor 1504. Biometric sensor 1504 may be in communication with a sensor/interface/driver 1506 such that sensor 1504 receives the smellprint and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the smellprint and compare it against a digitized smellprint stored in a database (e.g., security database 212) included on fob 102. The smellprint information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for smellprints, protocol/sequence controller 208 may utilize an existing database to compare the difference in molecular structures, chemical compounds, temperature, mass differences, pressure, force, and odorants by using statistical, ANN and neuromorphic techniques. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as smellprint recognition software and/or hardware systems to facilitate smellprint comparisons, such as, for example those developed by Company Mastiff Electronic Systems.

Fob 102 and/or any other third-party security vendor system used in connection with fob 102 may additionally be configured with secondary security procedures to confirm that fake biometric samples are not being used. For example, to detect the use of a false odorant, system 1502 may be further configured to detect man-made smells, abnormal odorants, body heat and/or any other secondary procedure to thwart biometric security fraud. After verifying the biometric information, fob 102 and RFID reader 104 may begin mutual authentication by the methods described herein.

In another exemplary embodiment, biometric security system 1502 may be configured for facilitating biometric security using keystroke/typing recognition biometrics. As discussed herein, keystroke/typing recognition biometrics may include recognition of the duration of keystrokes, latencies between keystrokes, inter-keystroke times, typing error frequency, force keystrokes and/or any portion thereof. As discussed herein, these features may be collectively referred to as a "keystroke scan." Biometric security system 1502 may include a biometric sensor 1504 which may be configured with an electronic sensor, an optical sensor, a keyboard, and/or other hardware and/or software that facilitates the capture of biometric data from the person such as, for example, scanning, detecting or otherwise sensing a keystroke scan of fob user.

In one exemplary application of fob 102 incorporating biometric security system 1502, system 1502 may capture the keystroke scan of the fob user to initiate the mutual authentication process between fob 102 and RFID reader 104, and/or to provide verification of the user's identity. In one embodiment, biometric sensor 1504 of the security system 1502 may capture a keystroke scan, when a user types, for example, a PIN or pass phrase into a keyboard configured with sensor 1504. Biometric sensor 1504 may be in communication with a sensor/interface/driver 1506 such that sensor 1504 receives the keystroke scan and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the keystroke scan based on keystroke characteristics and compare the scan against a digitized keystroke scan stored in a database (e.g., security database 212) included on fob 102. The keystroke scan information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for keystroke scans, protocol/sequence controller 208 may utilize an existing database to compare the behavioral, temporal and physical characteristics associated with keystrokes. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more thirdparty devices such as keystroke scan recognition software and/or hardware systems to facilitate keystroke scan comparisons, such as, for example those developed by Bio-Password® by BioNet Systems, LLC.

Fob 102 and/or any other third-party security vendor system used in connection with fob 102 may additionally be configured with secondary security procedures to confirm that fake biometric samples are not being used. For example, to detect the use of a false keystroke, system 1502 may be further configured to detect body heat and/or any other secondary procedure to thwart biometric security fraud. After verifying the biometric information, fob 102 and RFID reader 104 may begin mutual authentication by the methods described herein.

In another exemplary embodiment, biometric security system 1502 may be configured for facilitating biometric security using iris scan biometrics. As discussed herein, iris scan biometrics may include recognition of characteristics of the colored tissues surrounding the pupil, such as the rings, furrows and freckles and/or any portion thereof. As discussed herein, these characteristics may be collectively referred to as an "iris scan." Biometric security system 1502 may include a biometric sensor 1504 which may be configured with a video camera, an optical scanner, a digital camera, a charge coupled device and/or other hardware and/or software that facilitates the capture of biometric data from the person such as, for example, scanning, detecting or otherwise sensing an iris scan of fob user.

In one exemplary application of fob 102 incorporating biometric security system 1502, system 1502 may capture the iris scan of the fob user to initiate the mutual authentication process between fob 102 and RFID reader 104, and/or to provide verification of the user's identity. In one embodiment, biometric sensor 1504 of the security system 1502 may capture an iris scan, when a user uses sensor 1504 to scan his iris while he is up to five feet away from sensor 1504. Sensor 1504 may scan the user's iris through contacts, sunglasses, and/or any other type of eye glasses. Biometric sensor 1504 may be in communication with a sensor interface/driver 1506 such that sensor 1504 receives the iris scan and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the iris scan based on iris characteristics and compare the scan against a digitized iris scan stored in a database (e.g., security database 212) included on fob 102. The iris scan information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for iris scans, protocol/sequence controller 208 may utilize an existing database to compare the surface patterns of the iris by localizing the boundaries and the eyelid contours of the iris and creating a phase code for the texture sequence in the iris. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as iris scan recognition software and/or hardware systems to facilitate iris scan comparisons, such as, for example those developed by Iridian, LG Electronics and BioCom.

Fob 102 and/or any other third-party security vendor system used in connection with fob 102 may additionally be configured with secondary security procedures to confirm that fake biometric samples are not being used. For example, to detect the use of a false iris, system 1502 may be further configured to vary the light shone into the eye to watch for pupil dilation, to detect body heat and/or any other secondary procedure to thwart biometric security fraud. After verifying the biometric information, fob 102 and RFID reader 104 may begin mutual authentication by the methods described herein.

In another exemplary embodiment, biometric security system 1502 may be configured for facilitating biometric security using retinal scanning biometrics. As discussed herein, retinal scanning biometrics may include recognition of characteristics of the reflected retinal pattern of the eye, such as the location, structure, size, and shape of blood vessels and/or any portion thereof. As discussed herein, these characteristics may be collectively referred to as a "retinal scan." Biometric security system 1502 may include a biometric sensor 1504 which may be configured with low-intensity light source, such as an infrared source, an optical coupler and/or other hardware and/or software that facilitates the capture of biometric data from the person such as, for example, scanning, detecting or otherwise sensing a retinal scan of fob user.

In one exemplary application of fob 102 incorporating biometric security system 1502, system 1502 may capture the iris scan of the fob user to initiate the mutual authentication process between fob 102 and RFID reader 104, and/or to provide verification of the user's identity. In one embodiment, biometric sensor 1504 of the security system 1502 may capture a retinal scan, when a sensor 1504 shines a light source into the user's retina and detects the reflected retina pattern. Sensor 1504 may detect a user's retinal pattern when the user is up to five feet away from sensor 1504. Biometric sensor 1504 may be in communication with a sensor interface/driver 1506 such that sensor 1504 receives the retinal scan and transmits a signal to controller 208 to facilitate activating the operation of fob 102. A power source (e.g., battery 1503) may be in communication with biometric sensor 1504 and sensor interface 1506 to provide the desired power for operation of the biometric security system components.

Fob 102 may digitize the retinal scan based on retinal characteristics and compare the scan against a digitized iris scan stored in a database (e.g., security database 212) included on fob 102. The retinal scan information may additionally be compared with information from one or more third-party databases communicating with fob 102 through any communication software and/or hardware, including for example, RFID reader 104, a USB connection, a wireless connection, a computer, a network and/or any other means for communicating. Protocol/sequence controller 208 may facilitate the local comparison to authenticate the biometric and authentication circuit 210 may validate the information. Any of the embodiments may alternatively or additionally include remote comparisons performed or controlled by one or more third-party security vendors.

For example, for retinal scans, protocol/sequence controller 208 may utilize an existing database to compare the blood vessel patterns of the retina by comparing stored and detected retinal patterns. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. Further, the present invention anticipates use of one or more third-party devices such as retinal scan recognition software and/or hardware systems to facilitate keystroke scan comparisons, such as, for example those developed by Eye-Key and Retinal Technologies.

Fob 102 and/or any other third-party security vendor system used in connection with fob 102 may additionally be configured with secondary security procedures to confirm that fake biometric samples are not being used. For example, to detect the use of a false retina, system 1502 may be further configured to vary the light shone into the eye to watch for pupil dilation, to detect body heat and/or any other secondary procedure to thwart biometric security fraud. After verifying the biometric information, fob 102 and RFID reader 104 may begin mutual authentication by the methods described herein.

Figure 16:
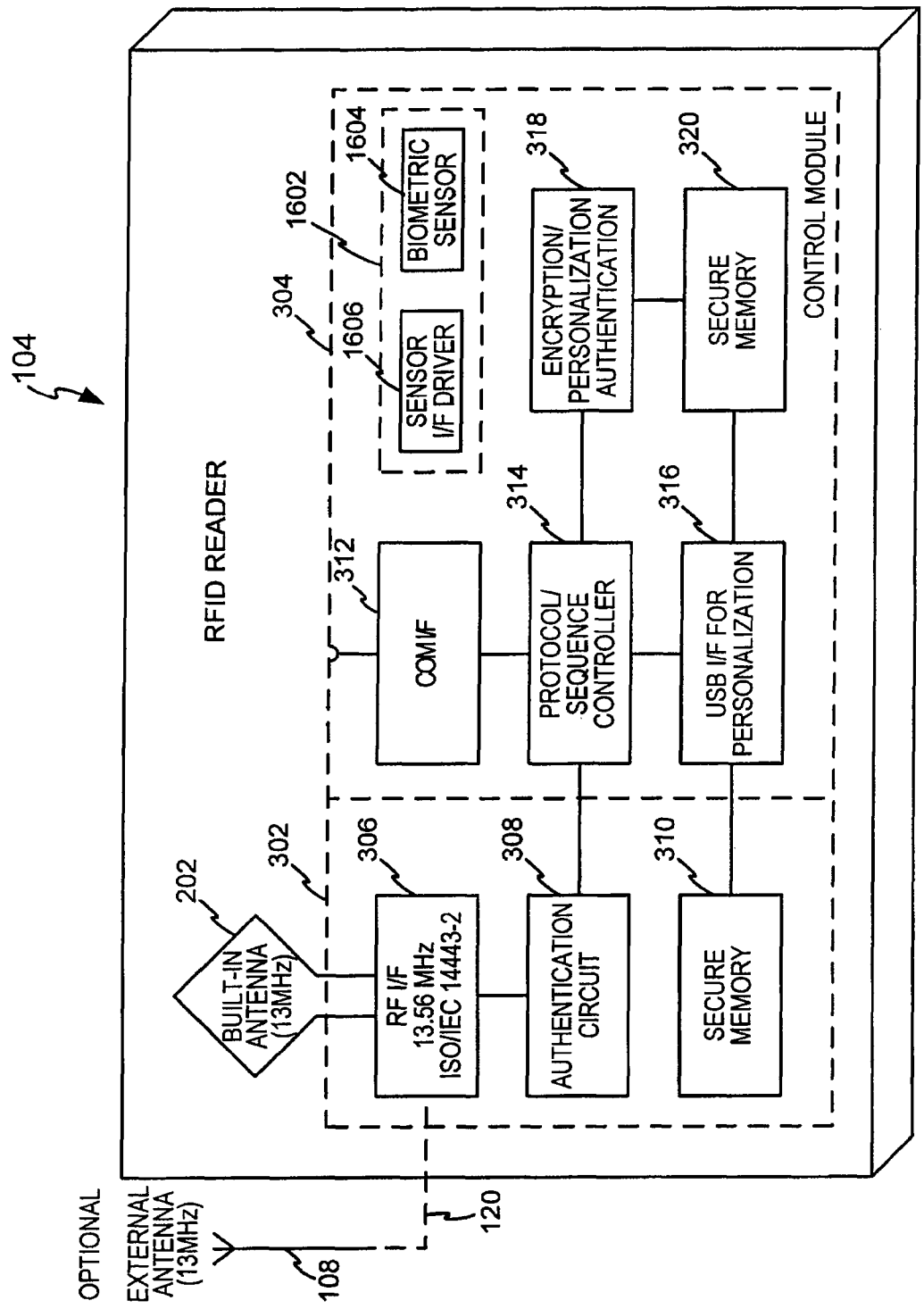
FIG. 16 is another schematic illustration of an exemplary fob in accordance with the present invention.

In an additional or alternate embodiment, RFID reader 104 may include one or more security system, wherein the security system incorporates one or more biometric system. As shown in FIG. 16, RFID reader 104 includes a biometric security system 1602 configured for facilitating biometric security using a biometric sample. Biometric security system 1602 may include a biometric sensor 1604 which may be configured with a sensor, video camera, digital camera, optical scanner, light source and/or other hardware and/or software for acquiring biometric data form the person such as, for example, optical scanning, chemical sensing, or otherwise detecting the portion of fob user. Biometric sensor 1604 may be in communication with a sensor interface/driver 1606 such that sensor interface 1606 receives biometric information and transmits a signal to controller 208 to facilitate activating the operation of fob 102.

In one exemplary application of RFID reader 104 including biometric security system 1602, the user may submit a biometric sample to the biometric sensor to initiate the mutual authentication process between fob 102 and RFID reader 104, and/or to provide verification of the user's identity. RFID reader 104 may digitize the sample and compare it against a digitized biometric sample stored in a database (e.g., database 310) included on RFID reader 104. The biometric sample information may additionally be compared with information from one or more third-party databases communicating with fob 102 through any communication software and/or hardware, including for example, fob 102, a USB connection, a wireless connection, a computer, a network and/or any other means for communicating. The transfer of information may include use of encryption decryption, security keys, digital certificates and/or other security devices to confirm the security of the sample. RFID reader 104 may additionally communicate with third-party databases to facilitate a comparison between fob 102 identifier and other fob identifiers stored with the biometric samples.

Protocol/sequence controller 314 may facilitate the local comparison to authenticate the biometric sample and authentication circuit 308 may validate the information. Any of the embodiments may alternatively or additionally include remote comparisons performed or controlled by third-party security vendors in any way known in the art for comparing biometric data.

RFID reader 104 may also be configured with secondary security procedures biometric to confirm that fake biometric samples are not being used. For example, RFID reader 104 may be further configured to measure blood flow, body heat and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, and/or any other procedures known in the art for authenticating the authenticity of biometric samples. After verifying the biometric information, fob 102 and RFID reader 104 may begin mutual authentication, and the transaction may proceed accordingly.

While the biometric safeguard mechanisms describe fob 102 and/or RFID reader 104 configured with a biometric safeguard mechanism, any part of system 100 may be equipped with a biometric safeguard system. For example, the invention contemplates receiving a biometric sample only at the reader, only at the fob, at both the fob and the reader, or at any other combination of location or device. As such, any scanner or database discussed herein may be located within or associated with another device. For example, the fob may scan a user biometric, but the database used for comparison may be located within the reader or merchant server. In other embodiments, the biometric security device may be located away from the point of sale device and/or provide other functions. For example, the biometric security device may be located near the item to be purchased or located in any other location within or outside of the merchant. In one embodiment, the biometric security device may be located outside of a jewelry display to allow a user to not only start the authentication process before check-out, but also to allow access to the product within the display case. In this regard, the biometric security device may communicate the information to the point of sale device so the POS may verify that the person that entered the jewelry box is the same person that is now buying the jewelry. In another embodiment, any portion of system 100 may be configured with a biometric security device. The biometric security device may be attached and/or free-standing. Biometric security devices may be configured for local and/or third-party operation. For example, the present invention contemplates the use of third-party fingerprint scanning and security devices such as those made by Interlink Electronics, Keytronic, Identix Biotouch, BIOmetricID, onClick, and/or other third-party vendors.

In yet another embodiment, the database used for comparison may contain terrorist and/or criminal information. As used herein, terrorists and/or criminals may include terrorists, felons, criminals, convicts, indicted persons, insurgents, revolutionaries and/or other offenders. The information may include biometric information, personal information as described herein, arrest records, aliases used, country of residence, affiliations with gangs and terrorist groups, and/or any other terrorist and/or criminal information.

As an example of a secondary security procedure in accordance with the present invention, the biometric sensor 1504, 1604 may be configured to allow a finite number of scans. For example, biometric sensor 1504, 1604 may be configured to only accept data from a single scan. As a result, biometric sensor 1504, 1604 may turn off or deactivate fob 102 and/or RFID reader 104 if more than one scan is needed to obtain a biometric sample. Biometric sensor 1504, 1604 may also be configured to accept a preset limit of scans. For example, biometric sensor 1504, 1604 may receive three invalid biometric samples before it turns off and/or deactivates fob 102 and/or RFID reader 104.

The sensor or any other part of system 100 may also activate upon sensing a particular type or group of biometric samples. The activation may include sending a signal, blinking, audible sound, visual display and/or the like. For example, if the sensor detects information from a gold card member, the system may display a special offer on the POS terminal. If the sensor detects a repeat customer, the sensor may signal or notify a manager to approach the customer and thank them for their repeat business. In another embodiment, the system may send a signal to a primary account holder or any other person or device to notify them that the fob is being used or that a condition or rule is being violated (e.g., charge above $1000).

Any of the biometric security systems described herein may additionally be configured with a fraud protection log. That is, a biometric security system, such as biometric security system 1502, 1602 may be configured to log all biometric samples submitted on fob 102 and/or RFID reader 104 and store the log information on databases on and/or communicating with system 1502, 1602. If a new and/or different biometric sample is submitted that differs from the log data, biometric security system 1502, 1602 may employ a security procedure such as deactivation, warning authorities, requesting a secondary scan, and/or any other security procedure.

Biometric security system 1502, 1602 and/or the biometric security system configured with system 100 may also be configured to obtain a plurality of biometric samples for verification and/or other security purposes. For example, after biometric security system 1502, receives a first biometric sample (e.g., scans one finger,) it may be configured to receive a second biometric sample (e.g., scans a second finger). The first and second biometric samples may be compared with stored biometric samples by any of the methods disclosed herein. The second biometric sample may be the only sample compared with stored biometric samples if the first sample is unreadable or inadequate.

In yet another exemplary embodiment of the present invention, fob 102 may be equipped with a biometric safeguard mechanism. For example, in one exemplary application of fob 102, fob 102 may use biometric security system 1502 to authorize a transaction that violates an established rule, such as, for example, a purchase exceeding an established per purchase spending limit, a purchase exceeding a preset number of transactions, any portion of a purchase and/or transaction involving non-monetary funds (e.g., paying a portion of the transaction with loyalty points, coupons, airline miles, etc.) and/or any other purchase and/or transaction exceeding a preset or established limit. Fob user, a third-party issuer system a third-party financial system, a company and/or any other entity or system may establish the preset limits. The limits may be used to prevent fraud, theft, overdrafts, and/or other non-desirable situations associated with financial and non-financial accounts. For example, if fob 102 is stolen and the thief tries to make a large purchase with the card, the biometric safeguard mechanism may prevent the purchase until fob user's identity is verified by biometric means.

For example, fob 102 may activate biometric security system 1502 to notify a user who is attempting to make a large purchase that the user must provide a biometric sample to verify the user's identity. By notifying, fob 102 may be configured to provide an audible signal, visual signal, optical signal, mechanical signal, vibration, blinking, signaling and beeping, and/or provide any other notification to a user. Accordingly, fob user may provide such verification by submitting a biometric sample, for example placing his finger over biometric sensor 1504 and/or any other biometric security devices used in association with fob 102. Biometric sensor 1504 may then digitize the biometric sample (e.g., fingerprint) and use the digitized sample for verification by any of the methods described herein. Once fob user's identity and/or fob 102 transponder identifier are verified, fob 102 may provide a transaction authorized signal to RF transponder 202 (and/or to transponder 220) for forwarding to RFID reader 104. RFID reader 104 may then provide the transaction authorized signal to POS device 110 in similar manner as is done with conventional PIN driven systems and POS device 110 may process the transaction under the merchant's business as usual standard. If fob 102 has been stolen, then fob user's identity may not be verified and the transaction may be cancelled. Additionally, one or more further security procedures may be triggered, such as, for example, fob 102 may deactivate, fob 102 may send a notification to a security vendor, fob 102 may be confiscated by the merchant and/or any other security procedures may be used.

In another exemplary embodiment, RFID reader 104 may be equipped with a biometric safeguard mechanism. For example, in one exemplary application of RFID reader 104, RFID reader 104 may use biometric security system 1602 to authorize a transaction that violates an established rule, such as, for example, a purchase exceeding an established per purchase spending limit, a purchase exceeding a preset number of transactions and/or any other purchase exceeding a preset or established limit. Fob user, a third-party issuer system a third-party financial system, a company and/or any other entity or system may establish the preset limits. The limits may be used to prevent fraud, theft, overdrafts, and/or other non-desirable situations associated with financial and non-financial accounts. For example, if fob 102 is stolen and the thief tries to make a large purchase with the card, the biometric safeguard mechanism may prevent the purchase until fob user's identity is verified by biometric means.

In one example, where fob user is using a company-issued fob 102, fob 102 may the have a pre-set limit of transactions that may be completed before biometric verification is required. If the user exceeds the transaction limit, RFID reader 104 may be configured to scan a biometric sample in order to verify the user's identity. Accordingly, the user may provide such verification by submitting a biometric sample, for example submitting a retinal scan to biometric sensor 1604. RFID reader 104 may then digitize the biometric sample (e.g., retinal pattern) and use the digitized sample for verification by any of the methods described herein. Once fob user's identity and/or fob 102 transponder identifier are verified, RFID reader 104 may receive a transaction authorized signal from a security vendor authorized to give such a signal. RFID reader 104 may then provide the transaction authorized signal to POS device 110 in similar manner as is done with convention PIN driven systems and POS device 110 may process the transaction under the merchant's business as usual standard.

While the biometric safeguard mechanisms described herein use fingerprint scanning and retinal scanning for biometric sample verification for exemplification, any biometric sample may be submitted for verification, authorization and/or any other safeguard purpose. For example the present invention contemplates the use of voice recognition, facial and/or ear recognition, signature recognition, vascular patterns, DNA sampling, hand geometry, auditory emissions recognition, olfactory recognition, keystroke/typing recognition, iris scans, and/or any other biometric known in the art.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A transponder-reader transaction system comprising:
   a reader configured to communicate with a transponder;
   a hand geometry scan sensor configured to detect proffered hand geometry scan sample data, said hand geometry scan sensor configured to communicate with said transaction system, wherein said proffered hand geometry scan sample data is configured to be verified to facilitate a transaction; and
   wherein said transaction system is configured to determine whether a transaction exceeds a preloaded value defined by a preloaded value data file associated with said transponder, determine whether said transaction exceeds a combination of said preloaded value and a reload value defined by a reload protocol data file associated with said transponder, notify a user to proffer said proffered hand geometry scan sample data to authorize use of said combination of said preloaded value and said reload value to complete said transaction, and authorize said transaction to proceed by applying said preloaded value from a first funding source associated with said transponder and applying a portion of said reload value from one of said first funding source and a second funding source according to said reload protocol data file.

2. The transponder-reader transaction system of claim 1, wherein said hand geometry scan sensor is configured to communicate with said transaction system via at least one of said transponder, said reader, or a network.

3. The transponder-reader transaction system of claim 1, wherein said hand geometry scan sensor is configured with at least one of an infrared optical sensor or a three-dimensional imaging system.

4. The transponder-reader transaction system of claim 1, wherein said hand geometry scan sensor is configured to detect and verify hand geometry scan characteristics including at least one of: blood flow, body heat, hand shape, finger length, finger thickness, or finger curvature.

5. The transponder-reader transaction system of claim 1, further including at least one of: a third-party security vendor device or a protocol/sequence controller configured to compare said proffered hand geometry scan sample data with stored hand geometry scan sample data.

6. The transponder-reader transaction system of claim 1 further comprising a device configured to compare said proffered hand geometry scan sample data with stored hand geometry scan sample data, wherein said stored hand geometry scan sample data comprises registered hand geometry scan sample data which is associated with at least one of: personal information, credit card information, debit card information, savings account information, or loyalty point information.

7. The transponder-reader transaction system of claim 1 further comprising a device configured to compare said proffered hand geometry scan sample data with stored hand geometry scan sample data, wherein said stored hand geometry scan sample data comprises registered hand geometry scan sample data, wherein different registered hand geometry scan sample data are associated with a different one of: personal information, credit card information, debit card information, savings account information, or loyalty point information.

8. The transponder-reader transaction system of claim 1, wherein said proffered hand geometry scan sample data is primarily associated with at least one of: first user information, wherein said first user information comprises personal information, credit card information, debit card information, savings account information, or loyalty point information, and wherein said proffered hand geometry scan sample data is secondarily associated with at least one of second user information, wherein said second user information comprises personal information, credit card information, debit card information, savings account information, or loyalty point information, wherein said second user information is different than said first user information.

9. The transponder-reader transaction system of claim 1, wherein said transponder is configured to deactivate upon rejection of said proffered hand geometry scan sample data.

10. The transponder-reader transaction system of claim 1, wherein said hand geometry scan sensor is configured to provide a notification upon detection of a sample.

11. The transponder-reader transaction system of claim 1, wherein said device configured to verify is configured to facilitate the use of at least one secondary security procedure.

12. The transponder-reader transaction system of claim 1, further comprising:
an RFID reader database for storing RFID reader data, said RFID reader database in communication with a reader authentication circuit;
an RFID reader protocol/sequence controller in communication with at least one of a first interrogator, said reader authentication circuit, or said RFID reader database;
wherein said reader is configured to provide a first radio frequency (RF) interrogation signal to power a transponder system, to receive a transponder system RF signal, and to communicate transponder system account data related to said transponder system RF signal to a merchant system, said reader including a first interrogator for providing said first RF interrogation signal;
wherein said transponder system authentication circuit comprises said reader authentication circuit in communication with said first interrogator for authenticating said transponder system RF signal;
wherein said RFID reader protocol/sequence controller is configured to facilitate control of an order of operation of said first interrogator, said reader authentication circuit, and said RFID reader database, said transponder-reader transaction system further comprising an RFID reader communications interface configured to communicate with said merchant system, said RFID reader communications interface configured to provide said transponder system account data, wherein said transponder system is configured to receive said first RF interrogation signal, to authenticate said first RF interrogation signal, and to transmit said transponder system account data, said transponder system further comprising: a first transponder responsive to said first RF interrogation signal; a transponder system authentication circuit in communication with said first transponder, said transponder system authentication circuit configured to authenticate said first RF interrogation signal; a transponder system database for storing said transponder system account data, said transponder system database in communication with said transponder system authentication circuit; and a transponder system protocol/sequence controller in communication with at least one of said first transponder, said transponder system authentication circuit, and said transponder system database, said transponder system protocol/sequence controller configured to control the order of operation of said first transponder, said transponder system authentication circuit, and said transponder system database, wherein said transponder system protocol/sequence controller is configured to activate said transponder system authentication circuit in response to said first RF interrogation signal having an RFID reader authentication code, said transponder system authentication circuit configured to encrypt said RFID reader authentication code to provide an encrypted RFID reader authentication code, said transponder system authentication circuit configured to provide said encrypted RFID reader authentication code to said first transponder for providing to said reader, wherein said reader is configured to receive said encrypted RFID reader authentication code, and wherein said reader protocol/sequence controller is configured to activate said reader authentication circuit in response to said encrypted RFID reader authentication code, wherein said reader database is configured to provide a transponder system decryption security key to said reader authentication circuit in response to said encrypted RFID reader authentication code, said transponder system decryption security key for use in decrypting said encrypted RFID reader authentication code to form a decrypted RFID reader authentication code, said transponder system decryption security key provided to said reader based on a unique transponder identification code, wherein said reader authentication circuit is configured to compare said decrypted RFID reader authentication code and said reader authentication code to determine whether a match exists, and wherein said reader protocol/sequence controller is configured to activate said reader communications interface in response to said reader authentication circuit matching said decrypted RFID reader authentication code and said reader authentication code.

13. The transponder-reader transaction system according to claim 12, wherein said transponder system protocol/sequence controller activates said transponder system authentication circuit in response to said first RF interrogation signal, wherein said transponder system authentication circuit is configured to provide a transponder authentication code to said first transponder for providing to said reader.

14. The transponder-reader transaction system according to claim 13, wherein said reader authentication circuit is configured to receive said transponder authentication code, said RFID reader protocol/sequence controller activating said reader authentication circuit in response to said transponder authentication code, said reader authentication circuit configured to encrypt said transponder authentication code to form an encrypted transponder authentication code, wherein said reader is configured to provide said encrypted transponder authentication code to said transponder system.

15. The transponder-reader transaction system according to claim 14, wherein said transponder system database is configured to store at least one of a transponder system identification data or an RFID reader decryption security key, and wherein said transponder system database is configured to provide said RFID reader decryption security key to said transponder system authentication circuit in response to said encrypted transponder authentication code, said RFID reader decryption security key for use in decrypting said encrypted transponder authentication code to form a decrypted transponder authentication code.

16. The transponder-reader transaction system according to claim 15, wherein said transponder system authentication circuit is configured to compare said decrypted transponder authentication code and said transponder authentication code to determine whether a match exists.

17. The transponder-reader transaction system according to claim 16, wherein said transponder system account data is in magnetic stripe format.

18. The transponder-reader transaction system according to claim 17, wherein said transponder system account data is encrypted as a pre-encrypted transponder system account data, wherein said transponder system database is configured to provide said pre-encrypted transponder system account data to said reader in response to said transponder system authentication circuit matching said decrypted transponder authentication code and said transponder authentication code.

19. The transponder-reader transaction system according to claim 18, wherein said reader communications interface is configured to provide a transponder system PIN and said pre-encrypted transponder system account data in response to said transponder authentication code matching said decrypted transponder authentication code, and said decrypted RFID reader authentication code matching said reader authentication code.

20. The transponder-reader transaction system of claim 1, further configured to update said preloaded value data file according to said reload protocol data file.

21. The transponder-reader transaction system of claim 1, further configured to provide a transponder system identifier and update reload indicia to a user interface to obtain user authorization prior to reloading said preloaded value.

22. The transponder-reader transaction system of claim 1, further configured to provide user incentives to said transponder in response to said reloading of said preloaded value.

23. The transponder-reader transaction system of claim 1, further configured to provide a transponder system identifier to an issuer system server and to provide in real-time an update reload protocol to said issuer system server for reloading the preloaded value in real-time according to said reload protocol.

24. A method comprising:
determining that a transaction exceeds a preloaded value defined by a preloaded value data file associated with a transponder;
determining that said transaction exceeds a combination of said preloaded value and a reload value defined by a reload protocol data file associated with said transponder, wherein said preloaded value data file and said reload protocol data file define predetermined values for use in satisfying a user transaction request;
notifying a user to proffer a hand geometry scan sample to authorize use of said combination of said preloaded value and said reload value to complete said transaction;
verifying proffered hand geometry scan sample data, wherein said proffered hand geometry scan sample data is detected at a hand geometry scan sensor communicating with a transponder-reader transaction system; and
authorizing said transaction to proceed by applying said preloaded value from a first funding source associated with said transponder, wherein a portion of said reload value is applied from at least one of said first funding source or a second funding source according to said reload protocol data file.

25. The method of claim 24, wherein said hand geometry scan sensor comprises at least one of an infrared optical sensor or a three-dimensional imaging system.

26. The method of claim 24, wherein said verifying said proffered hand geometry scan sample data includes comparing hand geometry scan characteristics including at least one of: blood flow, body heat, hand shape, finger length, finger thickness, or finger curvature.

27. A method comprising:
determining that a transaction exceeds a preloaded value defined by a preloaded value data file associated with a transponder;
determining that said transaction exceeds a combination of said preloaded value and a reload value defined by a reload protocol data file associated with said transponder, wherein said preloaded value data file and said reload protocol data file define predetermined values for use in satisfying a user transaction request;
authorizing said transaction to proceed in response to verification of proffered hand geometry scan sample data by applying said preloaded value from a first funding source associated with said transponder, wherein said proffered hand geometry scan sample data is detected at a sensor communicating with a transaction system, and wherein said proffered hand geometry scan sample data facilitates authorization of said combination of said preloaded value and said reload value to complete said transaction; and applying a portion of said reload value from at least one of said first funding source or a second funding source according to said reload protocol data file.

28. The method of claim 27, wherein said detecting said proffered hand geometry scan sample data includes detecting said proffered hand geometry scan sample data using at least one of an infrared optical sensor or a three-dimensional imaging system.

29. The method of claim 27, wherein said authorizing said transaction to proceed is in response to comparing said proffered hand geometry scan sample data with stored hand geometry scan sample data by comparing a hand geometry scan characteristic including at least one of: blood flow, body heat, hand shape, finger length, finger thickness, or finger curvature.

\* \* \* \* \*

UNITED STATES PATENT AND TRADEMARK OFFICE
CERTIFICATE OF CORRECTION

| | | |
|---|---|---|
| PATENT NO. | : 7,886,157 B2 | |
| APPLICATION NO. | : 12/023442 | |
| DATED | : February 8, 2011 | |
| INVENTOR(S) | : Beenau et al. | |

It is certified that error appears in the above-identified patent and that said Letters Patent is hereby corrected as shown below:

On Title Page 13, item (56), under "Other Publications", in Column 2, Line 44, delete "May 11, 2007" and insert -- May 17, 2006 --.

On Title Page 14, item (56), under "Other Publications", in Column 2, Lines 44-45, delete "show/Article" and insert -- showArticle --.

On Title Page 15, item (56), under "Other Publications", in Column 1, Lines 15-16, delete "Jul. 1-Jul. 5." and insert -- 7/1-7/5. --.

On Title Page 15, item (56), under "Other Publications", in Column 1, Line 49, delete "Cards" and insert -- Card --.

On Title Page 15, item (56), under "Other Publications", in Column 1, Line 59, delete "101810,469." and insert -- 10/810,469. --.

On Title Page 15, item (56), under "Other Publications", in Column 2, Line 2, delete "710,307." and insert -- 10/710,307. --.

On Title Page 19, item (56), under "Other Publications", in Column 2, Line 17, delete "tutoria1" and insert -- tutorial --.

Column 51, line 27, in Claim 6, delete "claim 1" and insert -- claim 1, --.

Column 51, line 36, in Claim 7, delete "claim 1" and insert -- claim 1, --.

Signed and Sealed this
Twenty-seventh Day of March, 2012

David J. Kappos
*Director of the United States Patent and Trademark Office*